(12) United States Patent
Freeborn et al.

(10) Patent No.: US 7,134,155 B2
(45) Date of Patent: Nov. 14, 2006

(54) ADJUSTABLE BED CARRIAGE

(75) Inventors: Brian Freeborn, Mississauga (CA); Ted House, Grimsby (CA); Geoff Rutherford, Milton (CA); Hualian Chen, Beamsville (CA)

(73) Assignee: M.C. Healthcare Products Inc., Beamsville (CA)

( * ) Notice: Subject to any disclaimer, the term of this patent is extended or adjusted under 35 U.S.C. 154(b) by 139 days.

(21) Appl. No.: 10/954,472

(22) Filed: Oct. 1, 2004

(65) Prior Publication Data
US 2005/0091747 A1    May 5, 2005

Related U.S. Application Data

(63) Continuation-in-part of application No. 10/692,675, filed on Oct. 27, 2003, now Pat. No. 6,941,600.

(60) Provisional application No. 60/421,077, filed on Oct. 25, 2002.

(51) Int. Cl.
*A47B 7/00*    (2006.01)
(52) U.S. Cl. ............... 5/611; 5/86.1; 5/11; 16/35 R
(58) Field of Classification Search ............ 5/11, 5/611, 86.1; 296/20; 254/2 C, 7 C
See application file for complete search history.

(56) References Cited

U.S. PATENT DOCUMENTS

| | | | | |
|---|---|---|---|---|
| 2,110,227 | A | * | 3/1938 | Koenigkramer et al. .... 188/2 R |
| 2,833,587 | A | * | 5/1958 | Saunders ................ 296/20 |
| 2,952,471 | A | * | 9/1960 | Thorpe ................ 280/43.13 |
| 2,958,873 | A | * | 11/1960 | Ferneau ..................... 5/86.1 |
| 3,051,270 | A | * | 8/1962 | Burzlaff ................. 188/2 R |
| 3,431,584 | A | * | 3/1969 | Maslow .................. 16/35 R |
| 3,462,772 | A | | 8/1969 | Morrison |
| 3,644,945 | A | | 2/1972 | Goodman et al. |
| 3,700,070 | A | | 10/1972 | King |
| 4,023,849 | A | | 5/1977 | Bethlen |
| 4,097,939 | A | | 7/1978 | Peck et al. |
| 4,258,445 | A | | 3/1981 | Zur |
| 4,381,571 | A | | 5/1983 | Elliott |
| 4,425,673 | A | | 1/1984 | Werner |
| 4,437,635 | A | | 3/1984 | Pham |
| 4,523,732 | A | | 6/1985 | Biber et al. |
| 4,793,445 | A | | 12/1988 | Collignon et al. |
| 4,927,127 | A | | 5/1990 | Lock |
| 5,084,922 | A | | 2/1992 | Louit |
| 5,095,562 | A | | 3/1992 | Alexander |
| 5,245,718 | A | | 9/1993 | Krauska |
| 5,257,428 | A | | 11/1993 | Carroll et al. |
| 5,285,992 | A | | 2/1994 | Brown |
| 5,347,682 | A | | 9/1994 | Edgerton, Jr. |
| RE35,201 | E | | 4/1996 | Krauska |
| 5,604,942 | A | | 2/1997 | Allevato et al. |
| 5,611,094 | A | | 3/1997 | D'Entremont |

(Continued)

*Primary Examiner*—Michael Trettel

(57) ABSTRACT

An adjustable bed carriage for supporting a main bed frame above a substantially planar floor. The adjustable bed carriage has one or more first legs, each with an upper end slidably attached to a first end of the main bed frame, and one or more second legs, each with an upper end pivotably attached to a second end of the main bed frame. Each first leg is paired with a second leg, and they are pivotably connected to each other at a central pivot located substantially at a midpoint of each. The carriage also includes a first caster base with one or more first casters for engaging the floor, the first leg being attached to the first caster base. Also, the carriage has a second caster base with one or more second casters for engaging the floor, the second leg being attached to the second caster base.

5 Claims, 51 Drawing Sheets

U.S. PATENT DOCUMENTS

| | | |
|---|---|---|
| 5,613,255 A | 3/1997 | Bish et al. |
| 5,630,238 A | 5/1997 | Weismiller et al. |
| 5,636,394 A | 6/1997 | Bartley |
| 5,682,631 A | 11/1997 | Weismiller et al. |
| 5,685,035 A | 11/1997 | Urness et al. |
| 5,708,997 A | 1/1998 | Foster et al. |
| 5,720,059 A | 2/1998 | Allevato et al. |
| 5,774,914 A | 7/1998 | Johnson et al. |
| 6,006,379 A | 12/1999 | Hensley |
| 6,076,209 A | 6/2000 | Paul |
| 6,230,344 B1 | 5/2001 | Thompson et al. |
| 6,321,878 B1 | 11/2001 | Mobley et al. |
| 6,405,393 B1 | 6/2002 | Megown |
| 6,473,921 B1 | 11/2002 | Brooke et al. |
| 6,546,577 B1 | 4/2003 | Chinn |
| 6,868,567 B1 * | 3/2005 | Edgerton ................ 5/611 |
| 6,880,202 B1 * | 4/2005 | Thompson et al. ......... 16/35 R |
| 6,920,656 B1 * | 7/2005 | Roussy ................. 5/611 |
| 6,941,600 B1 * | 9/2005 | Freeborn et al. ........... 5/611 |
| 2003/0033672 A1 | 2/2003 | Jehn |

\* cited by examiner

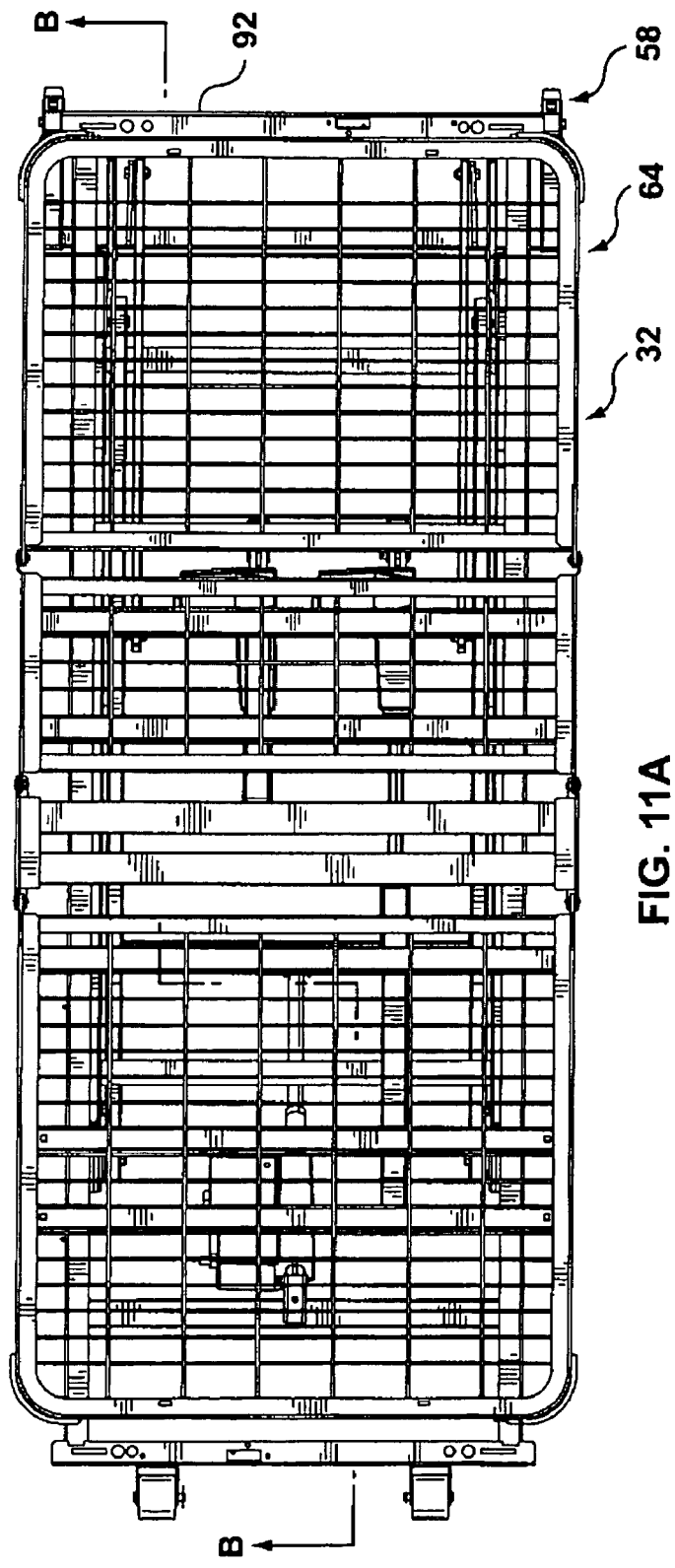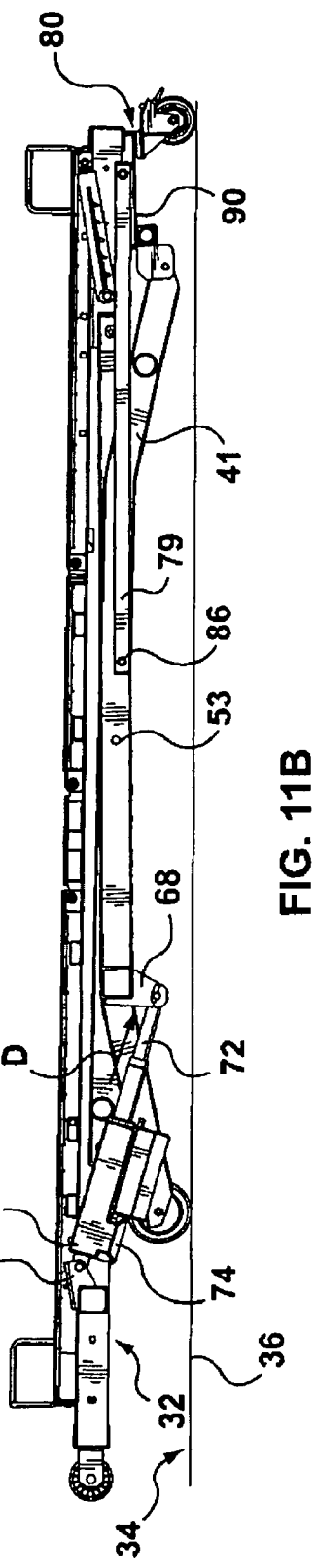
FIG. 11A
FIG. 11B

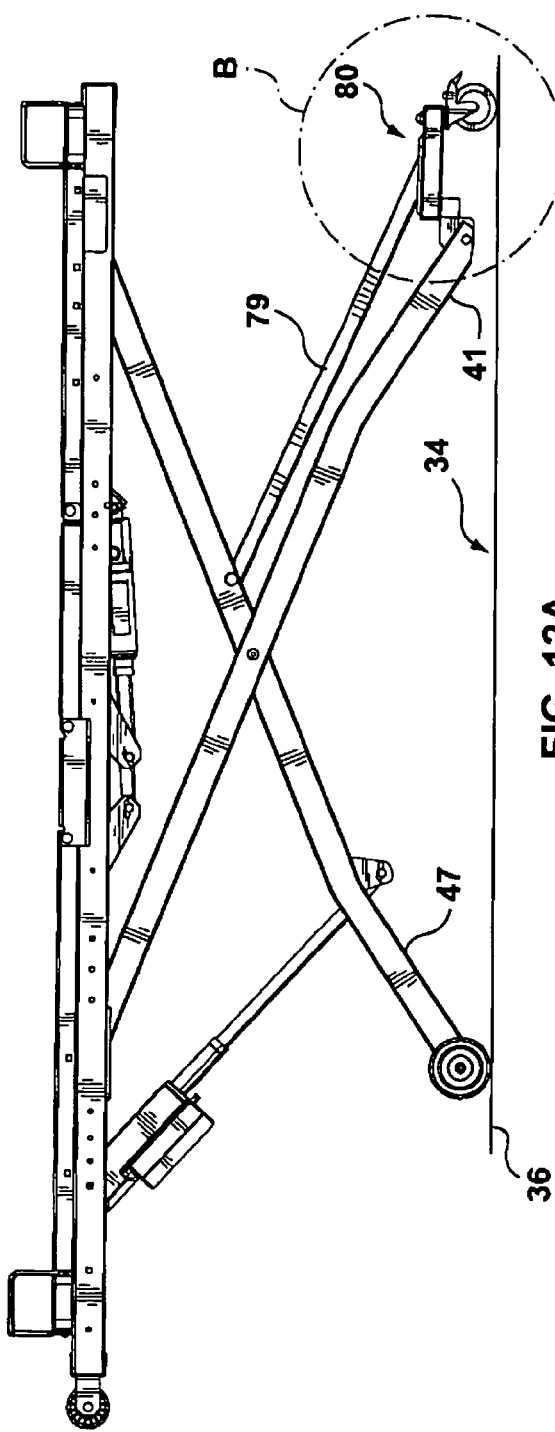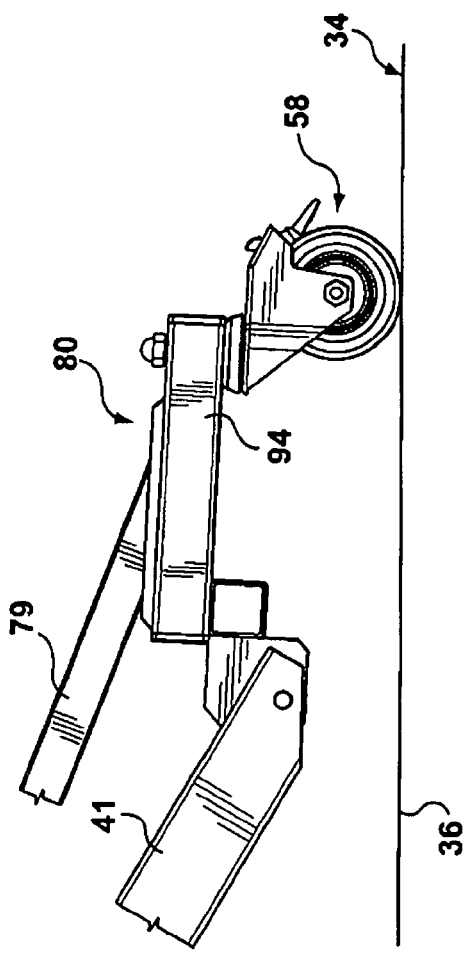

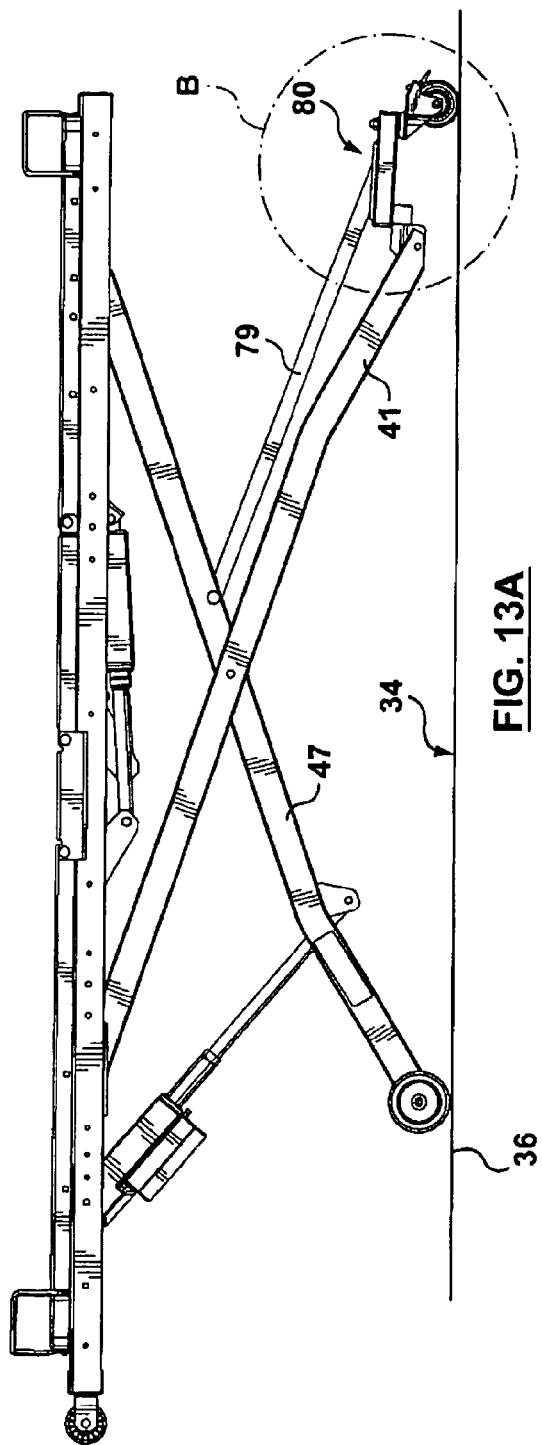
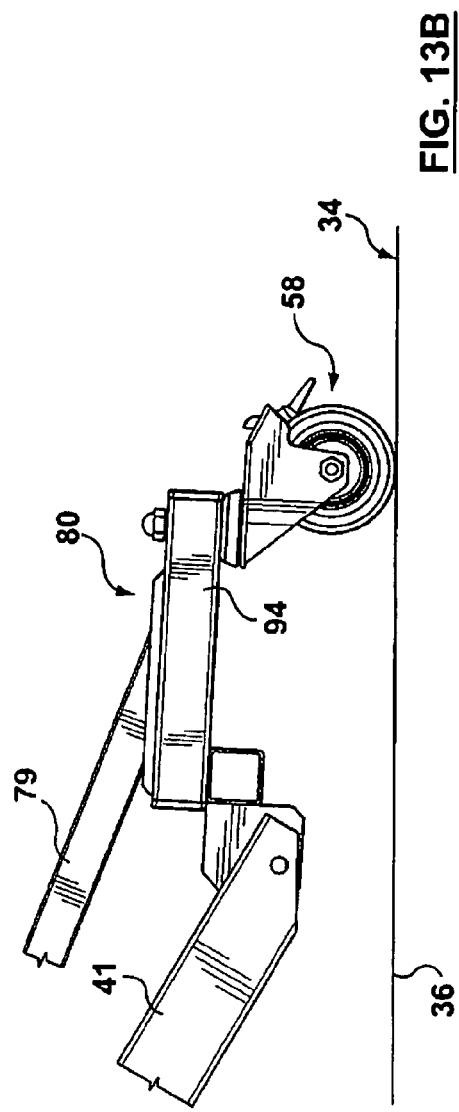
FIG. 13A
FIG. 13B

ADJUSTABLE BED CARRIAGE

This application is a continuation-in-part of prior application Ser. No. 10/692,675, filed Oct. 27, 2003, now U.S. Pat. No. 6,941,600, which claims the benefit of Provisional Application No. 60/421,077, filed Oct. 25, 2002.

FIELD OF THE INVENTION

This invention relates to an adjustable bed carriage for supporting a main bed frame.

BACKGROUND OF THE INVENTION

Known adjustable bed carriages are generally of three types. One type of adjustable bed carriage includes leg assemblies which are positioned at both ends of a main bed frame. An example of this type of known adjustable bed carriage is disclosed in U.S. Pat. No. 4,023,849 (Bethlen).

A second general type includes extendable linkages at both ends of the main bed frame. For instance, such an adjustable bed carriage is disclosed in U.S. Pat. No. 4,097,939 (Peck et al.).

The other well-known type of adjustable bed carriage includes a base supported by casters, wheels or feet on which legs (or linkages), are positioned, extending upwardly to the main bed frame. U.S. Pat. No. 3,462,772 (Morrison) discloses an example of this general type of known adjustable bed carriage.

Scissor leg assemblies are also known and can provide relative simplicity and generally greater overall strength and stability. However, scissor leg assemblies have not generally been used in adjustable bed carriages, and those that have suffer from some deficiencies. For example, in U.S. Pat. No. 5,613,255 (Bish et al.), an adjustable bed carriage is disclosed in which two scissor leg assemblies support the main bed frame. However, the Bish et al. adjustable bed carriage is relatively complex, involving a relatively large number of components. In particular, the two scissor leg assemblies are shown (in FIGS. 4 and 5 of Bish et al.) to include a number of slidable connections between the scissor leg assemblies and a base and a main bed frame. Such slidable connections should be minimized in order to reduce manufacturing costs.

There is therefore a need for an improved adjustable bed carriage for supporting a main bed frame.

SUMMARY OF THE INVENTION

In its broad aspect, the invention provides an adjustable bed carriage for supporting a main bed frame above a substantially planar floor. The adjustable bed carriage has one or more first legs, each with an upper end slidably attached to a first end of the main bed frame, and one or more second legs, each with an upper end pivotably attached to a second end of the main bed frame. Each first leg is paired with a second leg, and they are pivotably connected to each other at a central pivot located substantially at a midpoint of each, to permit pivoting movement of each of the first and second legs about the central pivot in opposite directions, to move the adjustable bed carriage between an extended condition and a retracted condition. The carriage also includes a first caster base with one or more first casters for engaging the floor, the first leg being attached to the first caster base. Also, the carnage has a second caster base with one or more second casters for engaging the floor, the second leg being attached to the second caster base.

In another aspect, the second caster includes a wheel assembly having a housing and a wheel rotatable about an axis defined by an axle subassembly positioned in the housing, a mounting portion for mounting the wheel assembly to the second caster base, and a directional lock for locating the wheel assembly in at least one predetermined position relative to said at last one second leg.

In another aspect, the first caster includes a wheel assembly having a housing an a wheel rotatable about an axis defined by an axle subassembly positioned in the housing, a mounting portion for mounting the wheel assembly to the first caster base, and a brake for preventing rotation of the wheel about the axis, the brake being adapted for braking the wheel upon activation thereof and releasing the wheel upon deactivation.

BRIEF DESCRIPTION OF THE DRAWINGS

The invention will be better understood with reference to the drawings, in which:

FIG. 11A is a top view of the adjustable bed carriage of FIG. 1 in the retracted condition and the main bed frame, drawn at a larger scale;

FIG. 11B is a section view of the adjustable bed carriage of FIG. 11A and the main bed fame taken along line B—B in FIG. 11A;

FIG. 12A is a side view of the adjustable bed carriage of FIG. 1 in the extended condition and the main bed frame;

FIG. 12B is a side view of a caster base included in the adjustable bed carriage of FIG. 12A, drawn at a larger scale;

FIG. 13A is a side view of the adjustable bed carriage of FIG. 12A and the main bed frame, showing the adjustable bed carriage in a first intermediate condition, drawn at a smaller scale;

FIG. 13B is a side view of the caster base included in the adjustable bed carriage of FIG. 13A, drawn at a larger scale;

FIG. 41 is a side view of the right side of the adjustable bed carriage of FIG. 37 and of the main bed frame with the

DETAILED DESCRIPTION OF THE PREFERRED EMBODIMENT(S)

Figure 1:
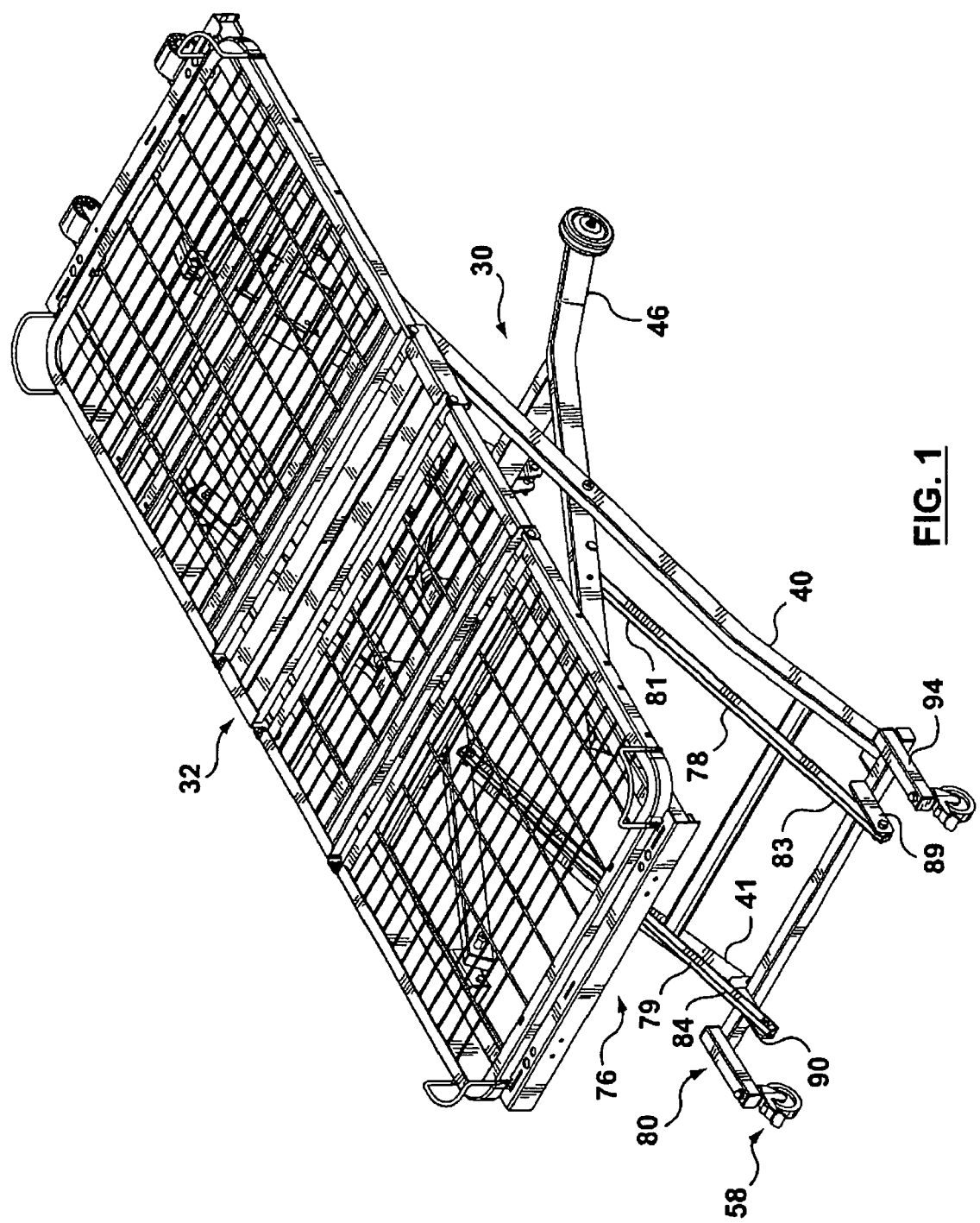
FIG. 1 is an isometric view of a preferred embodiment of an adjustable bed carriage of the invention as well as a main bed frame positioned thereon, the adjustable bed carriage being shown in an extended condition.
Figure 2:
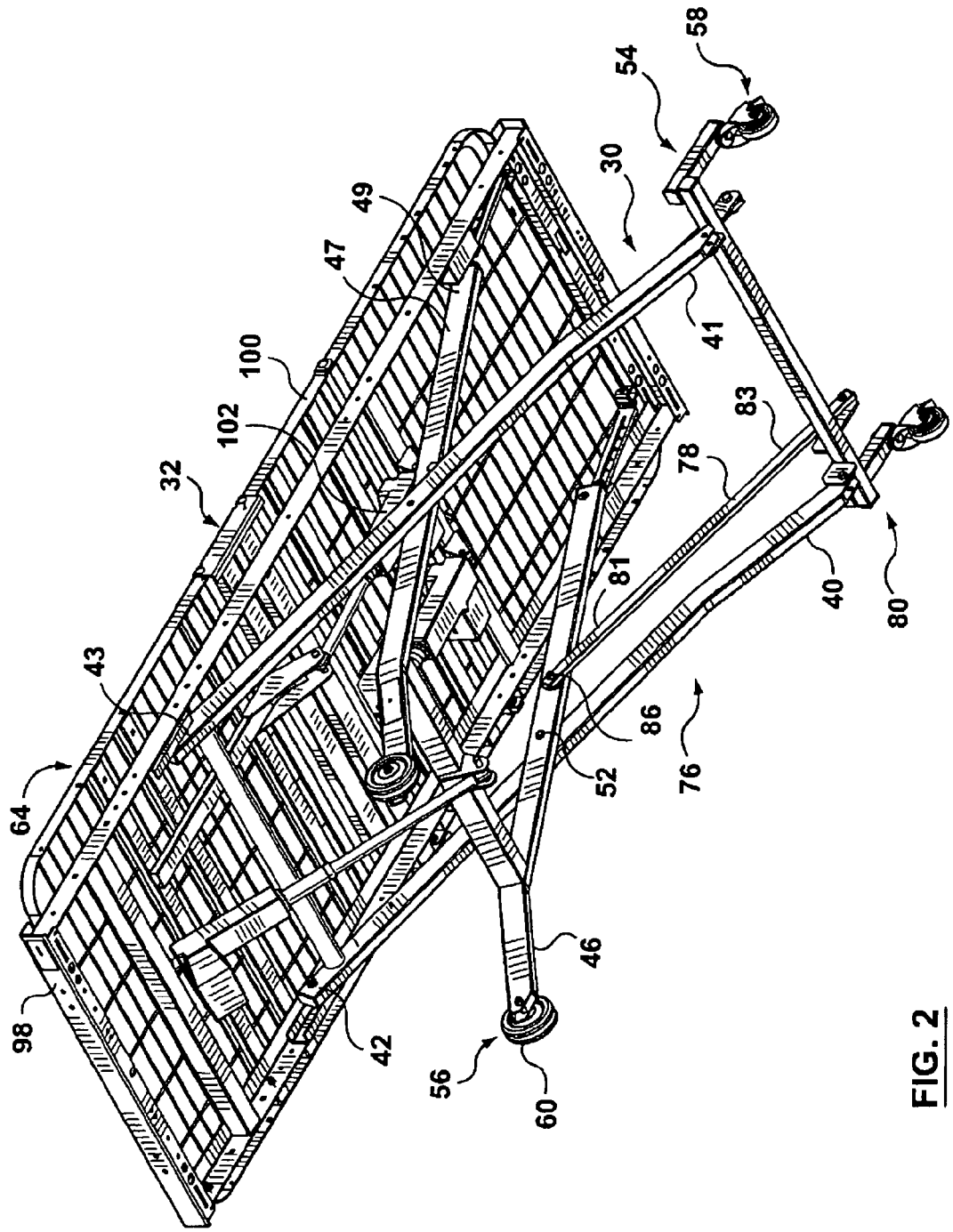
FIG. 2 is an isometric view of the back and bottom of the adjustable bed carriage of FIG. 1 and of the main bed frame.
Figure 5:
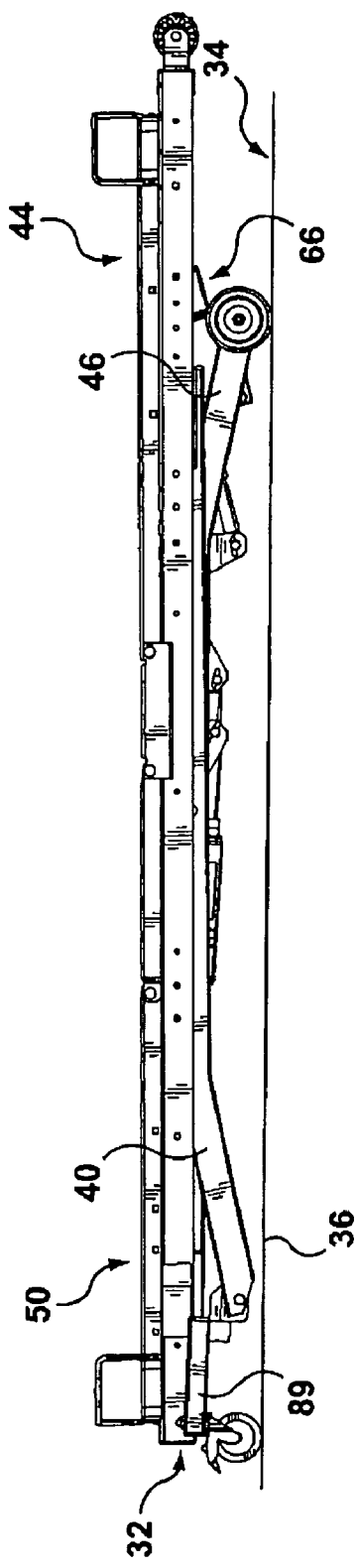
FIG. 5 is a side view of the right side of the adjustable bed carriage of FIG. 1 with the main bed frame positioned thereon, and showing the adjustable bed carriage in a retracted condition.
Figure 6:
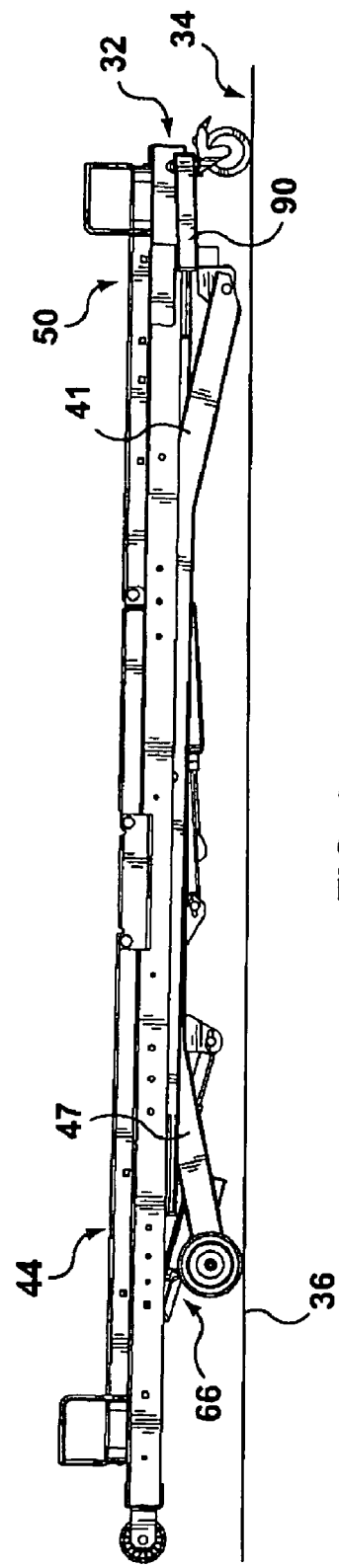
FIG. 6 is a side view of the left side of the adjustable bed carriage of FIG. 1 and of the main bed frame in the retracted condition.
Figure 7:
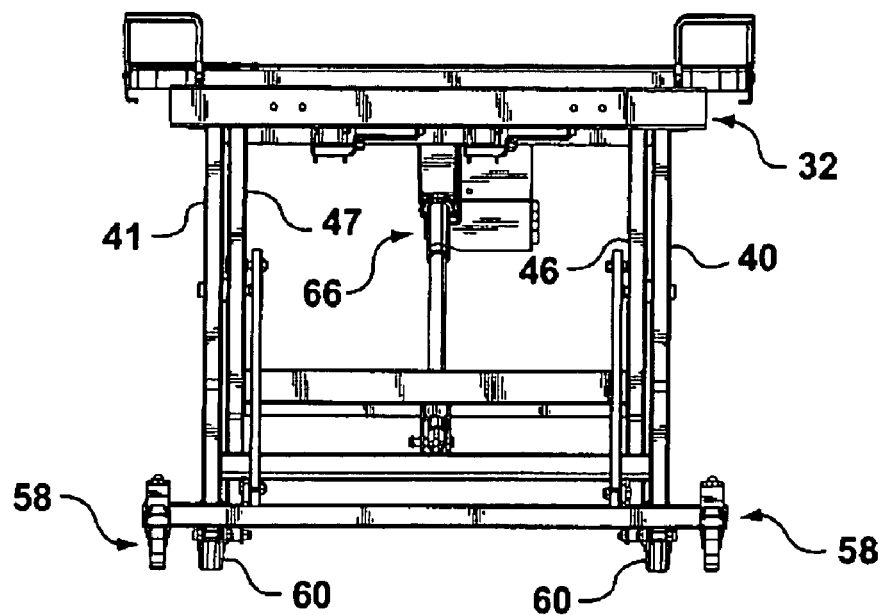
FIG. 7 is a side view of the front side of the adjustable bed carriage of FIG. 1 in the extended condition and of the main bed frame.
Figure 8:
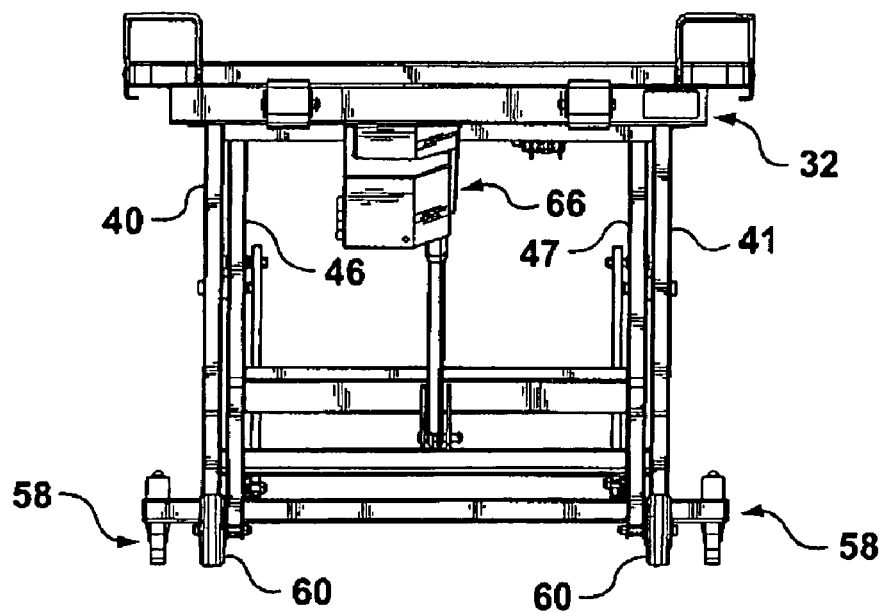
FIG. 8 is a side view of the rear side of the adjustable bed carriage of FIG. 1 in the extended condition and of the main bed frame.

Reference is first made to FIGS. 1–8, 9A, 9B and 10 to describe a preferred embodiment of an adjustable bed carriage indicated generally by the numeral 30 in accordance with the invention. The adjustable bed carriage 30 is for supporting a main bed frame 32 above a substantially planar floor 34. In the preferred embodiment, the adjustable bed carriage 30 has first legs 40, 41 with upper ends 42,43 respectively. Each upper end 42, 43 is slidably attached to a first end 44 of the main bed frame 32, as will be described. As can be seen in FIGS. 1 and 2, the adjustable bed carriage 30 also includes second legs 46, 47 with upper ends 48, 49 respectively, and each upper end 48, 49 is pivotably attached at a second end 50 of the main bed frame 32. In addition, each of the first legs 40, 41 and the second legs 46, 47 are pivotably connected respectively at central pivots 52, 53 located substantially at the midpoints of the legs 40, 41 and 46, 47. The connections of the legs 40, 41 and 46, 47 at the central pivots 52, 53 permit pivoting movement of the legs 40, 41 and 46, 47 respectively about the central pivots 52, 53 in opposite directions, as will be described. The pivoting movement of the legs 40, 41 and 46, 47 about the central pivots 52, 53 respectively moves the adjustable bed carriage 30 between an extended condition (FIGS. 1–4, 7, 8, 9A, 9B and 10) and a retracted condition (FIGS. 5, 6).

Figure 3:
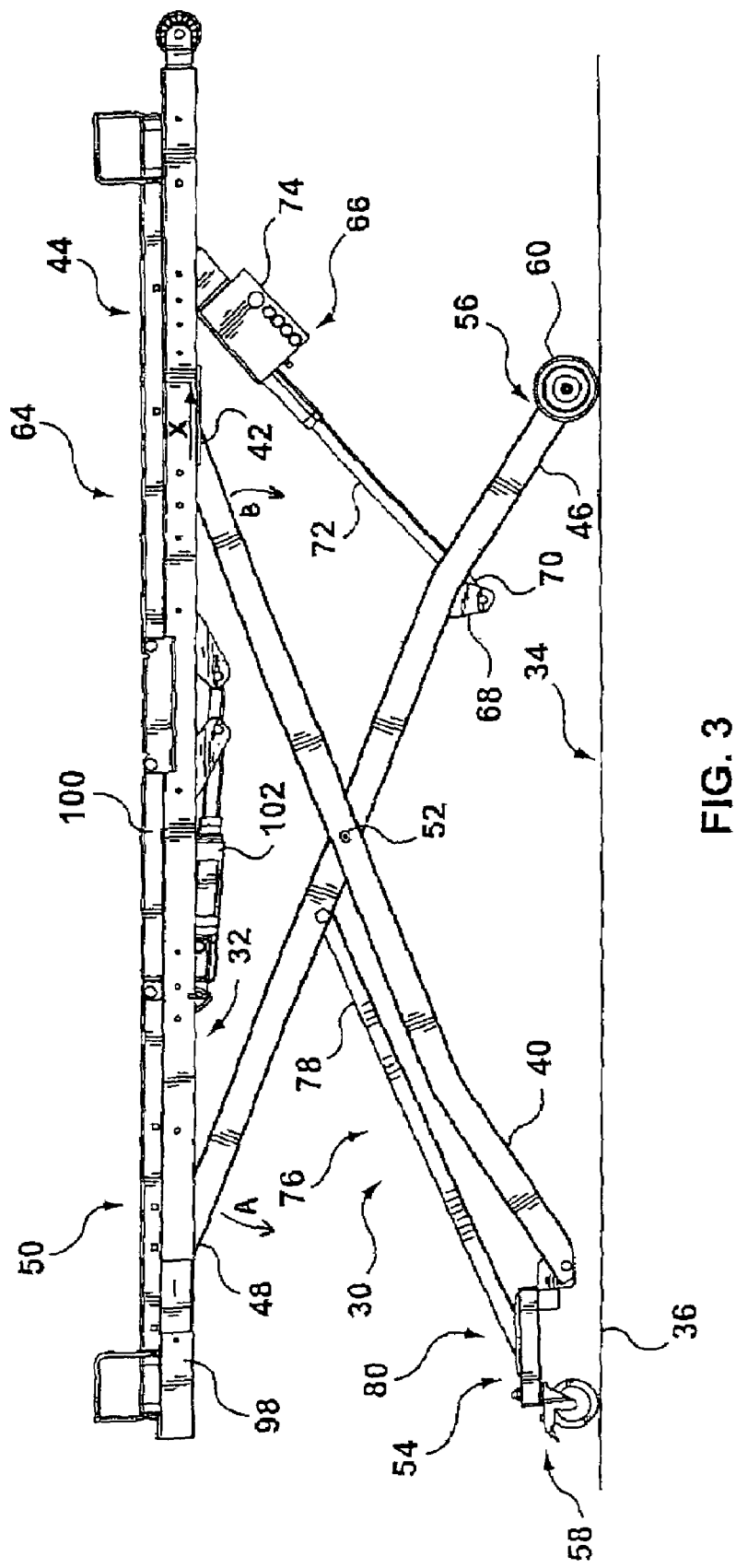
FIG. 3 is a side view of a right side of the adjustable bed carriage of FIG. 1 and of the main bed frame.
Figure 4:
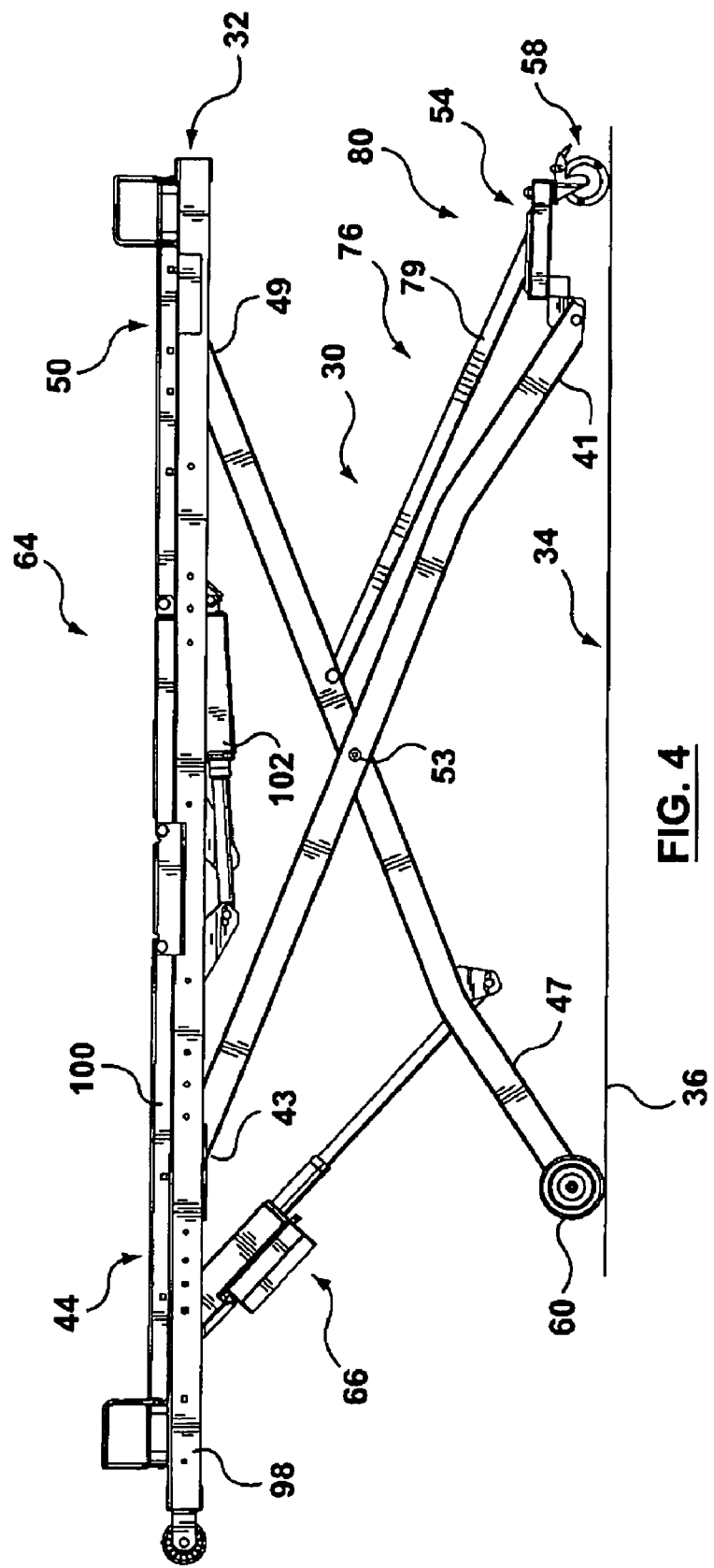
FIG. 4 is a side view of a left side of the adjustable bed carriage of FIG. 1 and of the main bed fame.

In the preferred embodiment, pivoting movement of the legs 46, 47 results in a corresponding pivoting movement of the legs 40, 41 to move the adjustable bed carriage between the extended condition and the retracted condition, so that the main bed frame 32 is thereby moved between a fully raised position (FIGS. 1–4, 7, 8) in which the adjustable bed carriage 30 is in the extended condition and a fully lowered position (FIGS. 5, 6), in which the adjustable bed carriage 30 is in the retracted condition. For example, as shown in FIG. 3, pivoting movement of the leg 46 in the direction indicated by arrow "A" would result in pivoting movement of the leg 40 in the direction of arrow "B". Also, the pivoting movement of the second leg 46 results in sliding movement of the upper end of the first leg 40 in the direction of arrow "X" in FIG. 3.

As can be seen in FIGS. 1–8, the first legs 40, 41 preferably include a first leg base 54, and the second legs 46, 47 preferably include one or more second leg bases 56. In the preferred embodiment, the first leg base 54 includes one or more casters 58, and the second leg base 56 includes one or more wheels 60. It will be appreciated by those skilled in the art, however, that various devices may be included in the first leg base 54 and the second leg base 56 for engaging the floor 34. For example, each of the first leg base 54 and the second leg base 56 may include one or more casters, one or more wheels, or one or more feet for engaging the floor 34.

A preferred embodiment of an adjustable bed 64 of the invention includes the main bed frame 32 and the adjustable bed carriage 30 for supporting the main bed frame 32 on a substantially planar floor 34. Preferably, the adjustable bed 64 includes a motor 66 mounted on the main bed frame 32 and coupled to the adjustable bed carriage 30, for positioning the adjustable bed carriage 30. Although various types of motors could be used, the preferred motor 66 is a linear screw drive motor powered by electricity, as is known in the art. As shown in FIG. 9B, the motor 66 is preferably pivotably mounted on the main bed frame 32 and pivotably mounted on the second leg 46. In the preferred embodiment, the second legs 46, 47 each include a downwardly depending flange 68 in which a distal end 70 of the motor 66 is mounted, as will be described. When the adjustable bed carriage 30 is to be moved from the extended condition (FIG. 9B) (or from an intermediate position) to or towards the retracted condition, a movable portion 72 is retracted into a motor body 74 in a controlled manner, in the direction shown by arrow "C" in FIG. 9B. When the adjustable bed carriage 30 is to be moved from the retracted condition (FIG. 11B) (or from an intermediate position) to or towards the extended condition, the movable portion 72 is pushed outwardly from the motor body 74 in the direction of arrow "D" in FIG. 11B.

In the preferred embodiment, the adjustable bed 64 includes a linkage assembly (also referred to as a scissor leg assembly) 76 which includes the adjustable bed carriage 30 with follower struts 78, 79 (FIGS. 1–4), as will be described. As can be seen in FIGS. 1–4, the first legs 40, 41 include a caster base 80 positioned distal to the first end 44 of the main bed frame 32. The caster base 80 includes one or more casters 58 for engaging the floor 34.

Preferably, the caster base 80 is disposed in a preselected position relative to a plane 36 of the floor 34 when the linkage assembly is in the extended condition, as shown in FIGS. 12A, 12B. The follower struts 78, 79 each have respective upper ends 81, 82 and lower ends 83, 84. As can be seen in FIGS. 1, 2 and 9B, in the preferred embodiment, the lower ends 83, 84 are pivotably attached to the caster base 80. The upper ends 81, 82 of the follower struts 78, 79 are pivotably attached to the second legs 46, 47 respectively (FIG. 9B). This pivotable attachment is at predetermined pivot points 86, 87 on the second legs 46, 47 above the central pivots 52, 53. The predetermined pivot points 86, 87 are selected so that the follower struts 78, 79 can act on the caster base 80 to maintain the caster base 80 substantially in the preselected position relative to the plane 36 of the floor 34 as the linkage assembly 76 moves between the extended and retracted conditions.

As can be seen in FIGS. 12A, 12B, 13A, 13B, 14A, 14B, 15A, and 15B, in the preferred embodiment, the follower struts 78, 79 only maintain the caster base 80 in substantially the preselected position relative to the plane 36. Generally, for example, a top surface 88 which is substantially planar is approximately horizontal in FIG. 12A. However, the top surface 88 may be gradually inclined, up to approximately 3–5° from the horizontal (FIGS. 13B, 14B, 15B), as the linkage assembly is moved to the retracted position.

The follower struts 78, 79 form a "modified" parallelogram with the legs 40, 41 and portions of the legs 46, 47, i.e., they preferably do not form a perfect parallelogram. The location of the follower struts does not provide perfect alignment, as a perfect parallelogram would, but is optimized to provide the best alignment possible. As the bed is raised, the angle changes above and below horizontal so that the bed has a level surface at the highest and lowest positions while maintaining a substantially level surface through the range of motion from high to low.

In the preferred embodiment, the caster base 80 includes one or more locator elements 89, 90 to which the lower ends 83, 84 of the follower struts 78, 79 are pivotably attached. Each of the locator elements 89, 90 is positioned so as to enable the follower struts 78, 79 to maintain the caster base 80 in substantially the preselected position relative to the plane 36 of the floor 34.

Figure 9A:
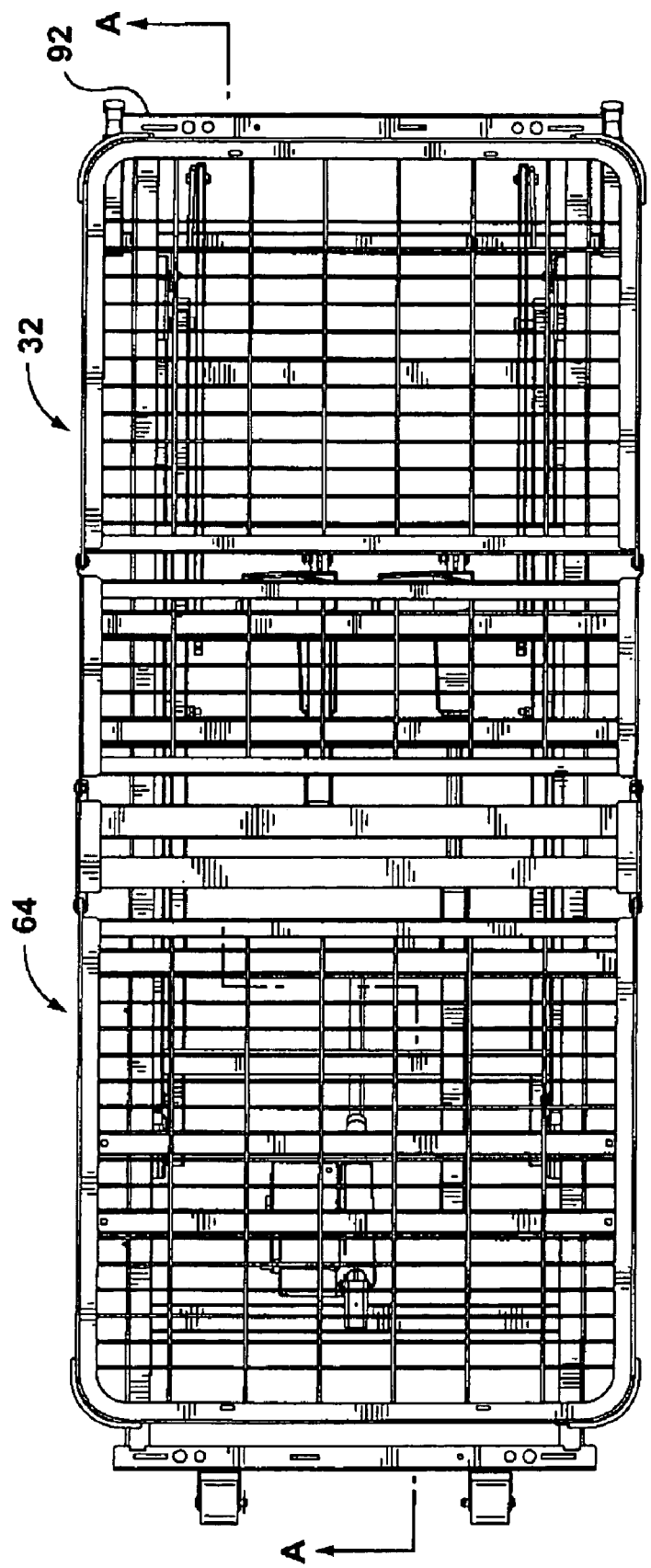
FIG. 9A is a top view of the adjustable bed carriage of FIG. 1 in the extended condition, as well as the main bed frame.
Figure 9B:
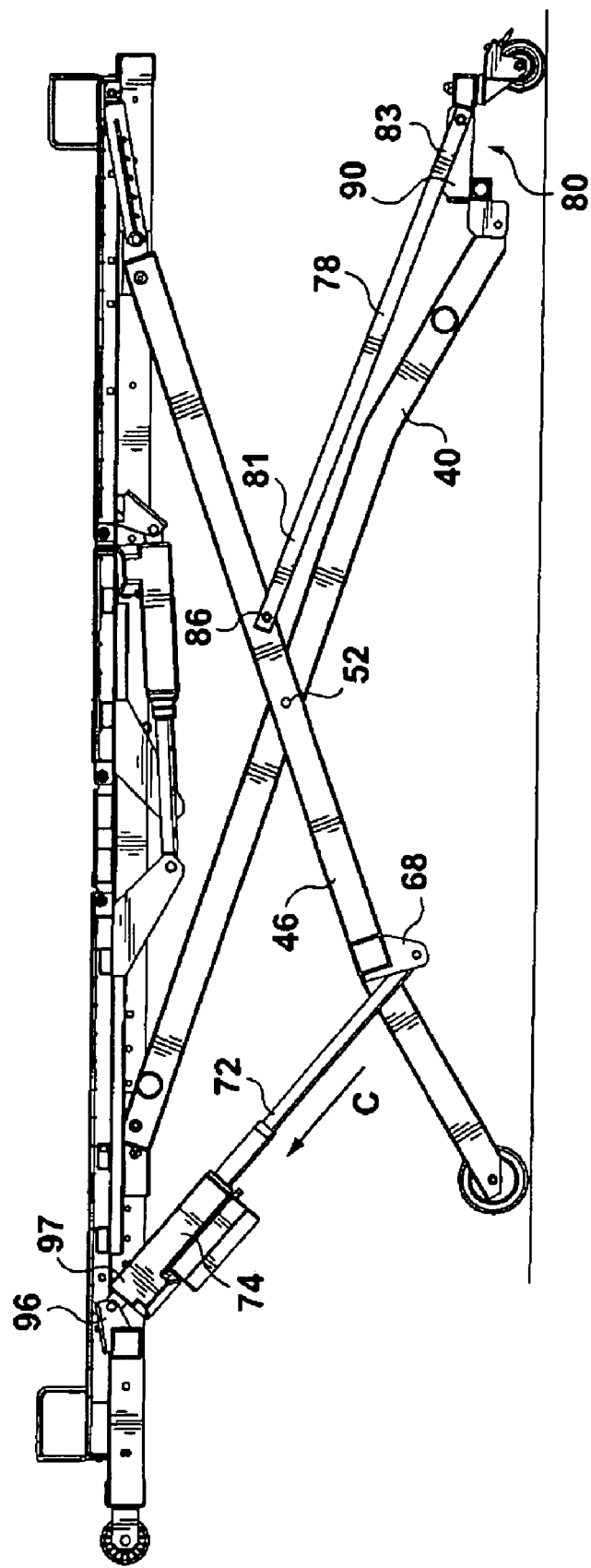
FIG. 9B is a section view of the adjustable bed carriage of FIG. 9A and the main bed frame, taken along line A—A in FIG. 9A.
Figure 10:
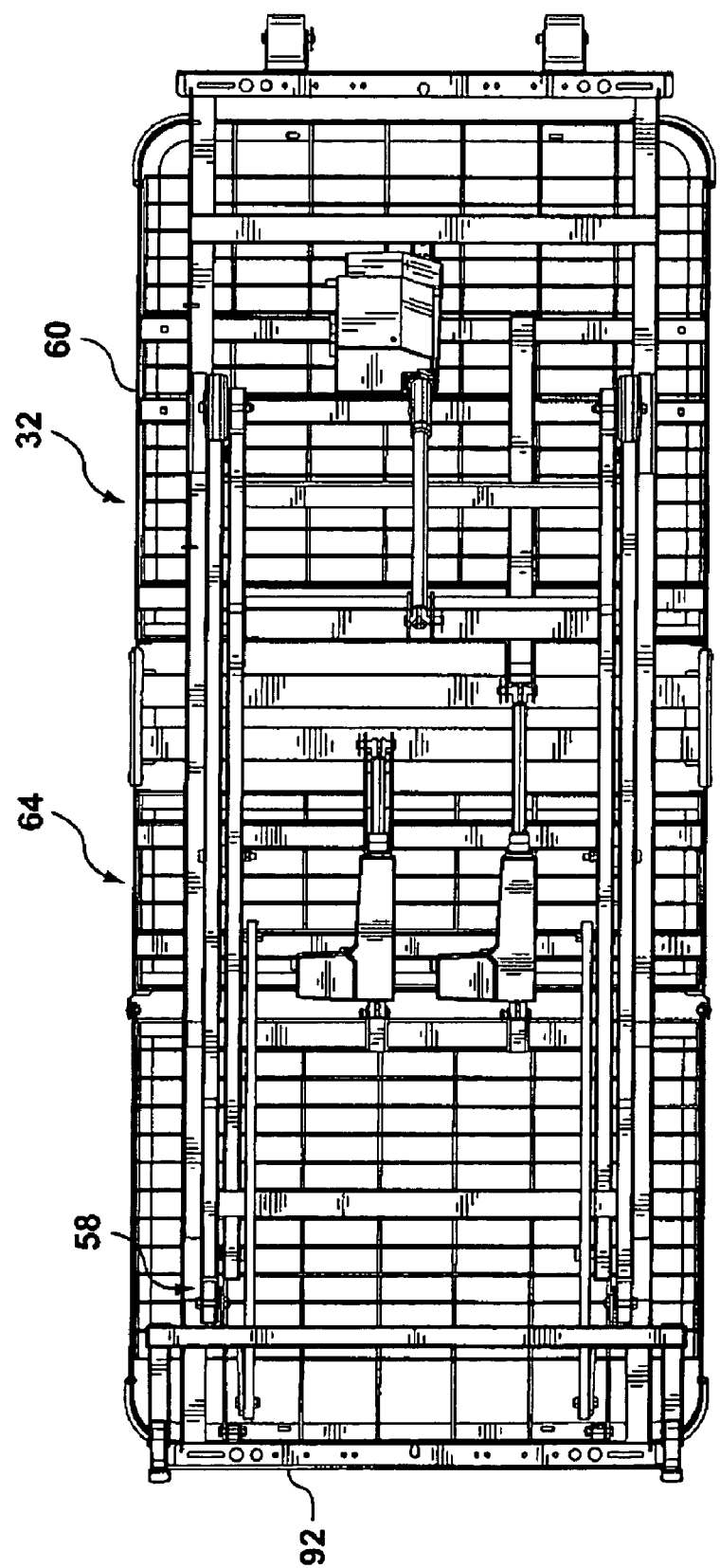
FIG. 10 is a bottom view of the adjustable bed carriage of FIG. 1 in the extended condition and of the main bed frame.
Figure 14A:
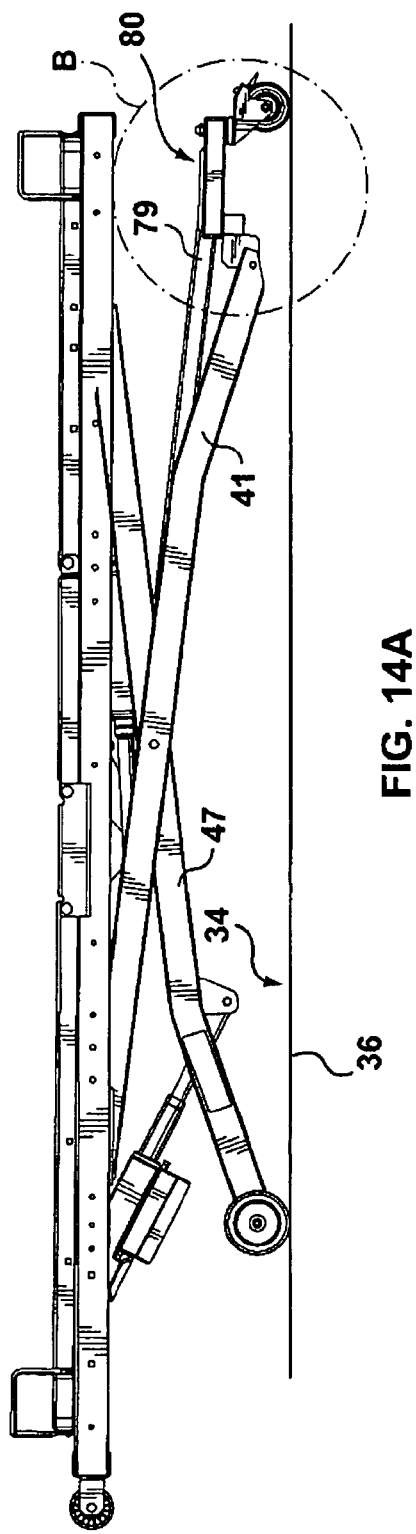
FIG. 14A is a side view of the adjustable bed carriage of FIG. 12A and the main bed frame, with the adjustable bed carriage in a second intermediate condition, drawn at a smaller scale.
Figure 14B:
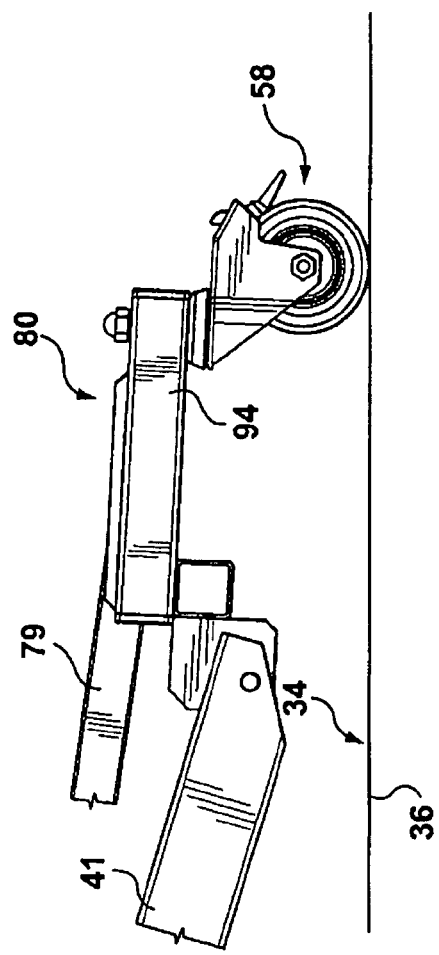
FIG. 14B is a side view of the caster base included in the adjustable bed carriage of FIG. 14A, drawn at a larger scale.
Figure 15A:
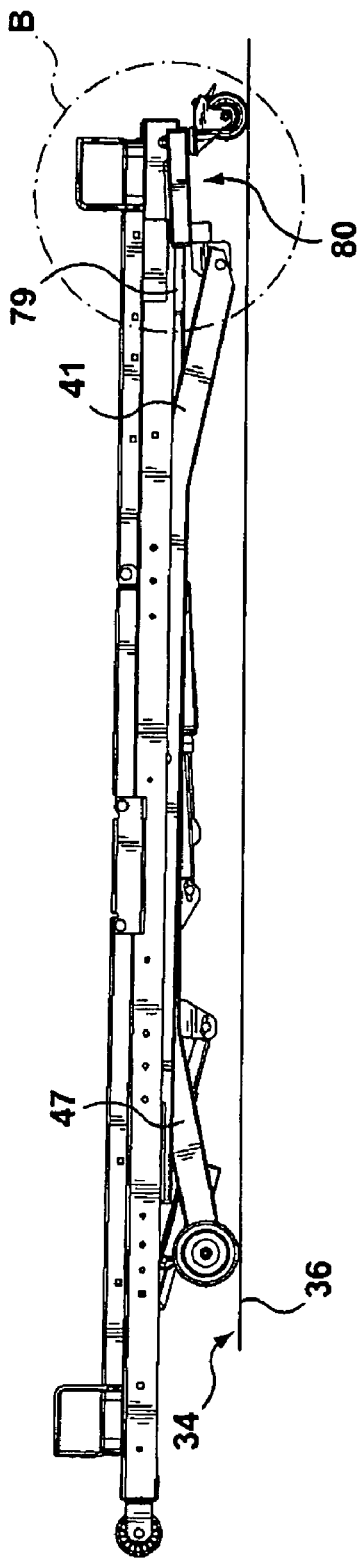
FIG. 15A is a side view of the adjustable bed carriage of FIG. 12A and the main bed frame, with the adjustable bed carriage in the retracted condition, drawn at a smaller scale.
Figure 15B:
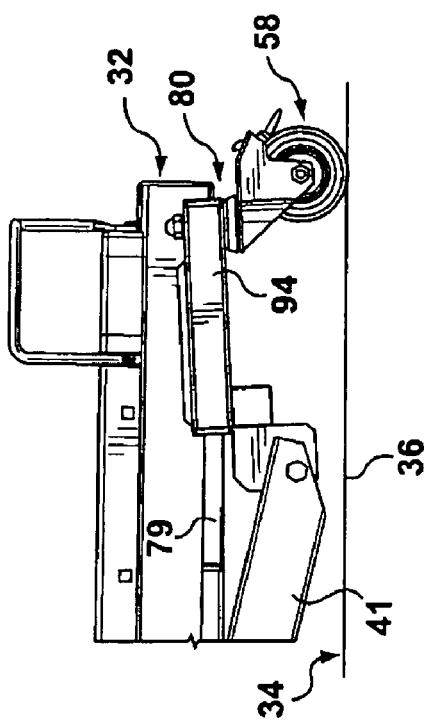
FIG. 15B is a side view of the caster base included in the adjustable bed carriage of FIG. 15A, drawn at a larger scale.

Preferably, main bed frame 32 defines a footprint periphery 90 circumscribing the perimeter of the main bed frame 32 (FIGS. 9A, 10, 11A). In addition, the caster base 80 includes one or more mounting brackets 94 positioned, at least in part, adjacent to footprint periphery 92. Due to the positioning of the mounting brackets 94, caster locks (i.e., brake activator/deactivators) on the casters 58 are readily accessible by an operator (not shown), even when the adjustable bed carriage 30 is in the retracted condition, as shown in FIG. 11A.

In use, the motor 66 is activated by a switch or other control means (not shown), as is known in the art, if movement of the linkage assembly 76 between the extended condition and the retracted condition, and consequent movement of the main bed frame 32 relative to the plane 36 of the floor 34, is desired. For example, referring to FIGS. 12A, 13A, 14A, and 15A, to move the linkage assembly 76 from the extended condition (FIG. 12A) to the retracted condition (FIG. 51A), the movable portion 72 is retracted into the motor body 74. Retracting of the movable portion 72 is controlled by an electric motor in the motor body 74, thereby ensuring that the retracting is at a desired rate (i.e., controlled by an operator (not shown)). Also, as will be appreciated by those skilled in the art, the retraction could be stopped, if the operator wishes to have the linkage assembly remain at any position intermediate between the extended and retracted conditions. The motor 66 holds the adjustable bed carriage 30 in the intermediate position.

Preferably, and as shown in FIG. 9B, the motor 66 is pivotably mounted to a flange 96 which is secured to the main bed frame 32. The flange 96 is positioned so as to locate an upper end 97 of the motor 66 as high (in relation to the plane 36 of the floor 34) as is feasible. Also, the flange 96 is positioned as low (in relation to the plane 36 of the floor 34) as is feasible. The result is that the initial raising force required to raise the linkage assembly from the retracted condition (FIGS. 11B, 15B) is relatively low.

It will be appreciated by those skilled in the art that the main bed frame 32 can comprise a chassis portion 98 and deck portions 100 mounted on the chassis portion 98 (FIG. 2). The main deck portions 100 (which would support a mattress (not shown) when in use) are positionable in a variety of positions relative to the chassis portion 98, as is known in the art For example, the deck portions 100 are positionable so as to allow adjustable head and foot elevation, so that the patient can be positioned as necessary. Preferably, motors 102 are used to position deck portions 100 accordingly, as is known in the art.

Preferably, the legs 40, 41 and 46, 47 are configured so as to provide maximum clearance between the floor 34 and the adjustable bed carriage 30 through a middle portion of the adjustable bed carriage 30, when in the retracted condition (FIGS. 5, 6). As shown in FIGS. 5 and 6, because the legs 40, 41 and 46, 47 each include lower ends which are bent relative to the substantially straight elongate other portions of the legs 40, 41, 46, 47, such clearance is provided in the middle portion of the adjustable bed carriage 30 when the adjustable bed carriage is in the retracted condition. Preferably, the bent portion is aligned at a significant angle (e.g., up to approximately 11.5°) from the axis of the main portions of each leg. Due to the clearance, lift devices, movable tables and other devices for use by or with a patient (not shown) which require clearance under the adjustable bed carriage 30 for their operation can be used, when the adjustable bed carriage 30 is at any height.

The adjustable bed carriage 30 has the advantage of including slidable connections only where the first legs 40, 41 are connected to the main bed frame 32. The second legs 46, 47 are only pivotably connected to the main bed frame 32, rather than also being slidably connected. The cost of manufacturing the adjustable bed carriage 30 is thereby significantly reduced, and its operation is much simpler, and therefore more reliable.

Additional embodiments of the invention are shown in FIGS. 16A, 16B, 17–20, 21A–21F, and 22–45. In FIGS. 16A, 16B, 17–20, 21A–21F, and 22–45, elements are numbered so as to correspond to like elements shown in FIGS. 1 to 15B inclusive.

Figure 16A:
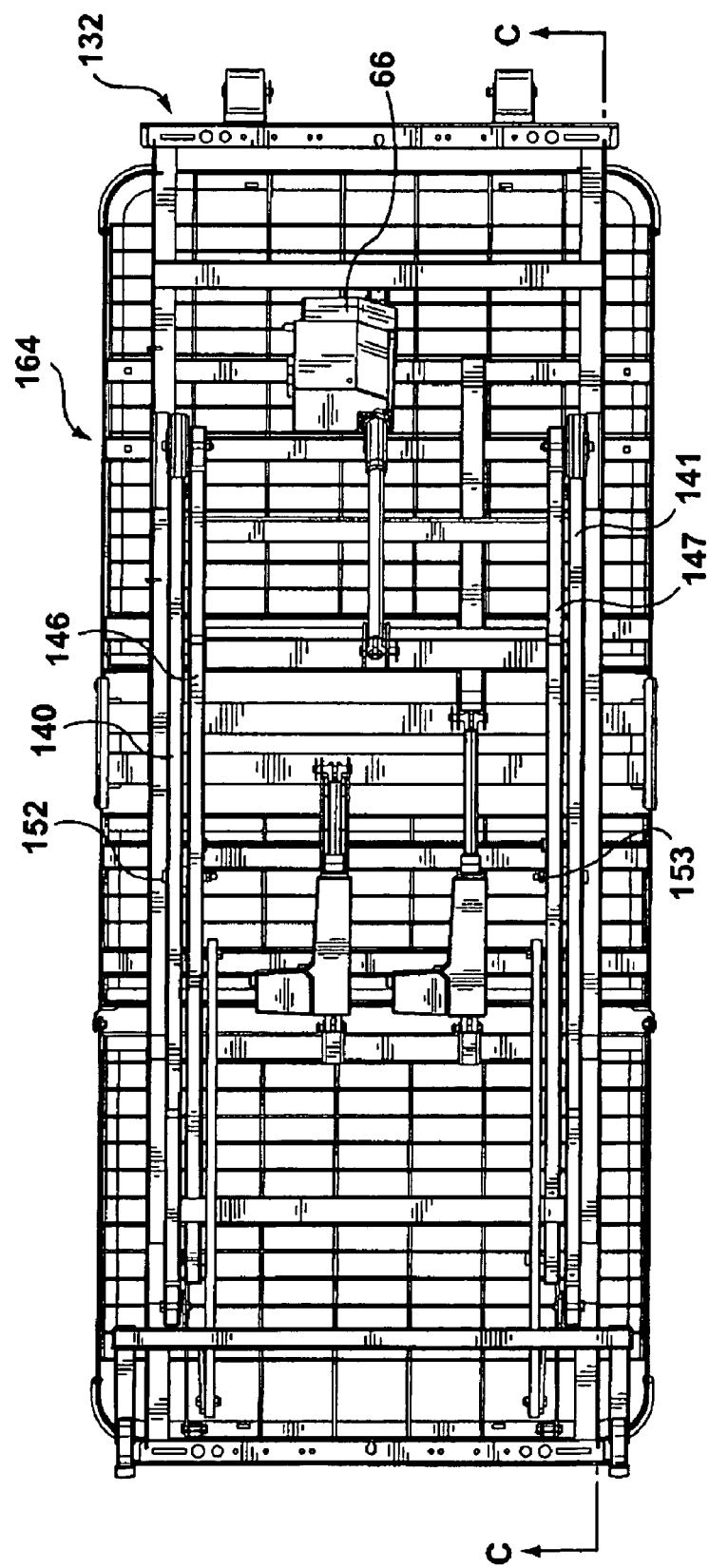
FIG. 16A is a bottom view of an alternative embodiment of the adjustable bed, drawn at a smaller scale.
Figure 16B:
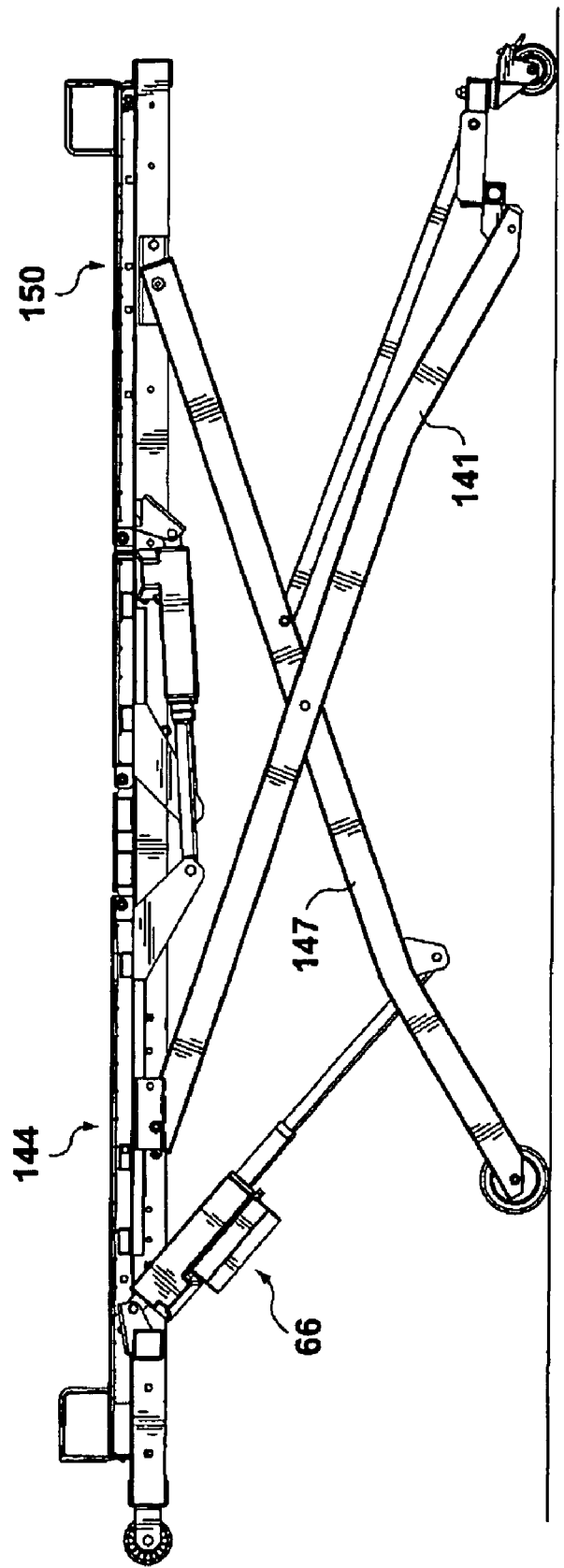
FIG. 16B is a section view of the adjustable bed of FIG. 16A, taken along line C—C in FIG. 16A.

In another embodiment shown in FIGS. 16A and 16B, an adjustable bed 164 has an adjustable bed carriage 130 in which the first legs 140, 141 are pivotably connected to the main bed frame 132 at a first end 144 and the second legs 146, 147 are slidably connected to the main bed frame 132 at a second end 150. As can be seen in FIG. 16b, the motor 66 is preferably mounted on the main bed frame 132 and pivotably connected to the adjustable bed carriage 130. More particularly, the motor 66 is preferably pivotably connected to the second legs 46, 47 at a point below the central pivots.

Figure 17:
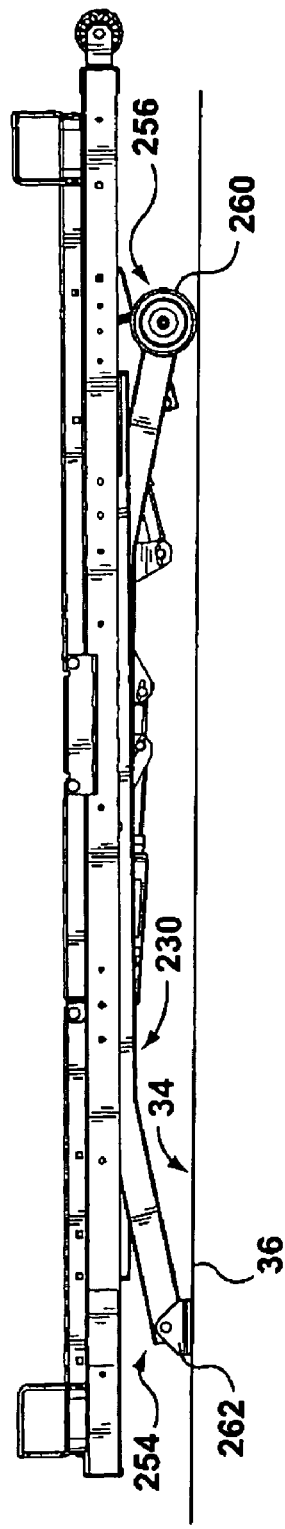
FIG. 17 is a side view of an alternative embodiment of the adjustable bed showing the adjustable bed carriage in the retracted condition.

In an alternative embodiment, shown in FIG. 17, an adjustable bed carriage 230 includes a first leg base 254 including one or more foot elements 262 for engaging the floor 34. As can be seen in FIG. 17, the adjustable bed carriage 230 additionally includes a second leg base 256 including wheels 260.

Figure 18:
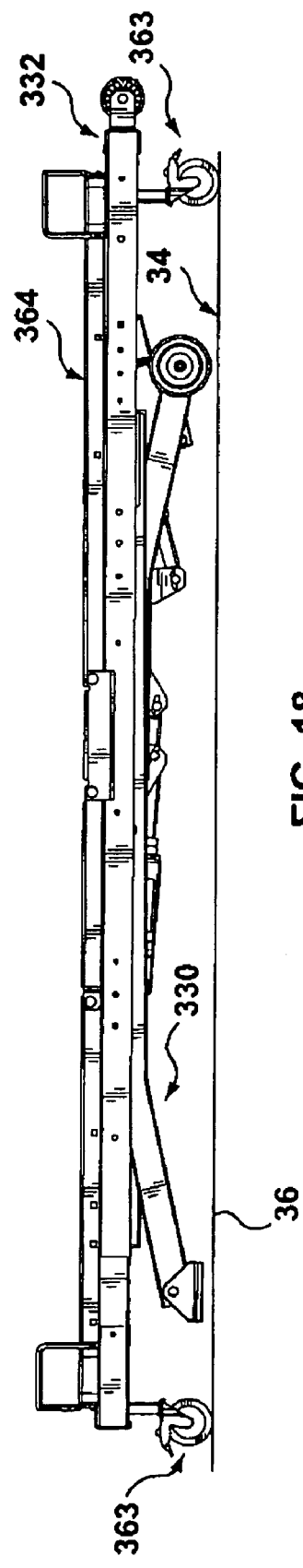
FIG. 18 is a side view of another alternative embodiment of the adjustable bed showing the adjustable bed carriage in the retracted condition.

In another alternative embodiment, an adjustable bed 364 includes one or more casters 363 mounted on the main bed frame 332. As shown in FIG. 18, the casters 63 are mounted so that, when the adjustable bed carriage 330 is in the retracted condition, the casters 363 engage the floor 34. Accordingly, the adjustable bed 364 can be moved on the casters 363 when the adjustable bed carriage 330 is in the retracted condition.

In another alternative embodiment, an adjustable bed 464 (shown in FIGS. 19, 20, 21A–F, and 22–24) includes a lock actuator assembly 404. Preferably, the adjustable bed 464 includes a main bed frame 432 supported by an adjustable bed carriage 430 which includes one or more casters 458. It is preferred that, as is known in the art, casters 458 on the adjustable bed 464 include caster locks (or brakes) (not shown). For example, a Tente-Rollen model 2946 UAP 100 R26-28S45 includes a caster lock or brake which, when activated, prevents rotation of a caster wheel about a caster wheel axis and also prevents a caster housing (in which the caster wheel is mounted) from pivoting about a caster stem. Other locking means can be used instead of caster locks.

Figure 19:
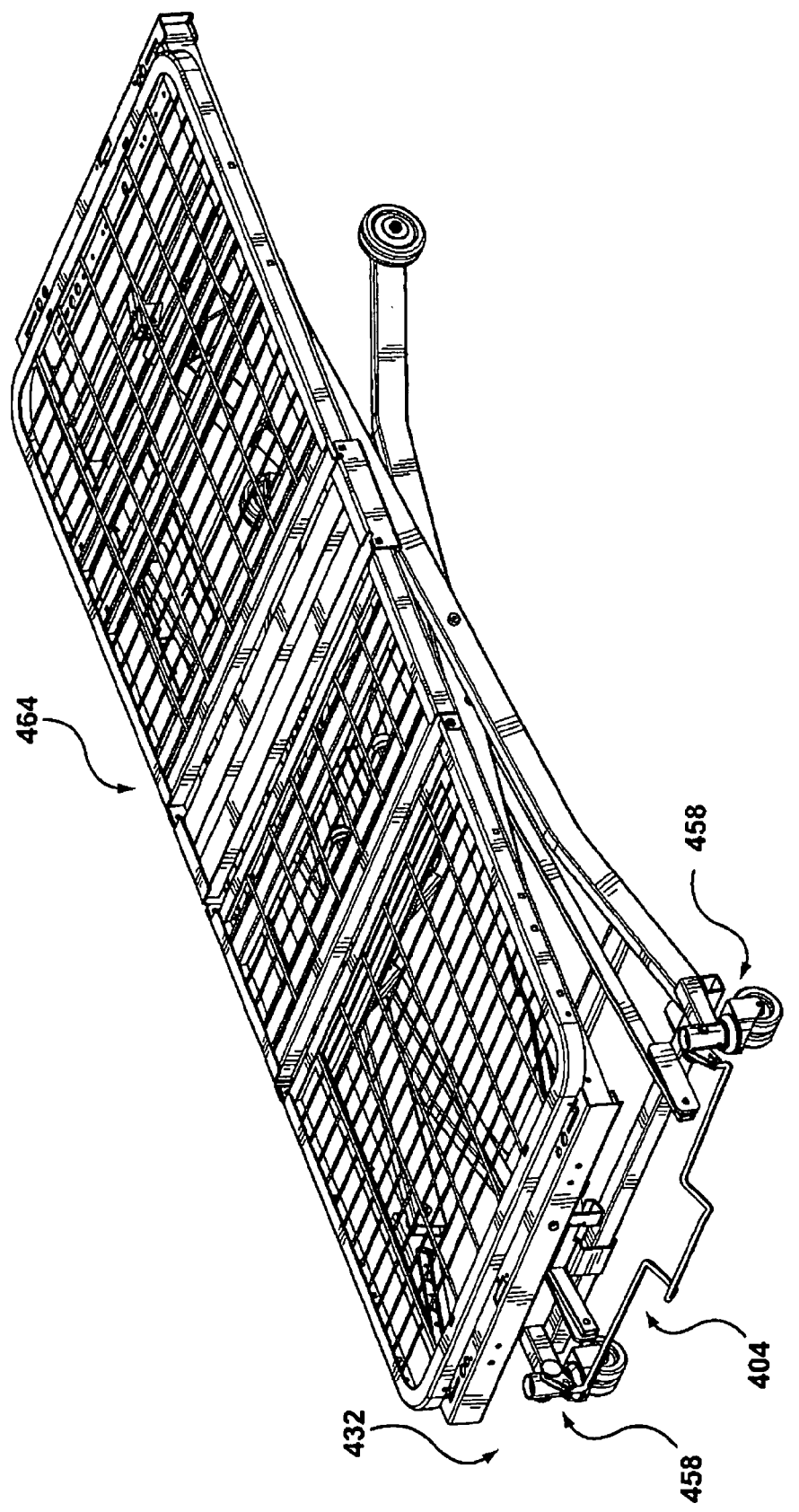
FIG. 19 is an isometric view of another alternative embodiment of an adjustable bed of the invention including an actuator assembly positioned at a front end of the adjustable bed, the adjustable bed carriage thereof being shown in an intermediate condition, drawn at a smaller scale.
Figure 20:
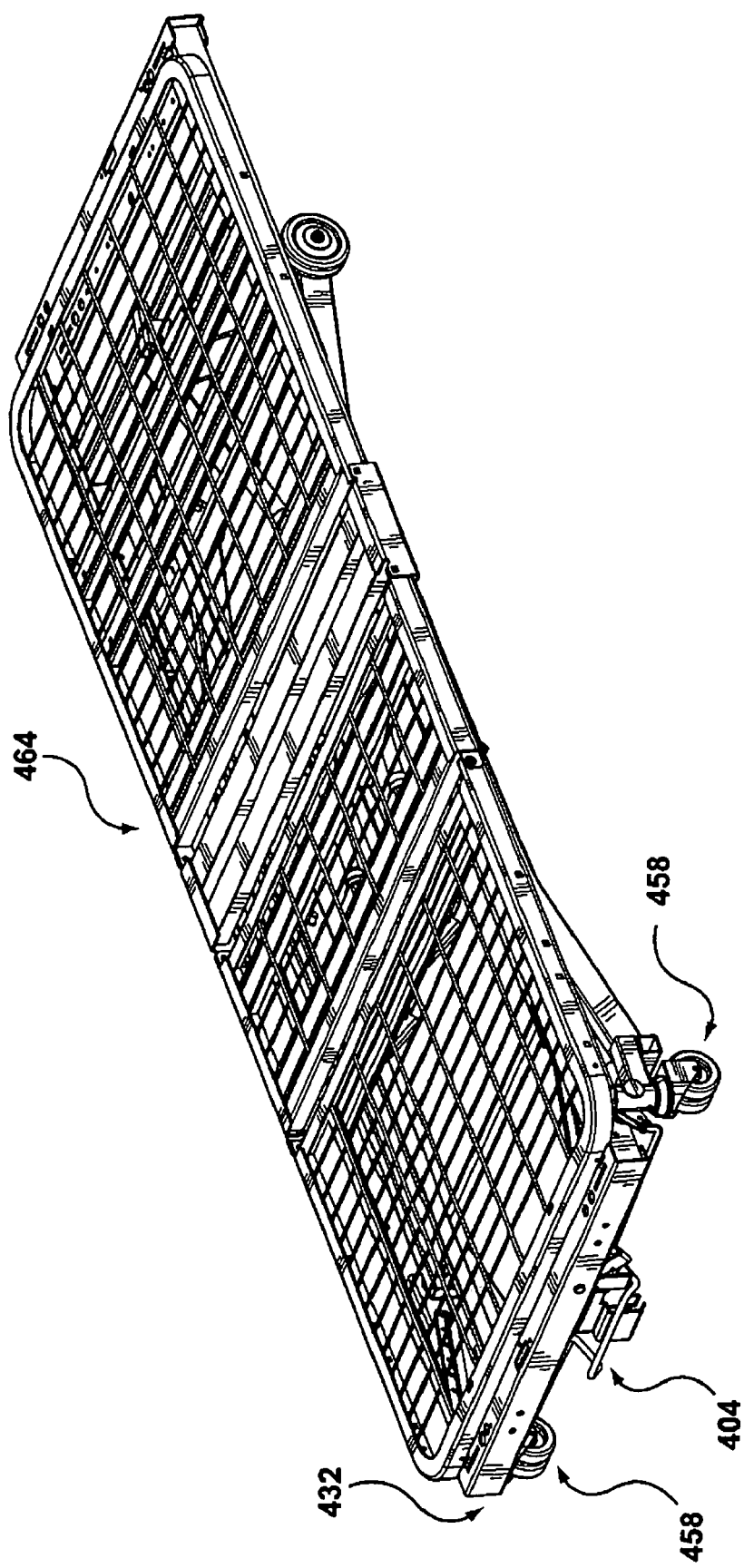
FIG. 20 is an isometric view of the adjustable bed of FIG. 19, showing the adjustable bed carriage in a retracted condition.
Figure 21A:
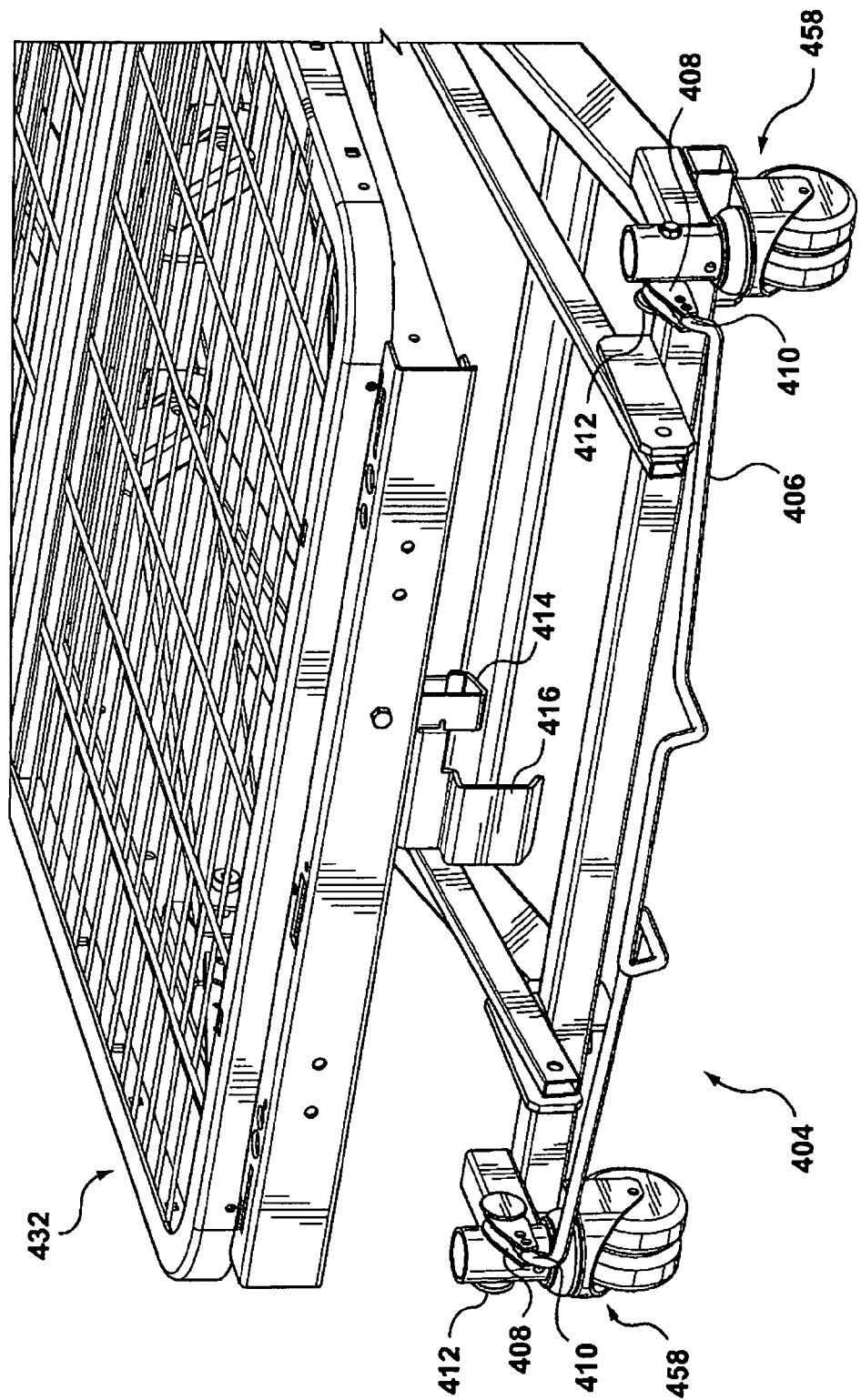
FIG. 21A is an isometric view of the front end of the adjustable bed of FIG. 19 showing the adjustable bed carriage in the intermediate condition, drawn at a larger scale.
Figure 21B:
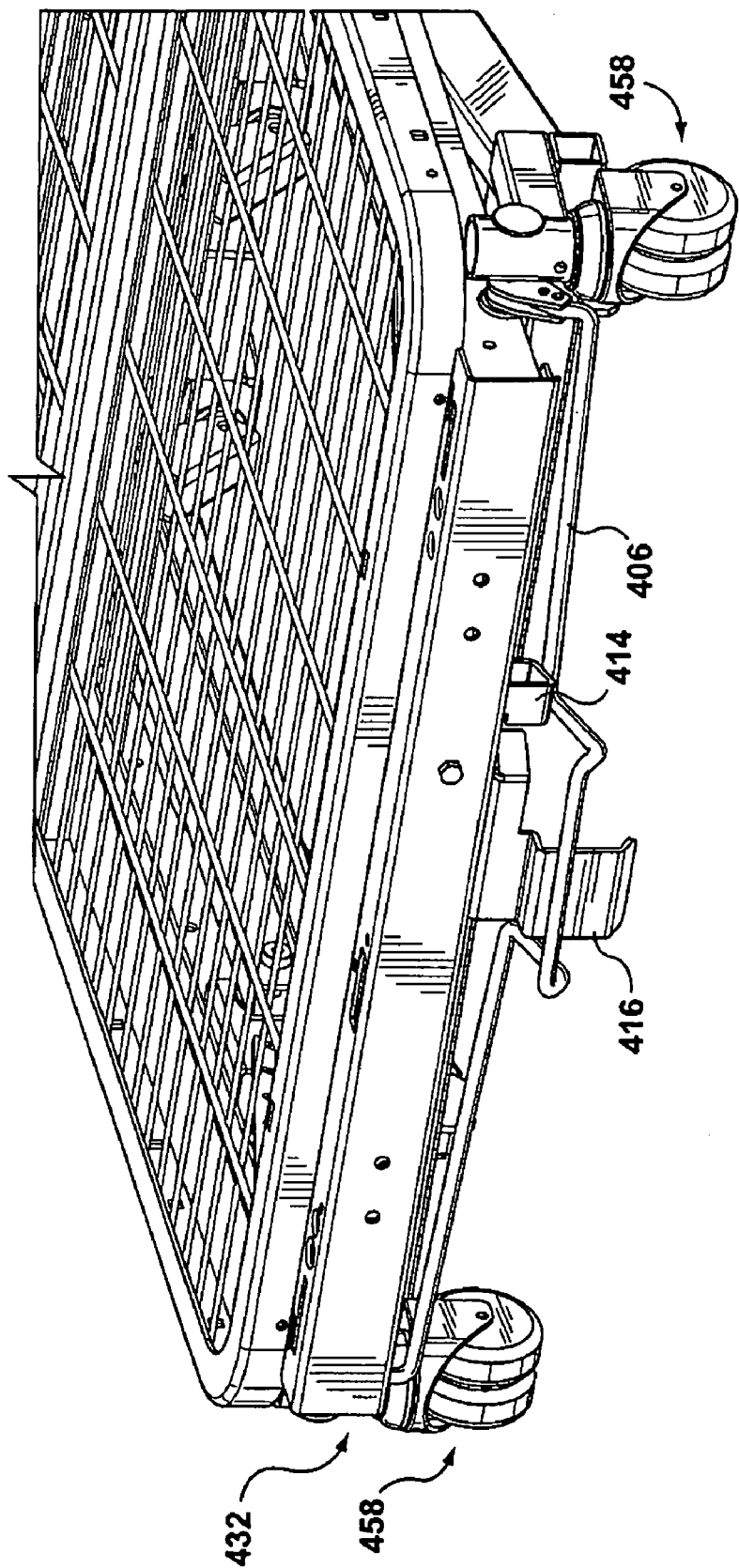
FIG. 21B is an isometric view of the front end of the adjustable bed of FIG. 20 showing the adjustable bed carriage in the retracted condition.
Figure 21C:
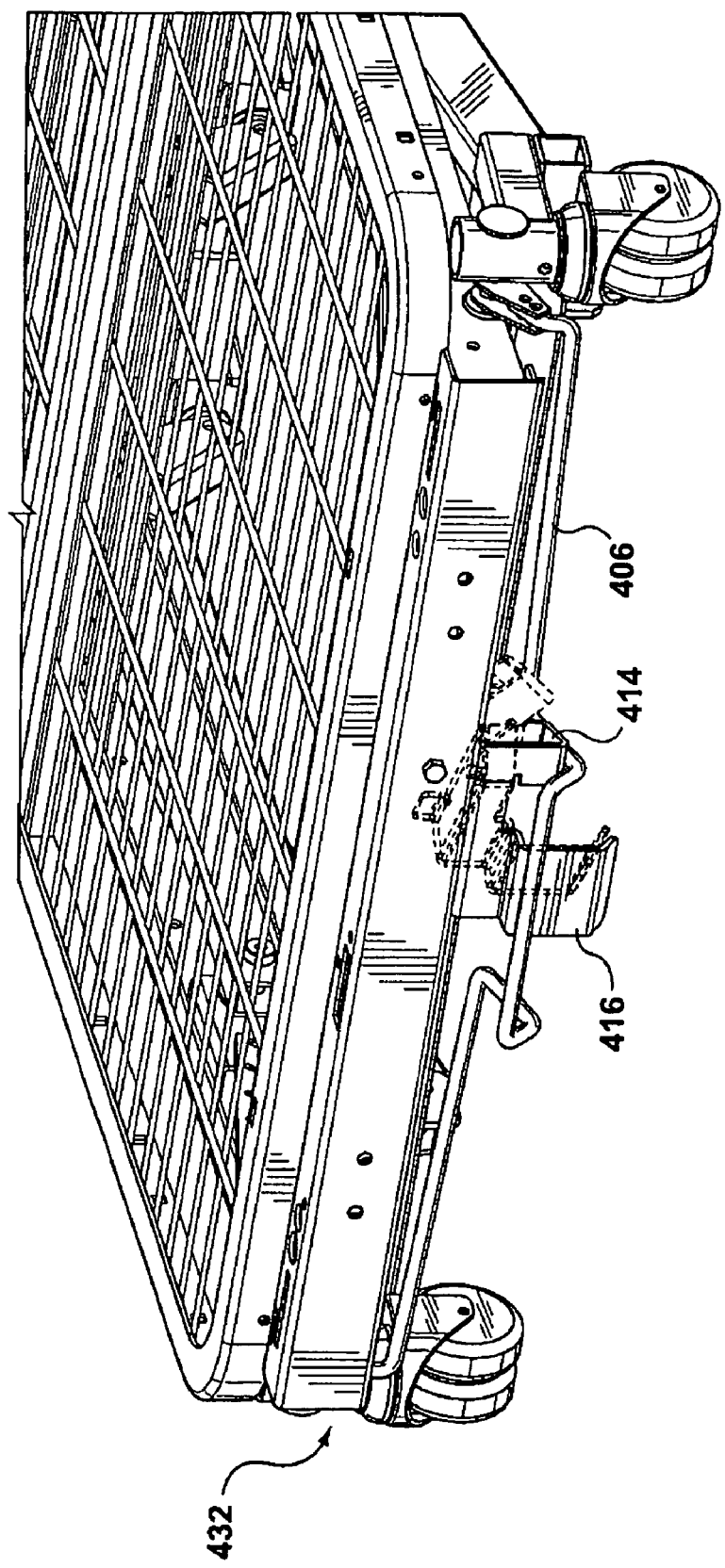
FIG. 21C is an isometric view of the front end of the adjustable bed of FIG. 20 showing the adjustable bed carriage in the retracted condition showing a release mechanism in a released position.
Figure 21D:
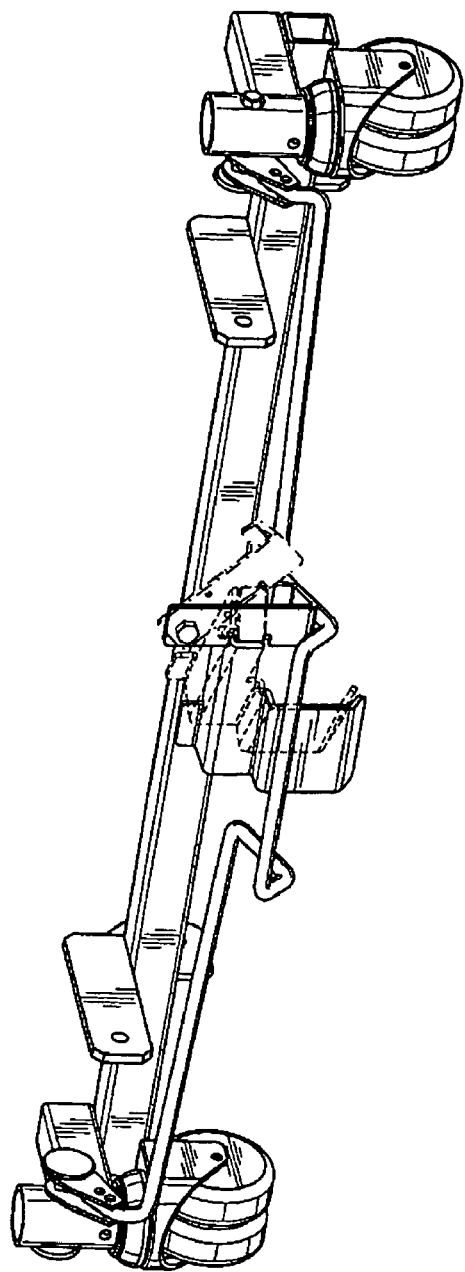
FIG. 21D is a partial isometric view of the actuator assembly and part of the adjustable bed showing the release mechanism in the released position in dotted outline.

Preferably, the lock actuator assembly 404 includes a lock bar 406 secured in two connectors 408, one located at each end 410 of the lock bar 406 (FIGS. 19, 21A, 21B). The connectors 408 are in turn each secured to activators 412 respectively. The lock bar 406 is movable between an activated position (FIG. 20), in which the connectors 408 cause the activators 412 to activate the caster locks, and a deactivated position (FIG. 19), in which the activators 412 are maintained in a position which does not result in activation of the caster locks. Movement of the lock bar 406 from the deactivated position to the activated position results in rotation of the activators 412. This in turn causes the caster locks to lock. Movement of the lock bar 406 from the activated position to the deactivated position causes rotation of the activators in the other directions, so that the caster locks are thereby unlocked.

Preferably, an actuator 414 is mounted on the main bed frame 432, for engaging the lock bar 406 when the main bed frame 432 is moved downwardly to an engagement position (FIG. 20). The lock bar 406 is normally in the deactivated position. It is preferred that the engagement position be at a height which is close (i.e., a relatively small distance above) to the main bed frame's fully lowered position. Upon the main bed frame 432 being lowered to the engagement position, the actuator 414 engages the lock bar 406, urging the lock bar 406 to move from the deactivated position (FIG. 19) to the activated position (FIG. 20). The caster lock is thereby activated.

Figure 21E:
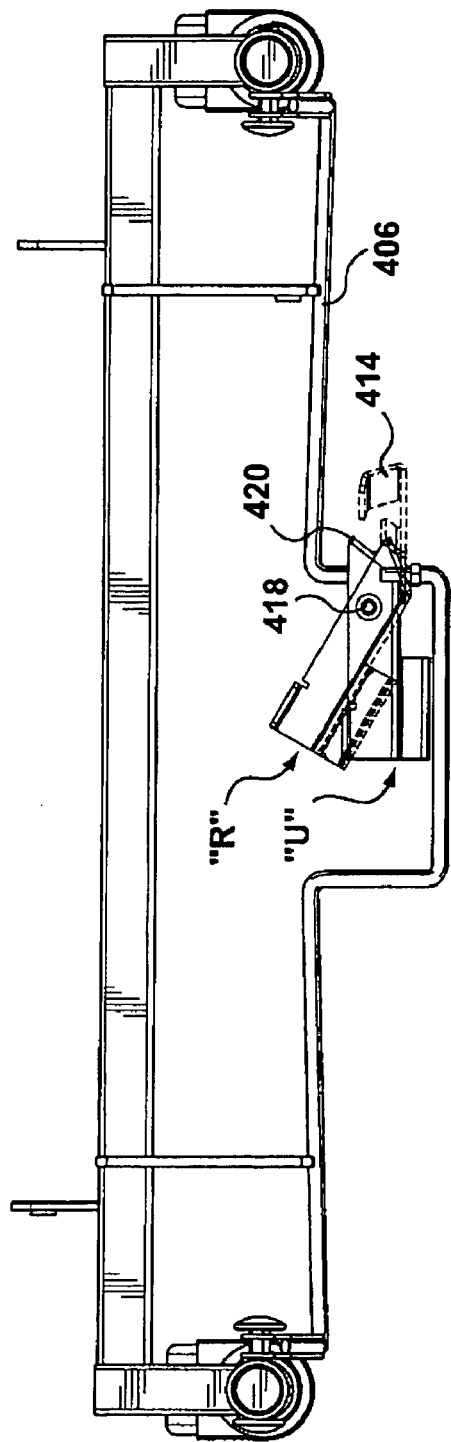
FIG. 21E is a top view of the actuator assembly of FIG. 21D, showing the release mechanism in unreleased and released positions.
Figure 21F:
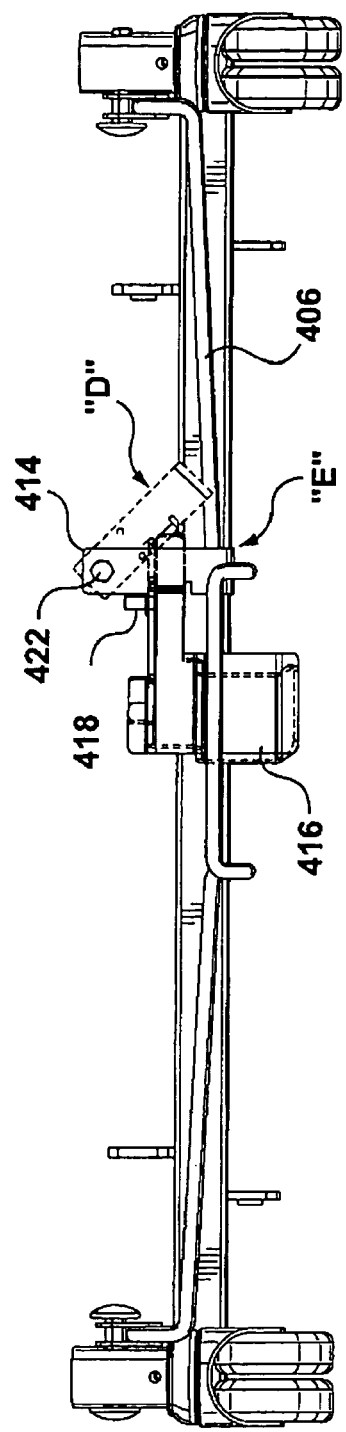
FIG. 21F is a front view of the actuator assembly of FIG. 21D, showing the release mechanism in unreleased and released positions.
Figure 22:
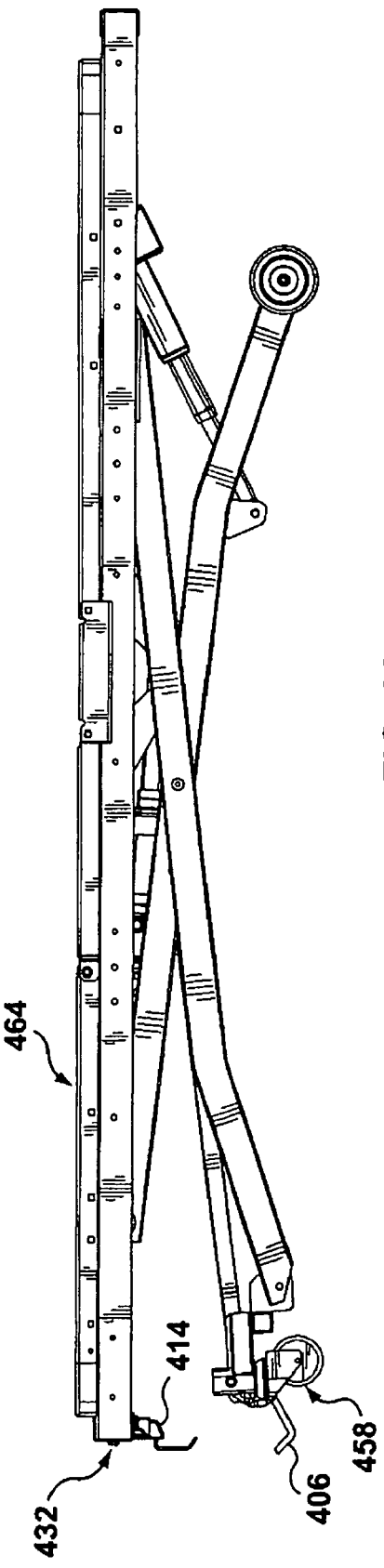
FIG. 22 is a side view of the adjustable bed of FIG. 19, drawn at a smaller scale.
Figure 23:
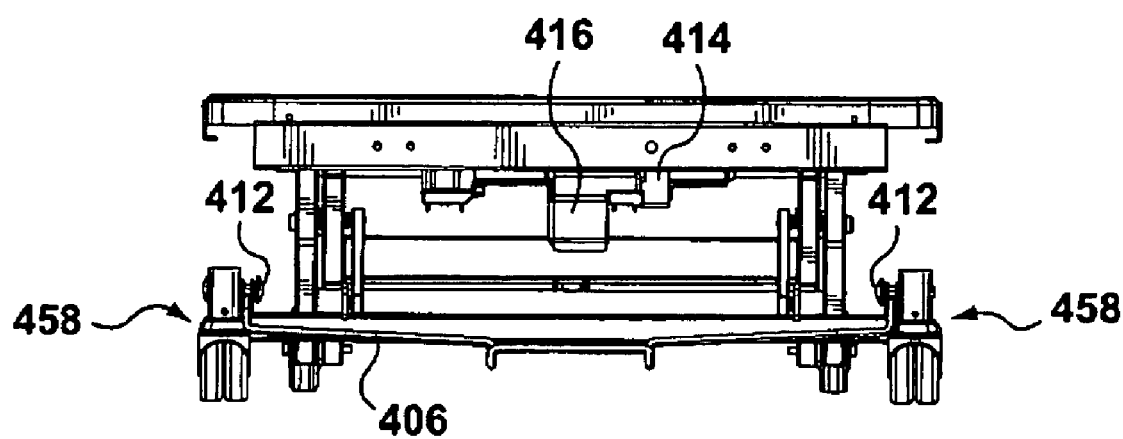
FIG. 23 is an elevation view of the front end of the adjustable bed of FIG. 22.
Figure 24:
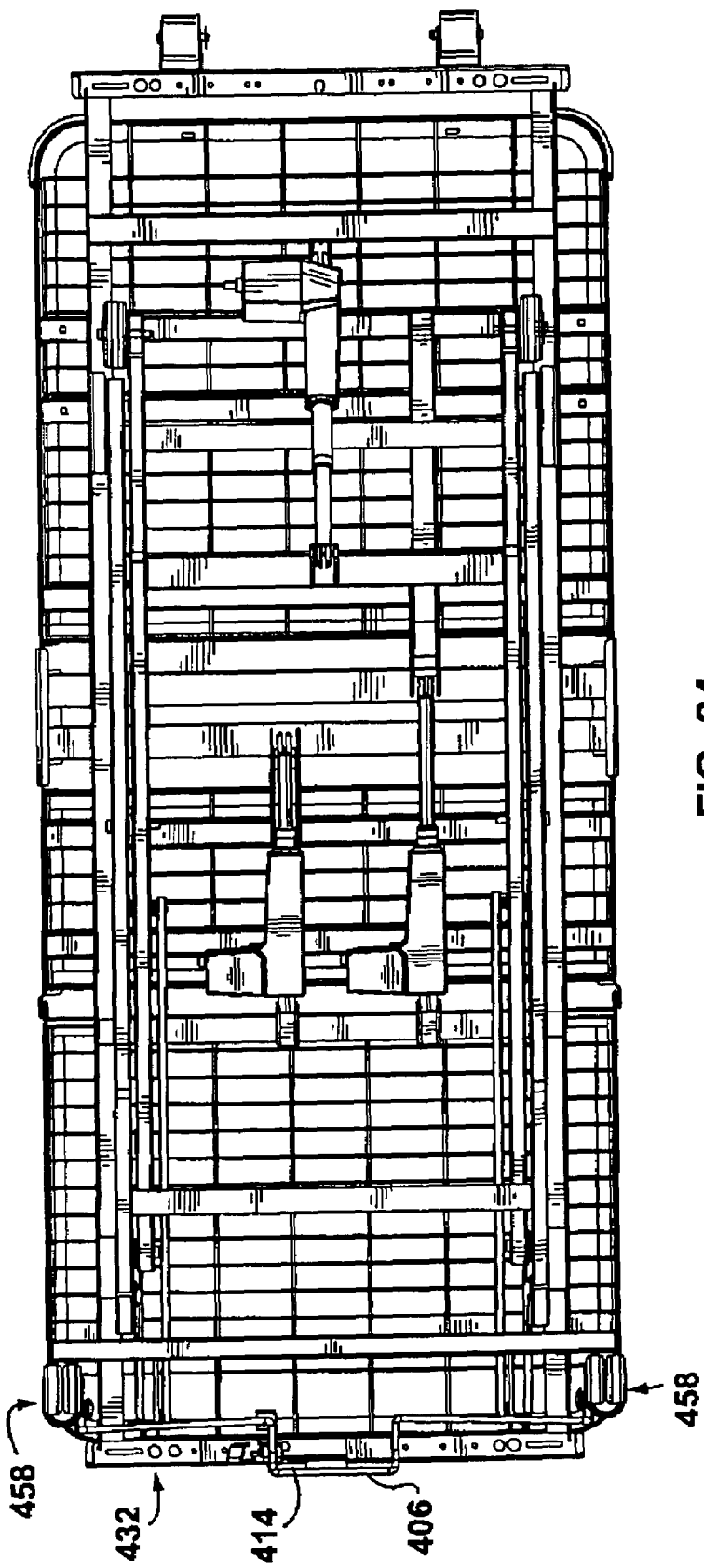
FIG. 24 is a bottom view of the adjustable bed of FIG. 22.

The actuator assembly 404 also includes a release plate 416 which is engageable with the actuator 414. As can be seen in FIGS. 21C, 21D, 21E, and 21F, the release plate 416 is attached to the frame 432 by a pin 418 about which the release plate 416 is pivotable. The release plate includes a bevelled edge 420 which is positioned adjacent to the actuator 414. As can be seen in FIG. 21F, the actuator 414 is also attached to the main bed frame 432 by an actuator pin 422, about which the actuator is also pivotable.

Preferably, the bevelled edge 420 forms a cam surface so that, when the release plate 416 is pivoted about the pin 418, the bevelled edge 420 in turn engages the actuator 414, causing the actuator 414 to move, as follows. As can be seen in FIG. 21E, movement of the release plate 416 from an unreleased position (designated as "U" in FIG. 21E) to a released position (designated as "R" in FIG. 21E) causes the edge 420 to be pushed against the actuator 414. This in turn causes the actuator 414 to pivot about the actuator pin 422, resulting in the disengagement of the actuator 414 from the lock bar 406. In pivoting about the actuator pin 422, the actuator 414 moves from the engaged position (shown as "E" in FIG. 21F) to the disengaged position (shown as "D" in FIG. 21F).

The lock bar 406 is intended to be kept in the locked position during use. The unlocked position is only required when moving the bed, with or without the patient If casters are not locked, problems can result when the patient is trying to enter or exit the bed with no assistance. The automatic activation of a locking mechanism helps solve the problem of accidentally leaving the bed in the unlocked position, where the patient may be vulnerable to unexpected movement of the bed. In practice, the bed is typically lowered to its lowest height for sleeping, or when no treatment is required.

Figure 25:
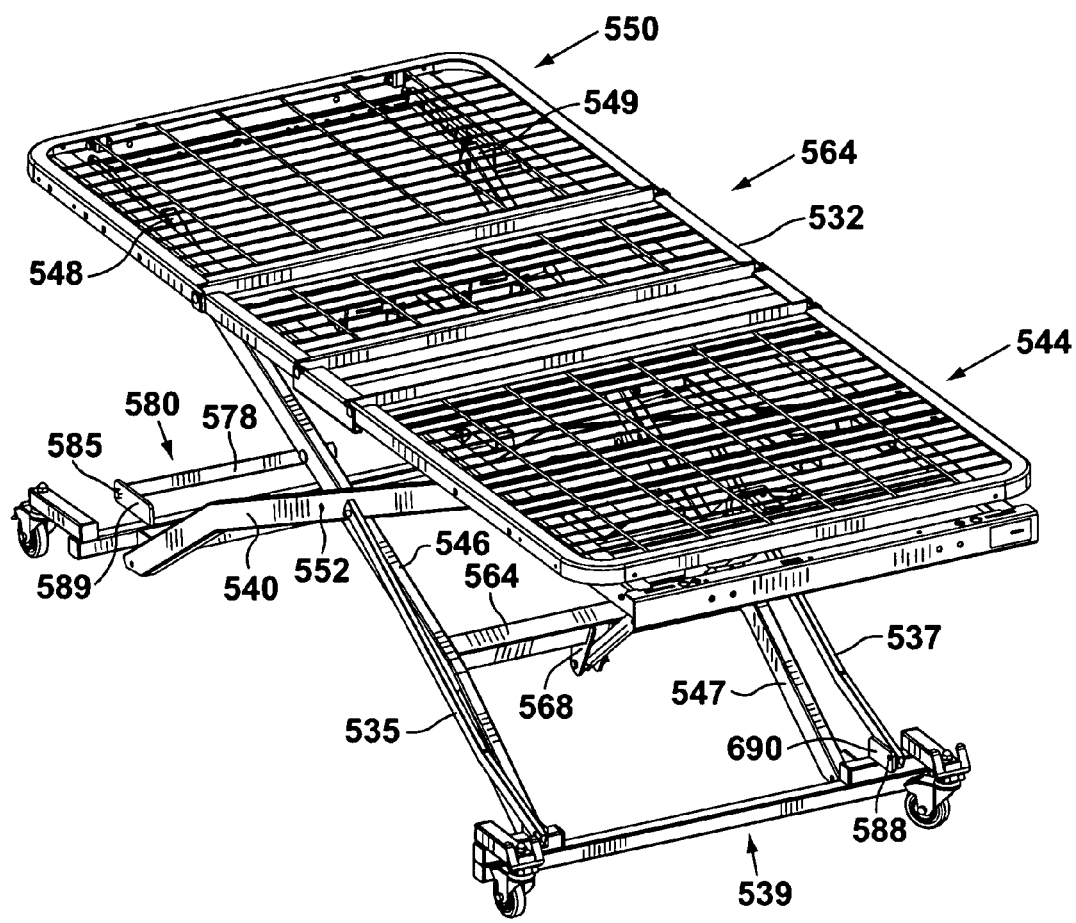
FIG. 25 is an isometric view of an alternative embodiment of an adjustable bed carriage of the invention with a main bed frame positioned thereon, the adjustable bed carriage having casters at its rear side with directional locks mounted thereon in a disengaged state, the adjustable bed carriage being shown in the extended condition.
Figure 25B:
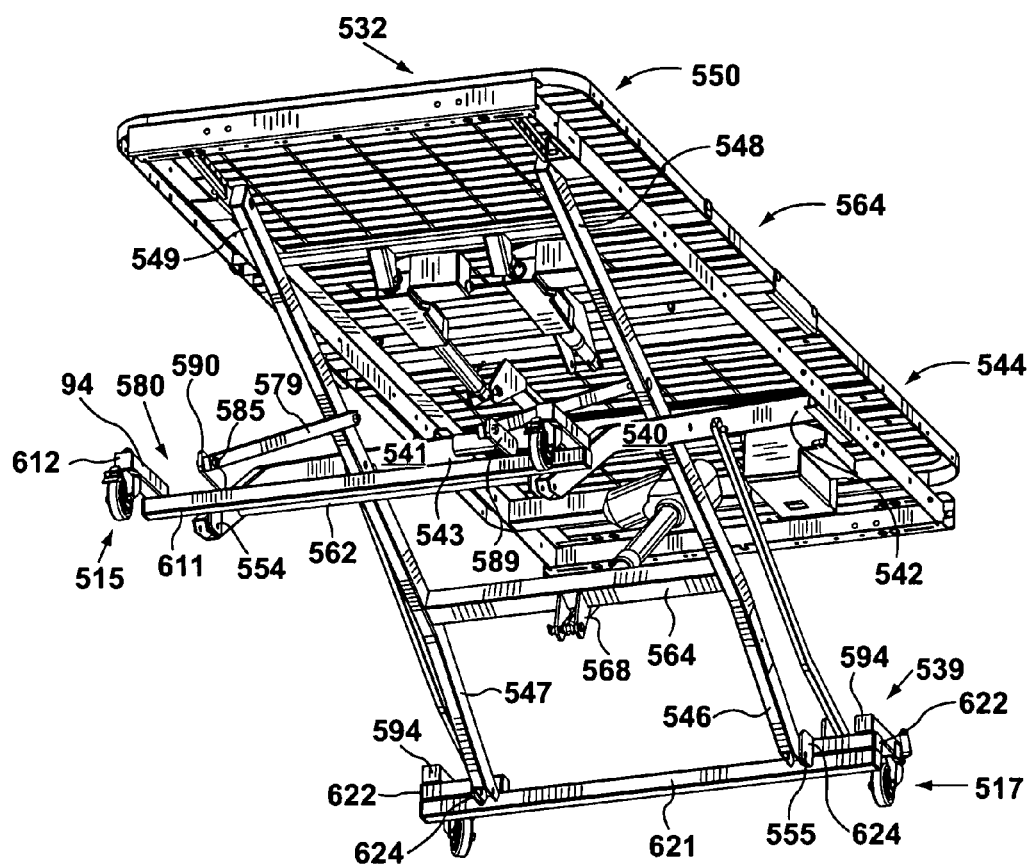
FIG. 25B is another isometric view of the adjustable bed of FIG. 25, drawn at a smaller scale.
Figure 26:
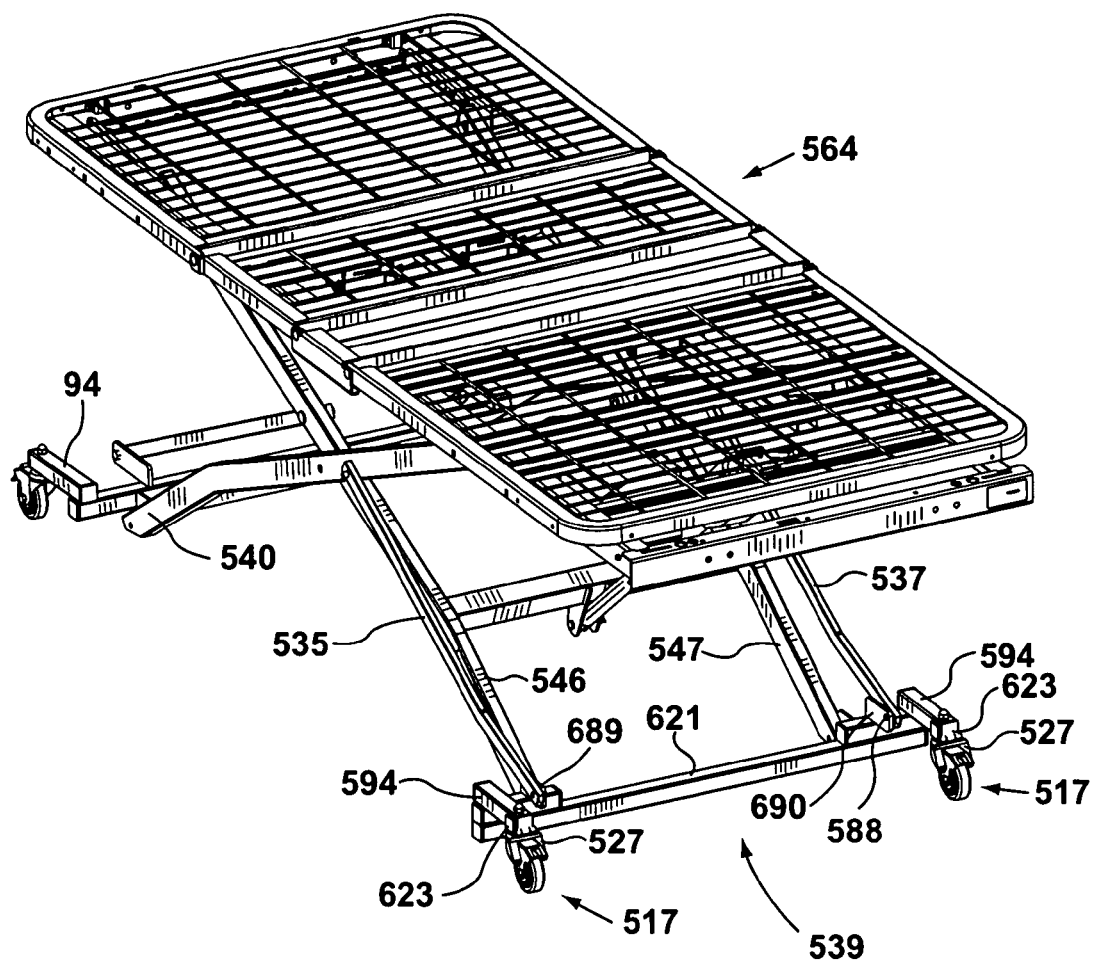
FIG. 26 is an isometric view of the adjustable bed carriage of FIG. 25 and of the main bed frame with the directional locks in an engaged state, drawn at a smaller scale.
Figure 27:
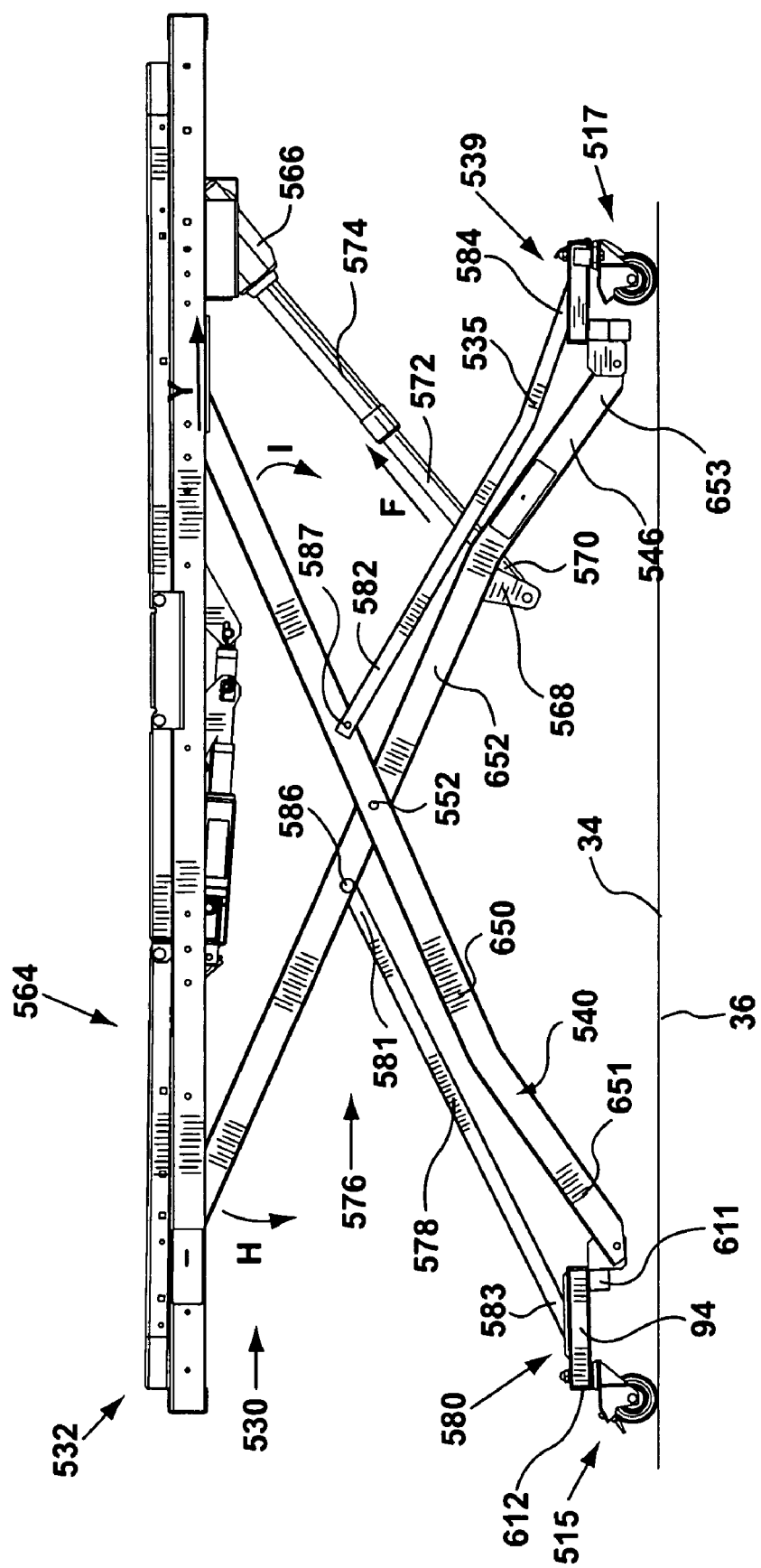
FIG. 27 is a side view of a right side of the adjustable bed carriage of FIG. 25 and of the main bed frame with the directional locks in the disengaged state, drawn at a smaller scale.

Another embodiment of an adjustable bed carriage 530 of the invention is shown in FIGS. 25–33. The adjustable bed carriage 530, which is for supporting a main bed frame 532 above a substantially planar floor 34 (FIG. 27), has one or more first legs 540, 541, each with an upper end 542, 543 FIG. 25B) respectively which is slidably (and pivotably) attached to a first end 544 of the main bed frame 532, as will be described. As can be seen in FIG. 25, the adjustable bed carriage 530 also includes second legs 546, 547 with upper ends 548, 549 respectively, and each upper end 548, 549 is pivotably attached at a second end 550 of the main bed frame 532. Also, each of the first legs 540. 541 and the second legs 546, 547 are pivotably connected respectively at central pivots 552 located substantially at the midpoints of the legs 540, 541 and 546, 547. The connections of the legs 540, 541 and 546, 547 at the central pivots 552 permit pivoting movement of the legs 540, 541 and 546, 547 respectively about the central pivots 552 in opposite directions, as will be described. The pivoting movement of the legs 540, 541 and 546, 547 about the central pivots 552 results in movement of the adjustable bed carriage 530 between an extended condition (shown in FIGS. 25, 25B, 26, 27, 27A, and 27B–28) and a retracted condition (shown in FIGS. 29–33). In the preferred embodiment, the first legs 540, 541 are pivotably attached to a first caster base 580 which includes one or more first casters 515. Also, the second legs 546, 547 are pivotably attached to a second caster base 539 which includes one or more second casters 517 for engaging the floor 34. The first legs 540, 541 are attached to the first caster base 580 at pivot points 554 (FIG. 27B), and the second legs 546, 547 are attached to the second caster base at pivot points 555 (FIG. 27B). As shown in FIG. 25D, crossbars 562, 564 join the first legs 540, 541 and the second legs 546, 547 respectively, to strengthen the adjustable bed carriage 530.

Figure 25A:
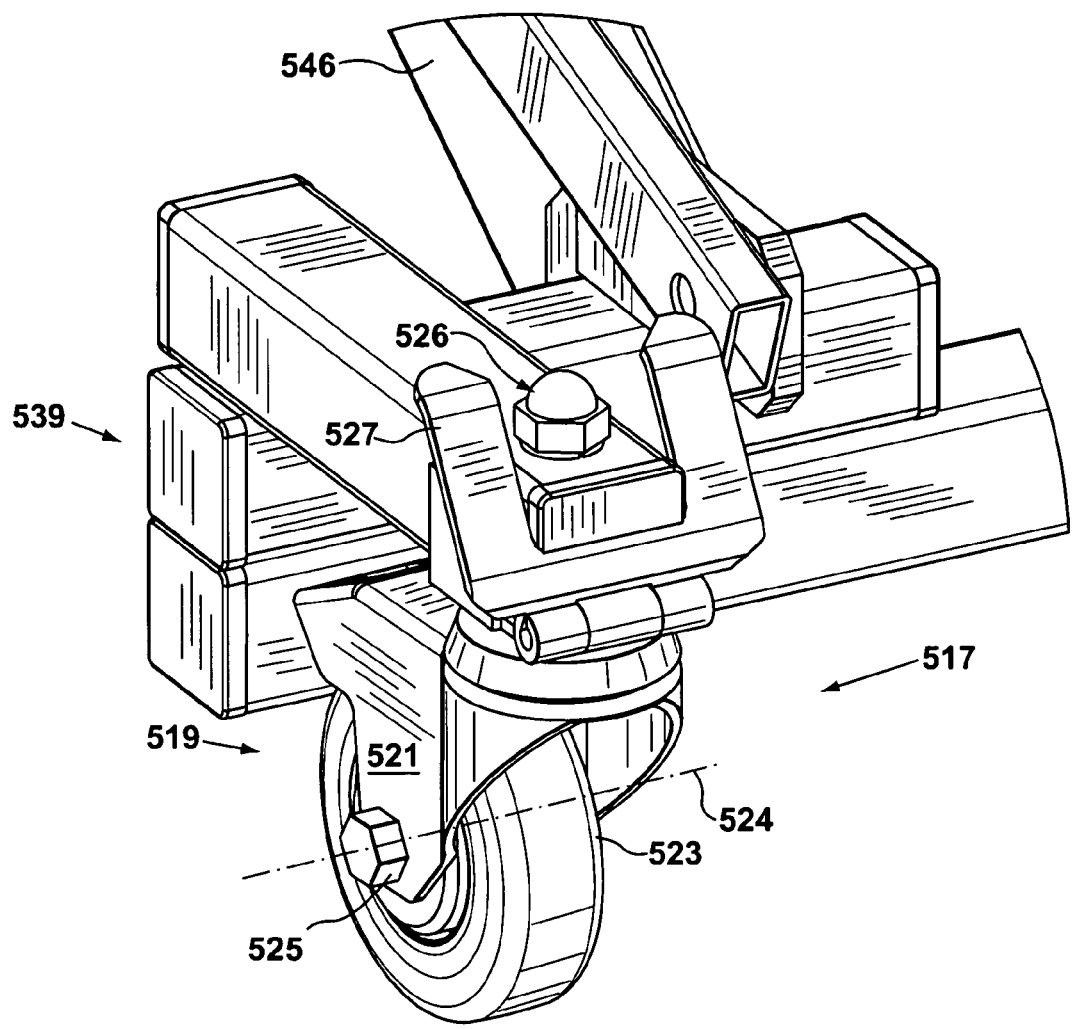
FIG. 25A is an isometric view of a caster shown in FIG. 25, drawn at a larger scale.
Figure 26A:
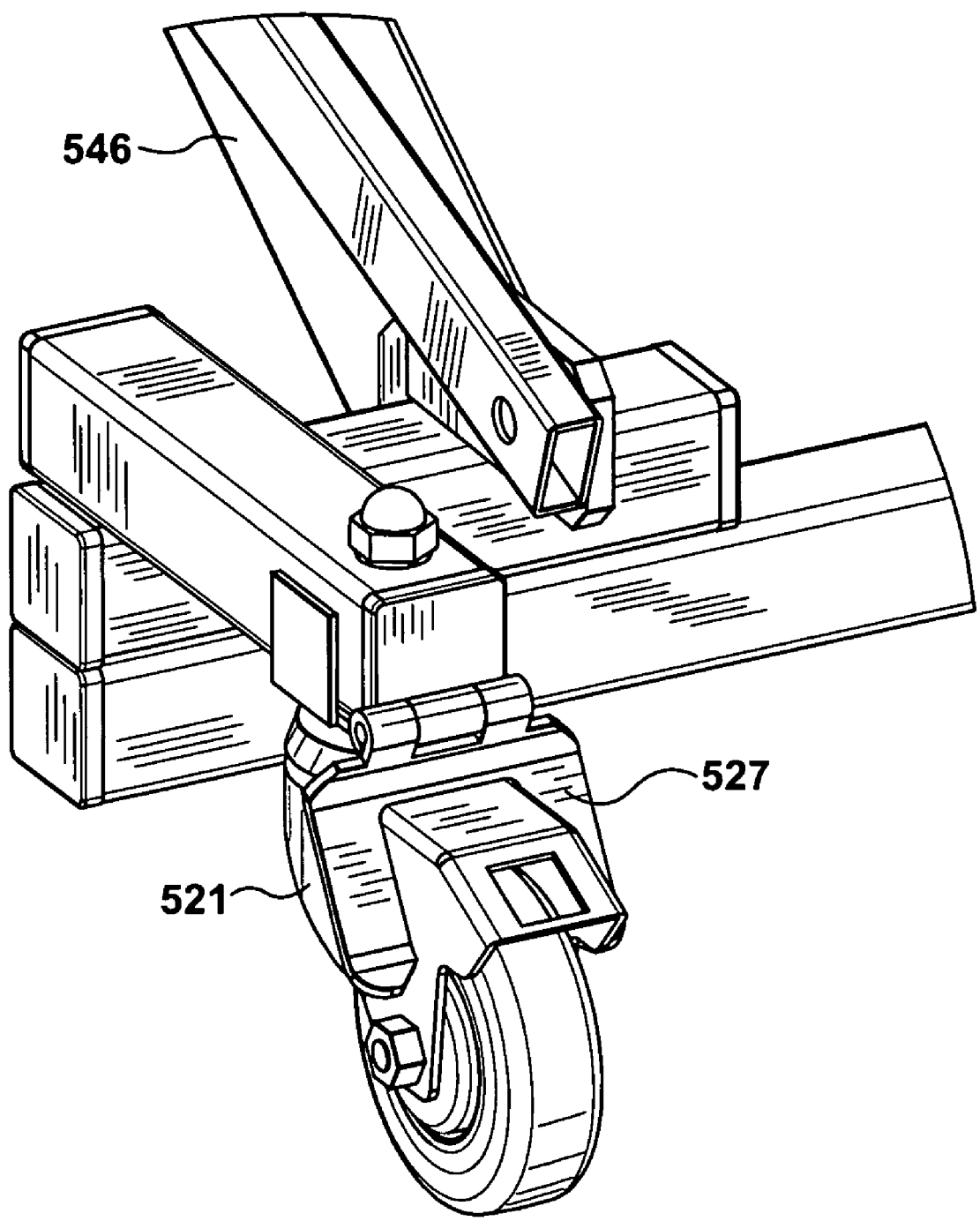
FIG. 26A is an isometric view of a caster shown in FIG. 26, drawn at a larger scale.

As can be seen in FIGS. 25A and 26A, each second caster 517 includes a wheel assembly 519 having a housing 521 and a wheel 523 rotatable about an axis 524 defined by an axle subassembly 525 positioned in the housing 521. Each second caster 517 additionally includes a mounting portion 526 for mounting the wheel assembly 519 to the second legs 546, 547 respectively.

In addition, each of the second casters 517 preferably includes a directional lock 527 for locating the wheel assembly 519 in one or more predetermined positions relative to the second legs 546, 547. The directional lock 527 is described in the Applicant's application Ser. No. 10/406, 253, filed on Apr. 4, 2003, the complete specification of which is hereby incorporated by reference. Preferably, in the predetermined position, the axis 524 in each second caster 517 is substantially orthogonal to the second legs 546, 547.

Figure 25C:
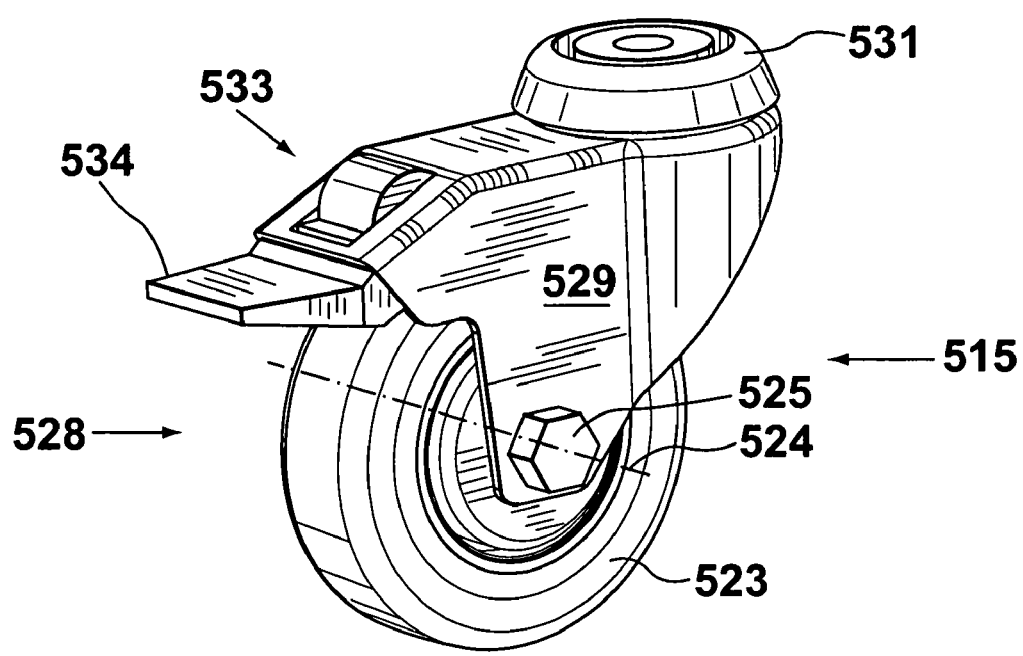
FIG. 25C is an isometric view of a caster shown in FIG. 25B, drawn at a larger scale.

In the preferred embodiment, each first caster 515 includes a wheel assembly 528, having a housing 529 and a wheel 523 rotatable about an axis 524 defined by an axle subassembly 525 positioned in the housing 529 (FIG. 25C). Each first caster 515 additionally includes a mounting portion 531 for mounting the wheel assembly 528 to the second legs 546, 547 respectively.

In addition, each of the first casters 515 preferably includes a brake (or caster lock, described above) 533 for preventing rotation of the wheel 523 about the axis 524. The brake 533 is adapted for braking the wheel upon activation thereof and releasing the wheel 523 upon deactivation, as is known in the art. Preferably, the brake 533 is activated by the operator depressing an activator 534 (thereby moving the activator 534 to an engaged position) and subsequently deactivated by pressing again on the activator 534 (thereby moving the activator 534 to a released position), as is known in the art.

It will be appreciated by those skilled in the art that the mounting portion can have various forms. For example, as shown in FIG. 25A, the mounting portion is a bolt (not shown) secured by a nut. However, any suitable type of mounting portion can be used, as is known in the art.

As can be seen in FIG. 25B, the first caster base 580 preferably includes a crossbar 611 on which mounting brackets 94 are positioned. In the preferred embodiment, the first casters 515 are mounted to ends 612 of each of the mounting brackets 94 which are located distal to the crossbar 611.

Figure 27A:
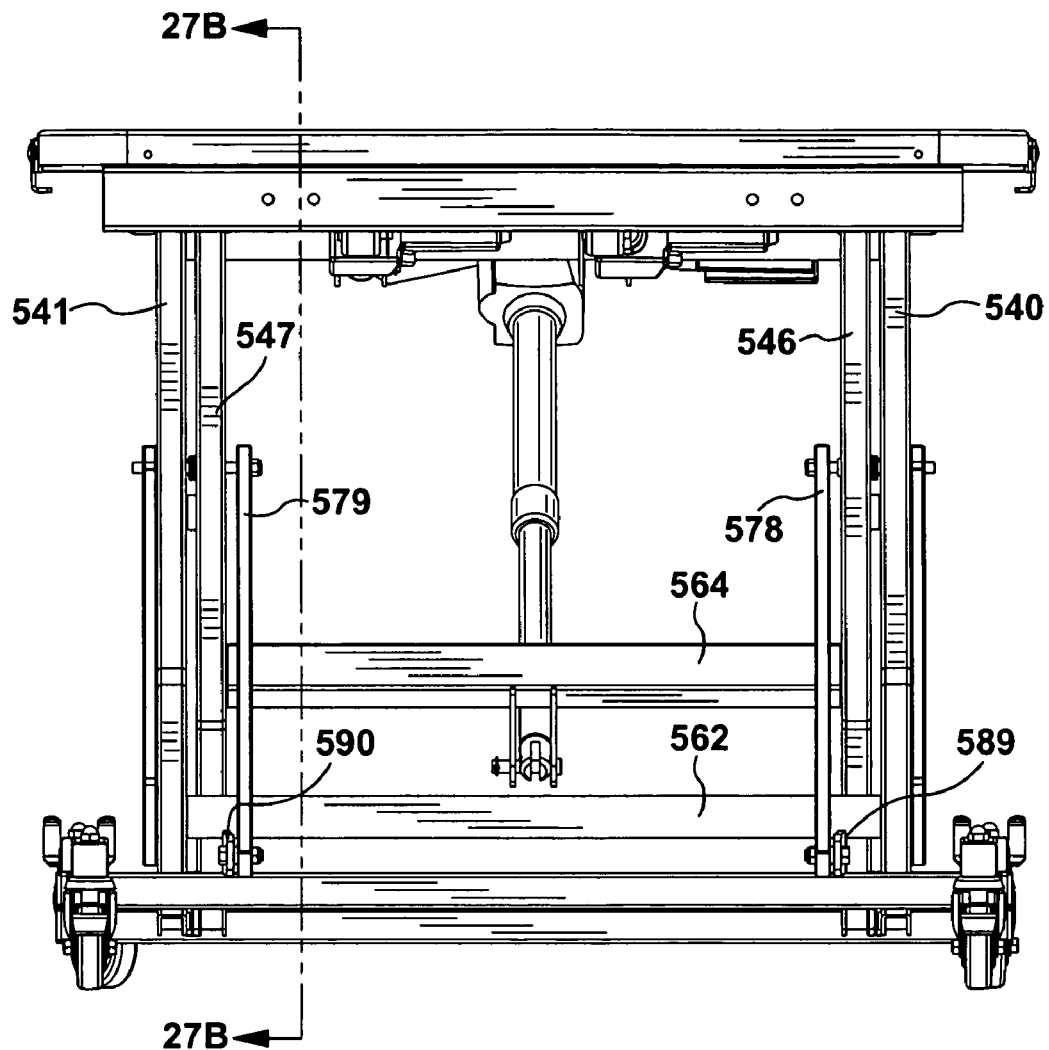
FIG. 27A is a side view of a front side of the adjustable bed carriage of FIG. 27, drawn at a larger scale.
Figure 27B:
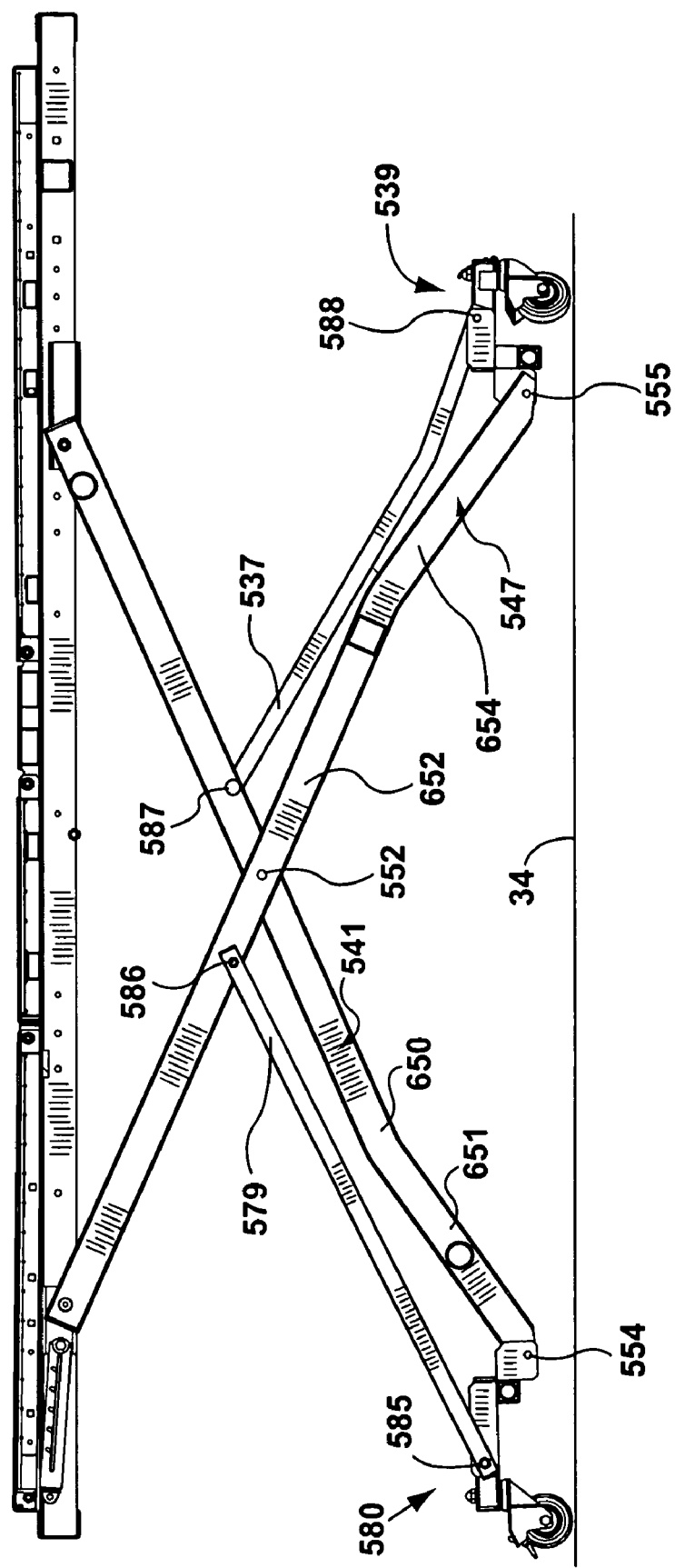
FIG. 27B is a cross-section of the adjustable bed of FIG. 27 taken along line 27B—27B in FIG. 27A, drawn at a smaller scale.

The first caster base 580 additionally includes the locator elements 589, 590, and each locator element 589, 590 is spaced inwardly from the mounting brackets 94 respectively so that the first follower struts 578, 579 are positioned to be spaced apart from the first legs 540. 541 respectively and can pivot without interference from, or interfering with, the first legs 540, 541 and the second legs 546, 547 (FIG. 27A). The first caster base 580 also includes depending flanges 613 which preferably extend downwardly from the crossbar 611. The first legs 540, 541 are pivotably mounted to the depending flanges 613 at pivot points 554 (FIG. 27B). In the preferred embodiment, the lower ends 583 of the first follower struts 578, 579 are pivotably attached to the locator elements 589, 590. Each of the locator elements 589, 590 is positioned so as to enable the follower struts 578, 579 to maintain the first caster base 580 in substantially the preselected position relative to the plane 36 of the floor 34, to the extent feasible. Although any suitable materials could be used, in the preferred embodiment, the first caster base 580 is made of tubular steel and steel plate.

As can be seen in FIGS. 25, 25A, and 25B, the second caster base includes a crossbar 621. The crossbar 621 has elevated portions 622 at each of its ends. Preferably, the second casters 517 are mounted to mounting brackets 594 which are attached to the crossbar 621 at the elevated portions 622 thereof. The mounting brackets 594 include ends 623 located distal to the crossbar 611, and the casters 517 are mounted to the ends 623 of the mounting brackets 594.

The second caster base 539 additionally includes locator elements 689, 690. Each locator element 689, 690 is spaced inwardly from the mounting brackets 594 respectively so that the second follower struts 535, 537 are positioned to be spaced apart from the second legs 546, 547 and the first legs 540, 541 (FIG. 26). The second caster base 539 also includes depending flanges 624 which preferably extend downwardly from the crossbar 621 (FIG. 25B). The second legs 546, 547 are pivotably mounted to the depending flanges 624 at pivot points 555 (FIG. 27B). Also, the lower ends 584 of the second follower struts 535, 537 are pivotably attached to the locator elements 689, 690. Each of the locator elements 689, 690 is positioned so as to enable the follower strut 535, 537 to maintain the second caster base 539 in substantially the preselected position relative to the plane 36 of the floor 34. Although any suitable materials could be used, in the preferred embodiment, the second caster base 539 is made of tubular steel and steel plate.

As can be seen in FIGS. 25–33, the first end 544 of the main bed frame 532 is preferably used as the head end of a bed including the adjustable bed carriage 530, i.e., the end of the main bed frame 532 at which the patient's head would customarily be positioned in use. Also, the second end 550 is preferably used as the foot end of the bed. However, it will be appreciated by those skilled in the art that the first end 544 could be used as the foot end, and the second end 550 could be used as the head end of the bed.

Accordingly, in an alternative embodiment of the adjustable bed carriage 530, each second caster 517 includes the brake 533. Also, each first caster 515 includes the directional lock 527.

In yet another alternative embodiment, each of the first and the second casters 515, 517 includes the brake 533. Alternatively, each of the first and second casters 515, 517 includes the directional lock 527.

Alternatively, the second casters 517 can have neither the brake 533 nor the directional lock 527. Similarly, the first casters 515 can have neither the brake 533 nor the directional lock 527. In each case, however, a brake device should preferably be provided with the bed.

A preferred embodiment of an adjustable bed 564 of the invention include the main bed frame 532 and the adjustable bed carriage 530 for supporting the main bed frame 532 on the substantially planar floor 34. Preferably, the adjustable bed 564 includes a motor 566 mounted on the main bed frame 532 and coupled to the adjustable bed carriage 530, for positioning the adjustable bed carriage 530. Although various types of motors could be used, the preferred motor 566 is a linear screw drive motor powered by electricity, as is known in the art. As shown in FIG. 27, the motor 566 is preferably pivotably mounted on the main bed frame 532 and pivotably mounted on the second legs 546, 547. In the preferred embodiment, a downwardly depending flange 568 in which a distal end 570 of the motor 566 is pivotably mounted (directly or indirectly) is centrally positioned on the crossbar 564 (FIGS. 25 and 25B). When the adjustable bed carriage 530 is to be moved from the extended condition (or from an intermediate position) to or towards the retracted condition, a movable portion 572 is retracted into a motor body 574 in a controlled manner, in the direction shown by arrow "F" in FIG. 27. When the adjustable bed carriage 530 is to be moved from the retracted condition (or from an intermediate position) to or towards the extended condition, the movable portion 572 is pushed outwardly from the motor body 574 in the direction of arrow "G" in FIG. 28.

Figure 28:
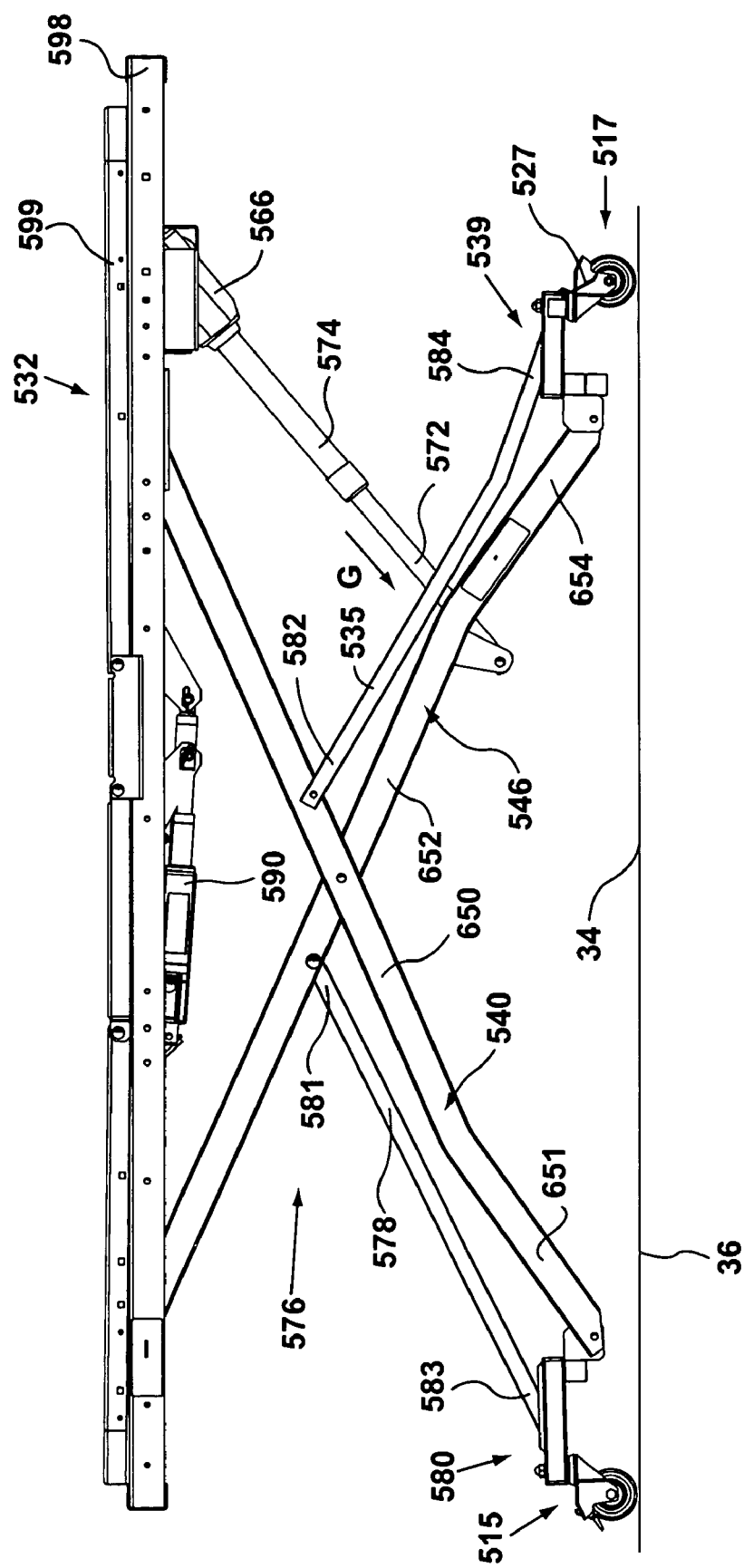
FIG. 28 is a side view of the right side of the adjustable bed carriage of FIG. 25 and the main bed frame with the directional locks in the engaged state.
Figure 29:
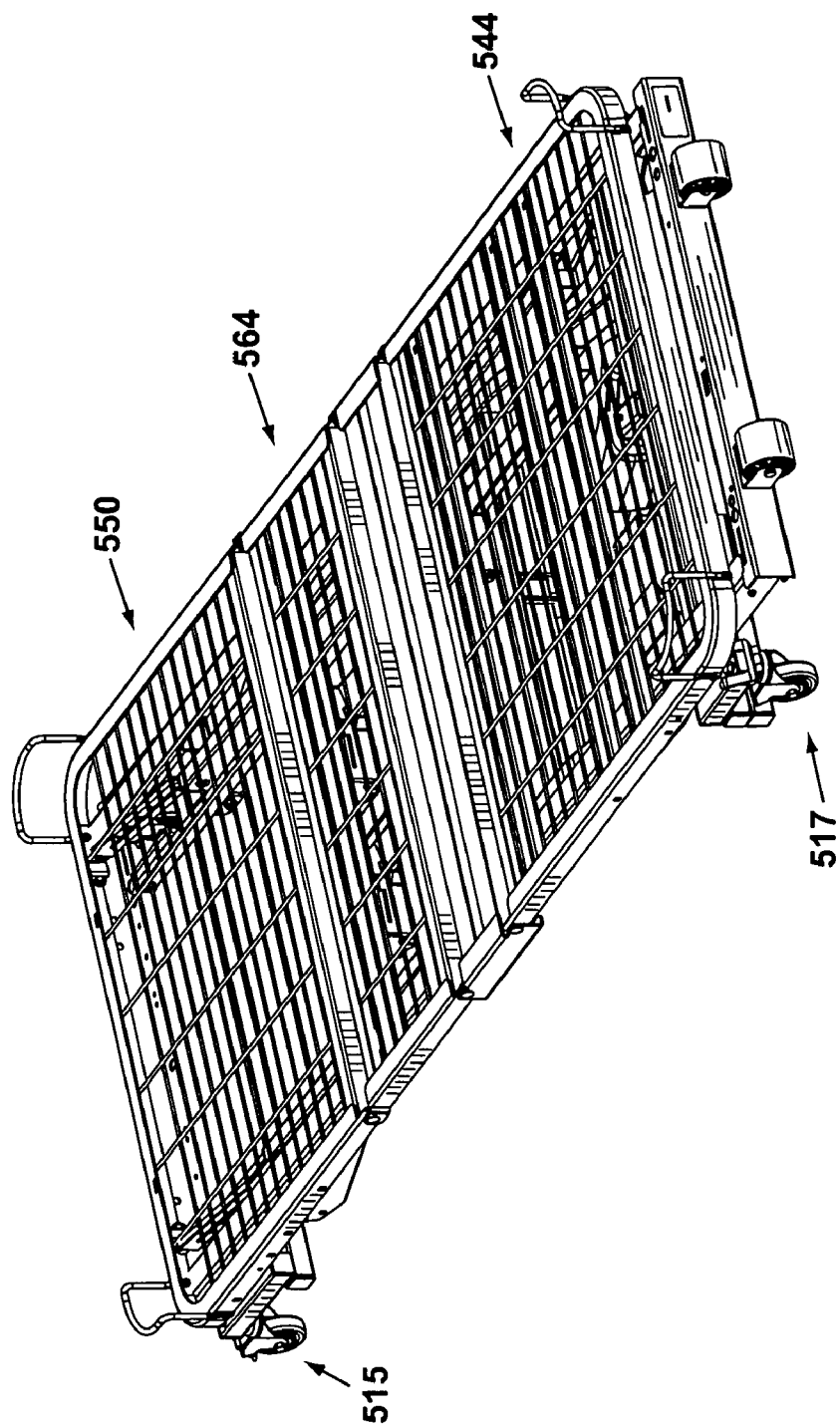
FIG. 29 is an isometric view of the adjustable bed carriage of FIG. 25 and of the main bed frame with the directional locks in the disengaged state, the adjustable bed carriage being shown in the retracted condition.
Figure 30:
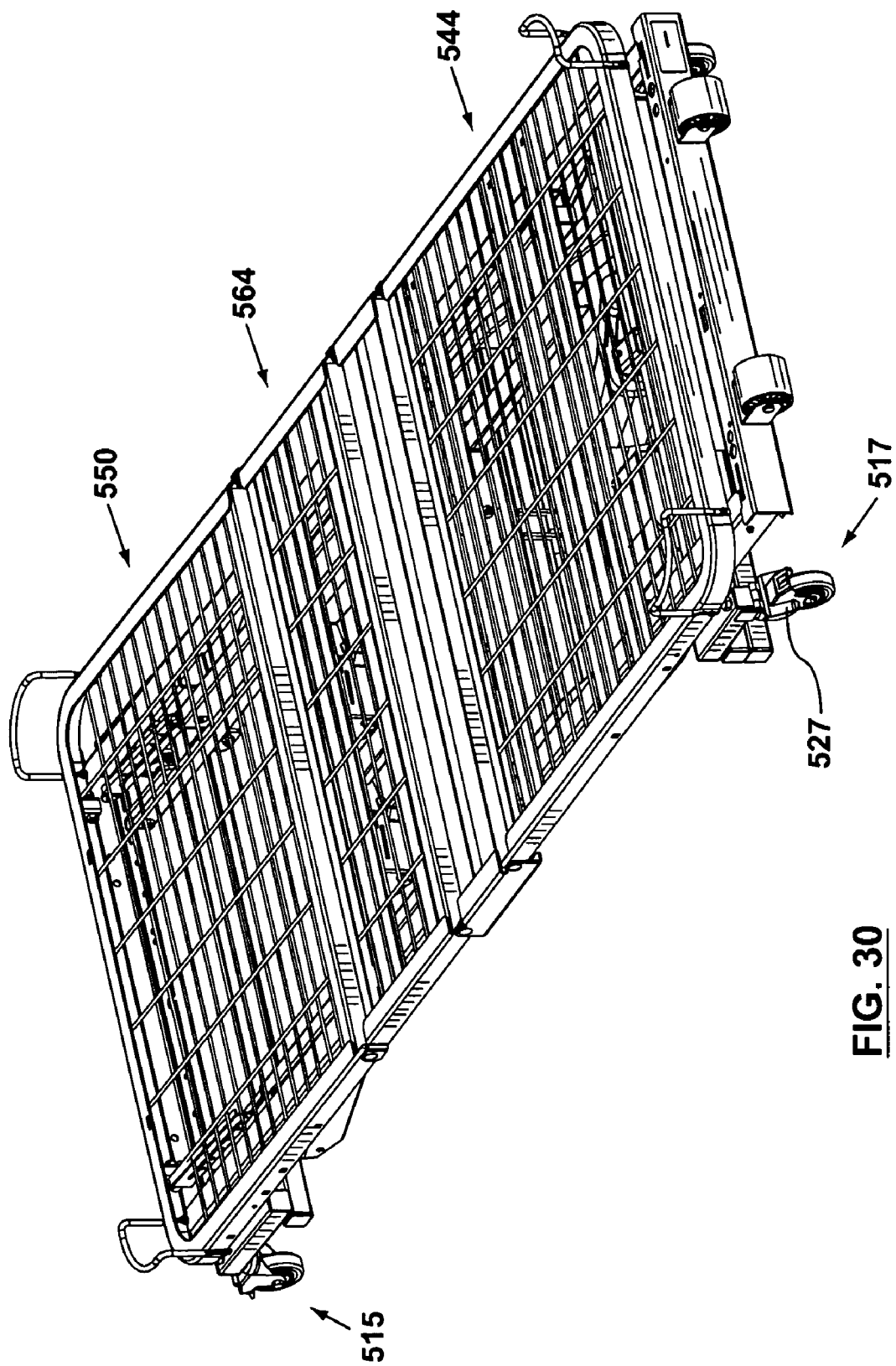
FIG. 30 is an isometric view of the adjustable bed carriage of FIG. 29 with the directional locks in the engaged state.

In the preferred embodiment, the adjustable bed 564 includes a linkage assembly (or a scissor leg assembly) 576 which includes the adjustable bed carriage 530 with first follower struts 578, 579 positioned adjacent to the first legs 540, 541 respectively and second follower smuts 535, 537 positioned adjacent to the second legs 546, 547 respectively. As can be seen in FIGS. 27 and 28, the first legs 540, 541 are pivotably attached to the first caster base 580, which is positioned distal to the first end 544 of the main bed frame 532. The second legs 546, 547 are pivotably attached to the second caster base 539, and the second caster base 539 is positioned distal to the second end 550 of the main bed frame 532.

For convenience, the elements on only one side of the bed 564 are shown in FIGS. 27 and 28. It will be understood that the corresponding elements on the side not shown are the same in all relevant aspects, as those which are shown.

Preferably, each of the caster bases 580, 539 is disposed in a preselected position respectively relative to the plane 36 of the floor 34 when the linkage assembly is in the extended condition, as shown in FIGS. 27 and 28. The first follower struts 578, 579 each have upper ends 581 and lower ends 583, and the second follower struts have upper ends 582 and lower ends 584. As can be seen in FIGS. 25 and 25B, in the preferred embodiment, the lower ends 583, 584 are pivotably attached to the caster bases 580 and 539 respectively at pivot points 585 and 588 respectively. The upper ends 581 of the first follower struts 578, 579 are pivotably attached to the second legs 546, 547 respectively (FIG. 27). This pivotable attachment is at predetermined pivot points 586 on the second legs 546, 547 above the central pivots 552. The location of the predetermined pivot points 586 is selected so that the follower struts 578, 579 can act on the caster base 580 to maintain the caster base 580 substantially in the preselected position relative to the plane 36 of the floor 34 as the linkage assembly 576 moves between the extended and retracted conditions.

Similarly, the upper ends 582 of the second follower struts 535, 537 are pivotably attached to the first legs 540, 541 respectively. This pivotable attachment is at predetermined pivot points 587 on the first legs 540, 541 above the central pivots 552 (FIG. 27). The location of the pivot points is selected so that the second follower struts 535, 537 act on the second caster base 539 to maintain the second caster base 539 substantially in the preselected position relative to the plane 36 of the floor 34 as the linkage assembly 576 moves between the extended and retracted conditions.

In the preferred embodiment, the follower struts 578, 579, 535, and 537 only maintain the caster bases 580, 539 respectively in substantially the preselected positions relative to the plane 36. The movement from the preselected position has been found to be less than 5° from the horizontal.

As can be seen in FIG. 27B, the first follower struts 578, 579 generally form a "modified" parallelogram with the legs 540, 541 and portions of the legs 546, 547, i.e., they preferably do not form an exact parallelogram. For clarity of illustration, FIG. 27B shows the first leg 541 and the first follower strut 579 only. However, it will be understood that the first leg 540 and the first follower strut 578 are included in a modified parallelogram which is identical to that shown in FIG. 27B, in all relevant aspects.

As shown in FIG. 27B, the modified parallelogram related to the first leg 541 and the first follower strut 579 is defined by the central pivot 552 and pivot points 554, 585, and 586. Also, another "modified" parallelogram (i.e., slightly different from the modified parallelogram defined by the pivot points 552, 554, 585, and 586) is related to the second follower struts 535, 537 and the legs 546, 547 and portions of the legs 540, 541.

As shown in FIG. 27B, the modified parallelogram related to the second leg 547 and the second follower strut 537 is defined by the pivot points 555, 552, 587, and 588. The modified parallelogram related to the second leg 546 and the second follower strut 535 is not shown in FIG. 27B for clarity of illustration. It will be understood that such modified parallelogram is the same, in all relevant aspects, as the modified parallelogram shown in FIG. 27B.

The location of the follower struts does not provide perfect alignment, as an exact parallelogram would, but is optimized to provide the best alignment possible. As the bed is raised, the angle changes above and below horizontal 60 that the bed has a level surface at the highest and lowest positions while maintaining a substantially level top surface through the range of motion from high to low. (In the foregoing discussion it is assumed that deck portions are lowered, so that the bed preferably has a substantially level top surface.)

Pivoting movement of the legs 546, 547 results in a corresponding pivoting movement of the legs 540, 541 to move the adjustable bed carriage between the extended condition and the retracted condition, so that the main bed frame 532 is thereby moved between a fully raised position (FIGS. 25–28) in which the adjustable bed carriage 530 is in the extended condition and a fully lowered position (FIGS. 29–33), in which the adjustable bed carriage 530 is in the retracted condition. For example, as shown in FIG. 27, pivoting movement of the legs 546 in the direction indicated by arrow "H" would result in pivoting movement of the leg 540 in the direction of arrow "I". Also, the pivoting movement of the second leg 546 results in sliding movement of the upper end of the first leg 540 in the direction of arrow "Y" in FIG. 27. The motor 566 initiates movement of the second legs 546, 547, which results in corresponding movement of the first legs 540, 541.

In use, the motor 566 is activated by a switch or other control means (not shown), as is known in the art, to cause movement of the linkage assembly 576 between the extended condition and the retracted condition, and consequent movement of the main bed frame 532 relative to the plane 36 of the floor 34. For example, referring to FIGS. 27 and 28, to move the linkage assembly 576 from the extended condition to the retracted condition, the movable portion 572 is retracted into the motor body 574. Retraction of the movable portion 572 is controlled by an electric motor in the motor body 574, thereby ensuring that the retraction is at a desired rate. Also, it will be appreciated by those skilled in the art that the retraction could be stopped at any time, if the operator wishes to have the linkage assembly 576 maintain any position which is intermediate between the extended and retracted conditions. The motor 576 holds the adjustable bed carriage 530 in any intermediate position, as required.

It will be appreciated by those skilled in the art that the main bed frame 532 can include a chassis portion 598 and deck portions 599 mounted on the chassis portion 598. The main deck portions 599 are for supporting a mattress (not shown), and the main deck portions 599 are positionable in a variety of positions relative to the chassis portion 598, as is known in the art. For example, the deck portions 599 are positionable so as to allow adjustable head and foot elevation, to position the patient as required. Motors 590 (FIG. 28) are preferably used to position deck portions 599 as needed, as is known in the art.

Figure 31:
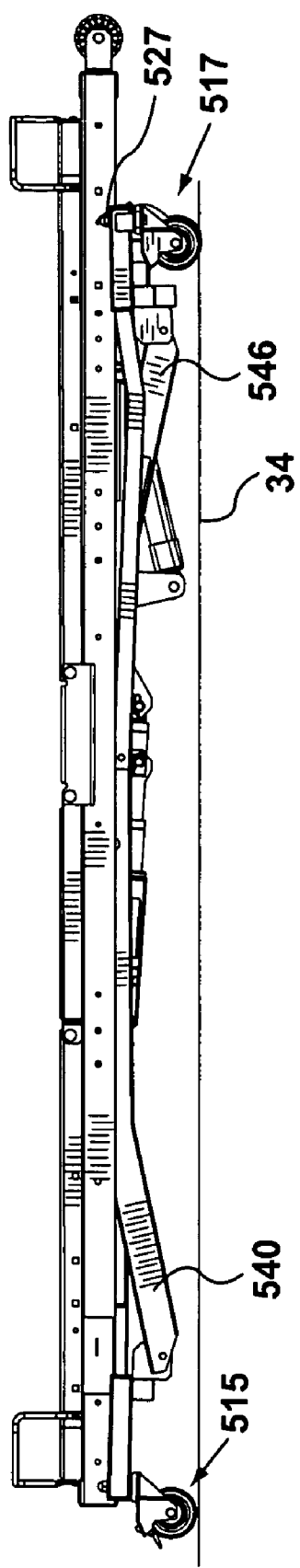
FIG. 31 is a side view of the right side of the adjustable bed carriage of FIG. 29 and of the main bed frame with the directional locks in the disengaged state.
Figure 32:
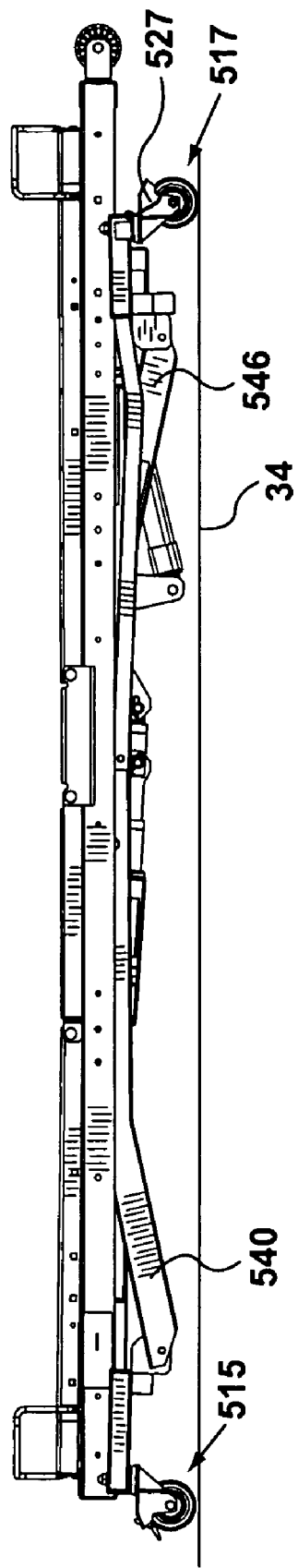
FIG. 32 is a side view of the right side of the adjustable bed carriage of FIG. 30 and of the main bed frame with the directional locks in the engaged state.
Figure 33:
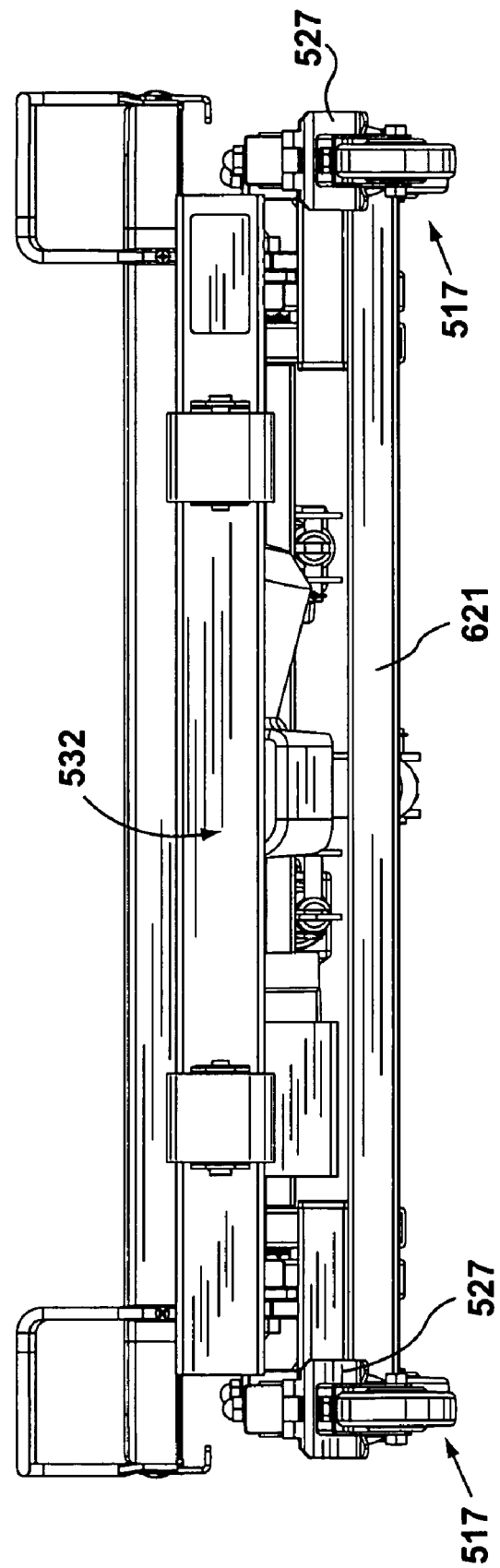
FIG. 33 is a side view of the rear side of the adjustable bed carriage of FIG. 30 and of the main bed frame with the directional locks in the engaged state, drawn at a larger scale.
Figure 34:
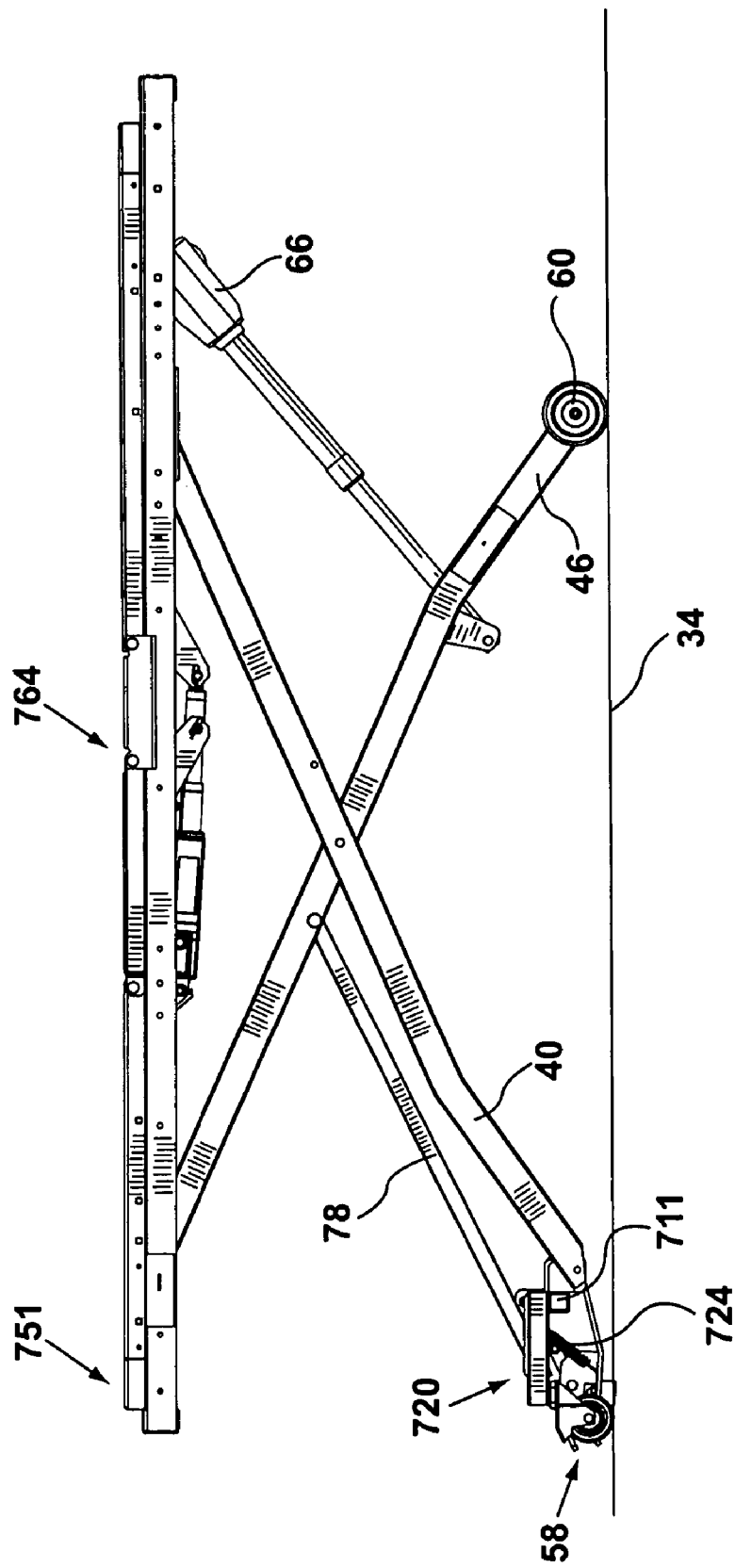
FIG. 34 is a side view of the right side of another alternative embodiment of the adjustable bed carriage of the invention and of the main bed frame including a lock assembly, the lock assembly being in a locked position, the adjustable bed carriage being shown in the extended condition, drawn at a smaller scale.

As can be seen in FIGS. 27 and 28, each of the first legs 540, 541 has an upper section 650 and a lower section 651, and each of the second legs 546, 547 has an upper section 652 and a lower section 653. Preferably, the legs 540, 541 and 546, 547 are configured so as to provide maximum clearance between the floor 34 and the adjustable bed carriage 530 through a middle portion of the adjustable bed carriage 530, when in the retracted condition (FIGS. 29–33). As shown in FIGS. 31 and 32, because the legs 540, 541 and 546, 547 each include lower sections 651, 653 which are bent relative to the substantially straight elongate upper sections 650, 652 of the legs 540, 541, and 546, 547, such clearance is provided in the middle portion of the adjustable bed carriage 530 when the adjustable bed carriage is in the retracted condition. Preferably, the lower section is aligned at a significant angle (e.g., up to approximately 11.5°) from the axis of the upper section of each leg. Due to the relatively high clearance lift devices, movable tables and other devices for use by or with a patient (not shown) which require clearance under the adjustable bed carriage 530 for their operation can be used, when the adjustable bed carriage 530 is at any height.

The use of casters on all the legs of the adjustable bed carriage 530 permits maximum maneuverability. The directional locks provide a simple way to control the direction of travel, as required. The brakes on the first casters are provided for safety, so that the bed can be maintained in a stationary position as required.

In another alternative embodiment of the adjustable bed 764, the adjustable bed 764 includes a lock assembly 720 for maintaining the adjustable bed 764 in a stationary position. Preferably, the lock assembly 720 includes a body 722 pivotably mounted to a first caster base 780 including a crossbar 711 and one or more springs 724 for urging the body 722 to pivot upwardly, as will be described. The body 722 is movable between a locked position, in which the body 722 engages the floor 34 (FIGS. 34, 35, 35A, 36, and 40), and a released position, in which the body 722 is disengaged from the floor 34 (FIGS. 37, 38, 38A, 39, and 41). When the body 722 engages the floor 34, the bed 764 is thereby held stationary.

Figure 38:
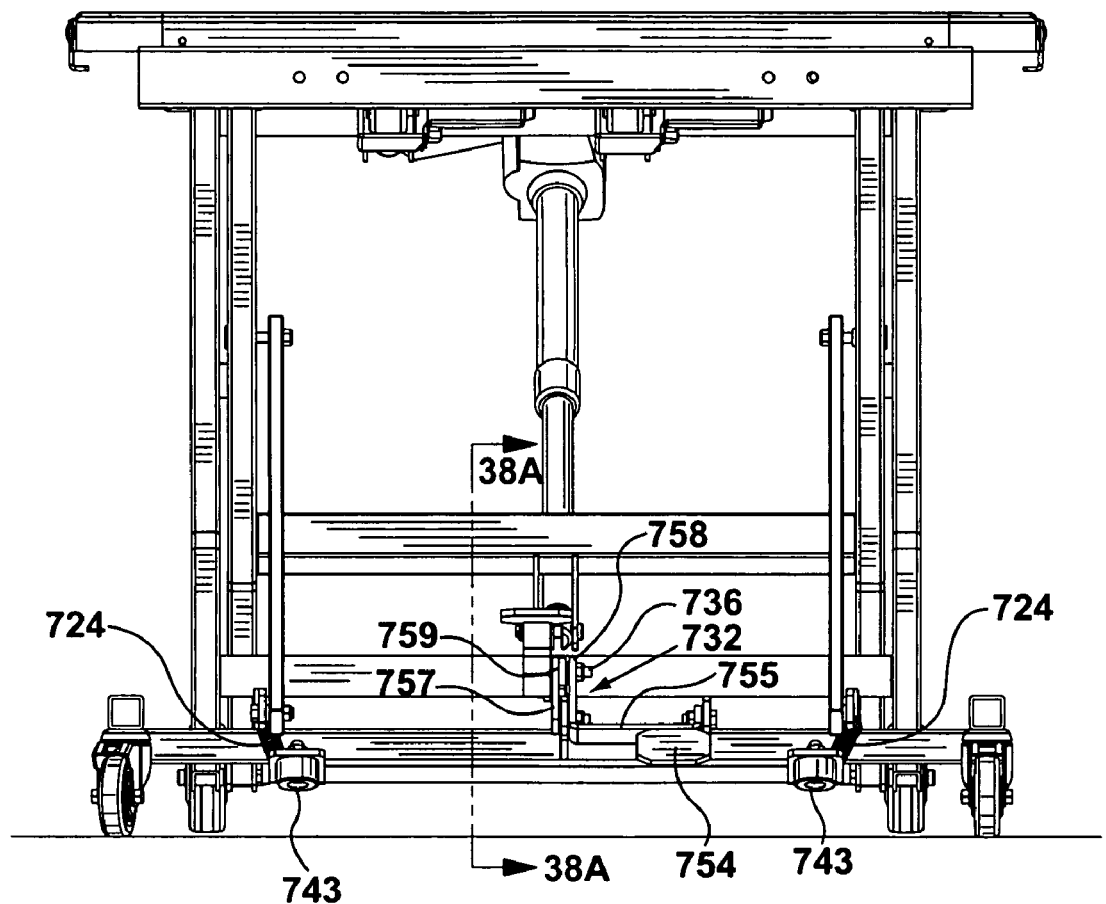
FIG. 38 is a side view of a front side of the adjustable bed carriage of FIG. 37 and of the main bed frame, drawn at a larger scale.
Figure 38A:
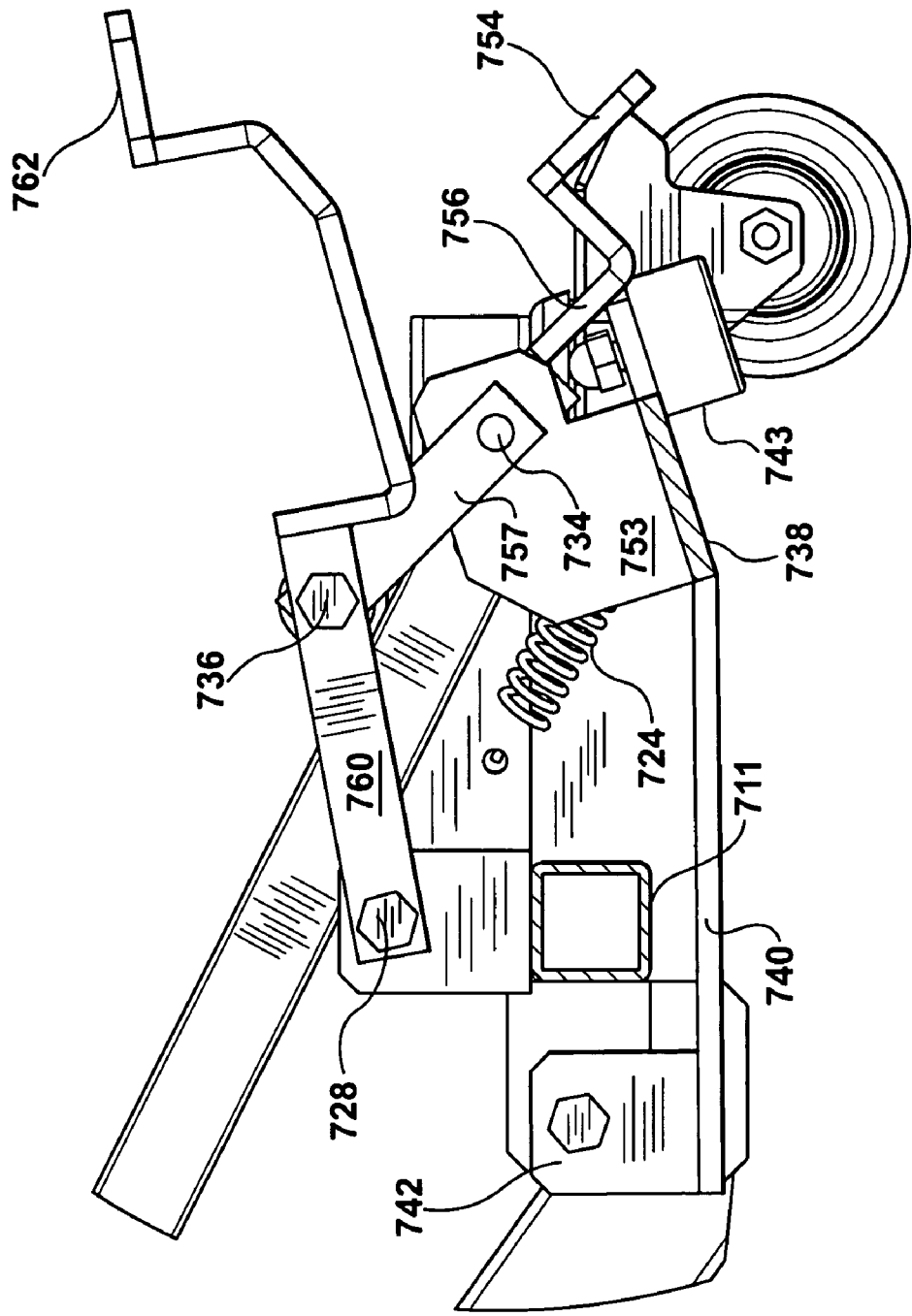
FIG. 38A is a cross-section of the lock assembly in the released position taken along line 38A—38A in FIG. 38, drawn at a larger scale.

In the preferred embodiment, the lock assembly 720 additionally includes a lock linkage 726 pivotably mounted to the crossbar 711 (directly or indirectly) at one or more upper pivot points 728. The upper pivot point 728 is preferably located in a flange 713, extending upwardly from the crossbar 711 (FIG. 35A). The lock linkage 726 is preferably pivotable between a low position (FIGS. 35, 35A) and a high position (FIGS. 38, 38A), as will be described. The lock assembly 720 also includes a release linkage 732 pivotably mounted to the body 722 at one or more lower pivot points 734. The release linkage 732 and the lock linkage 726 are pivotably attached to each other at a middle pivot point 736 disposed between the upper and lower pivot points 728, 734. As can be seen in FIGS. 35A and 38A, the release linkage 732 is pivotable about the middle pivot point 736 between a first (high) position (FIG. 35A) and a second (low) position (FIG. 38A). The body 722 is maintained in the looked position when the lock linkage 726 is in the low position, and the body 722 is maintained in the released position when the release linkage 732 is in the second position thereof, as will be described.

Figure 35:
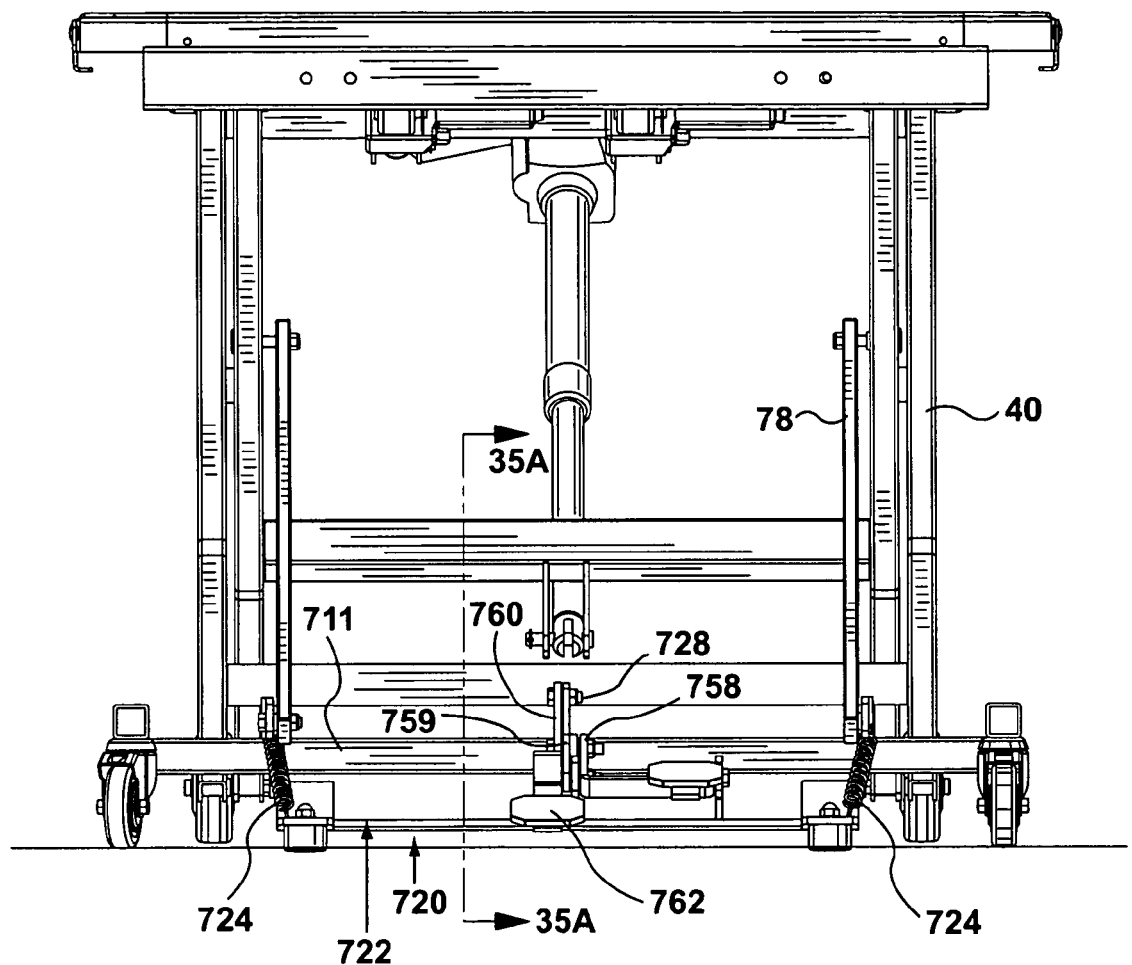
FIG. 35 is a side view of a front side of the adjustable bed carriage of FIG. 34 and of the main bed frame, drawn at a larger scale.
Figure 35A:
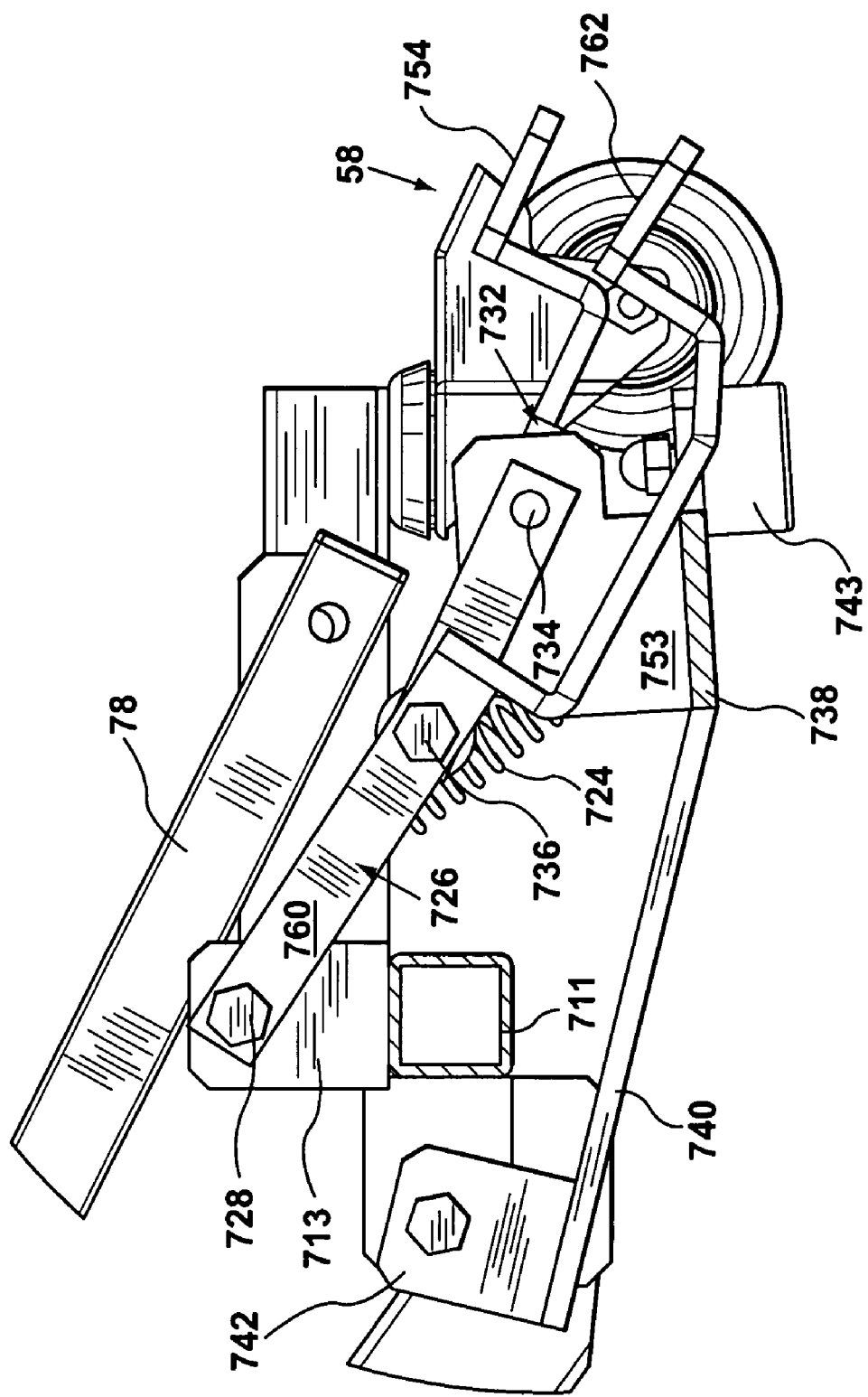
FIG. 35A is a cross-section of the lock assembly in the locked position taken along line 35A—35A in FIG. 35, drawn at a larger scale.
Figure 36:
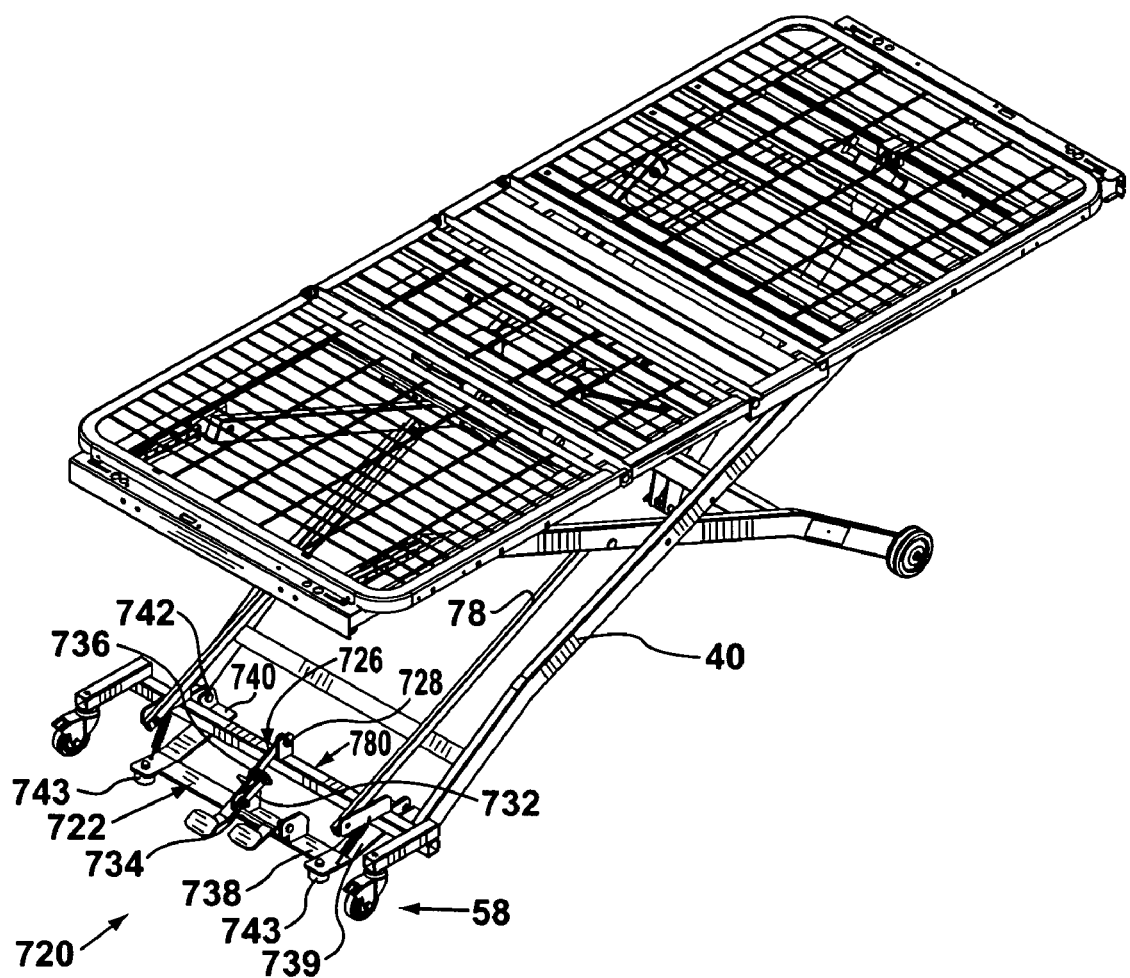
FIG. 36 is an isometric view of the adjustable bed carriage of FIG. 34 and of the main bed frame, drawn at a smaller scale.
Figure 37:
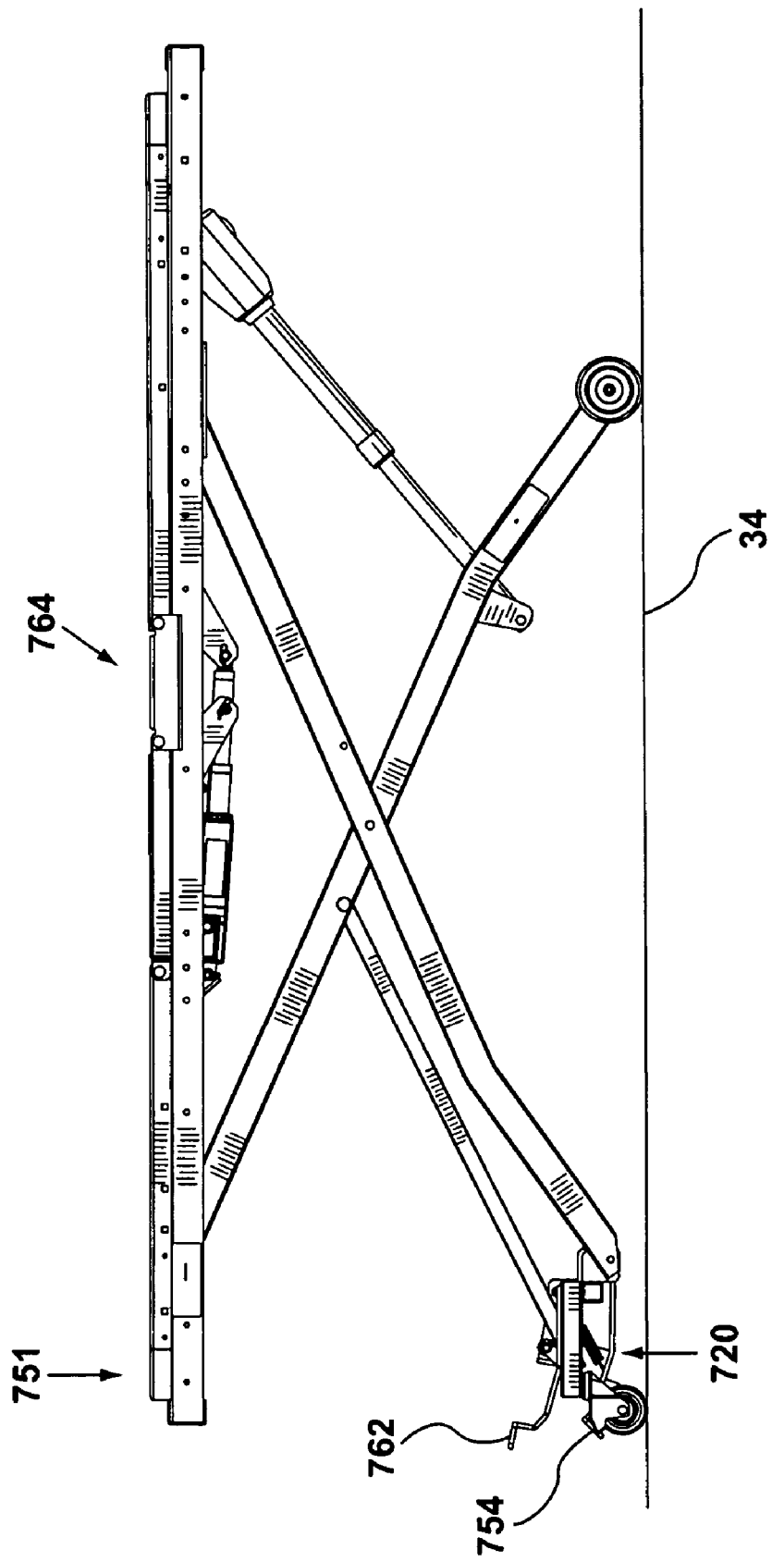
FIG. 37 is a side view of the right side of the adjustable bed carriage of FIG. 34 and of the main bed frame in which the lock assembly is in a released position, the adjustable bed carriage being shown in the extended condition.

As can be seen in FIGS. 35 and 36, the body 722 preferably includes a main portion 738 with two arms 739, 740 extending therefrom in substantially the same direction. Preferably, ends 742 of the arms 739, 740 are pivotably attached to the first caster base 780. As can be seen in FIGS. 35, 35A, and 36, the body 722 includes one or more feet 743 which engage the floor 34 when the body 722 is in the locked position. The body 722 and the feet 743 thereon are positioned such that, when the feet 743 engage the floor 34, an end 751 of the adjustable bed 764 (at which the lock assembly 720 is located) is slightly raised relative to the floor 34.

Figure 39:
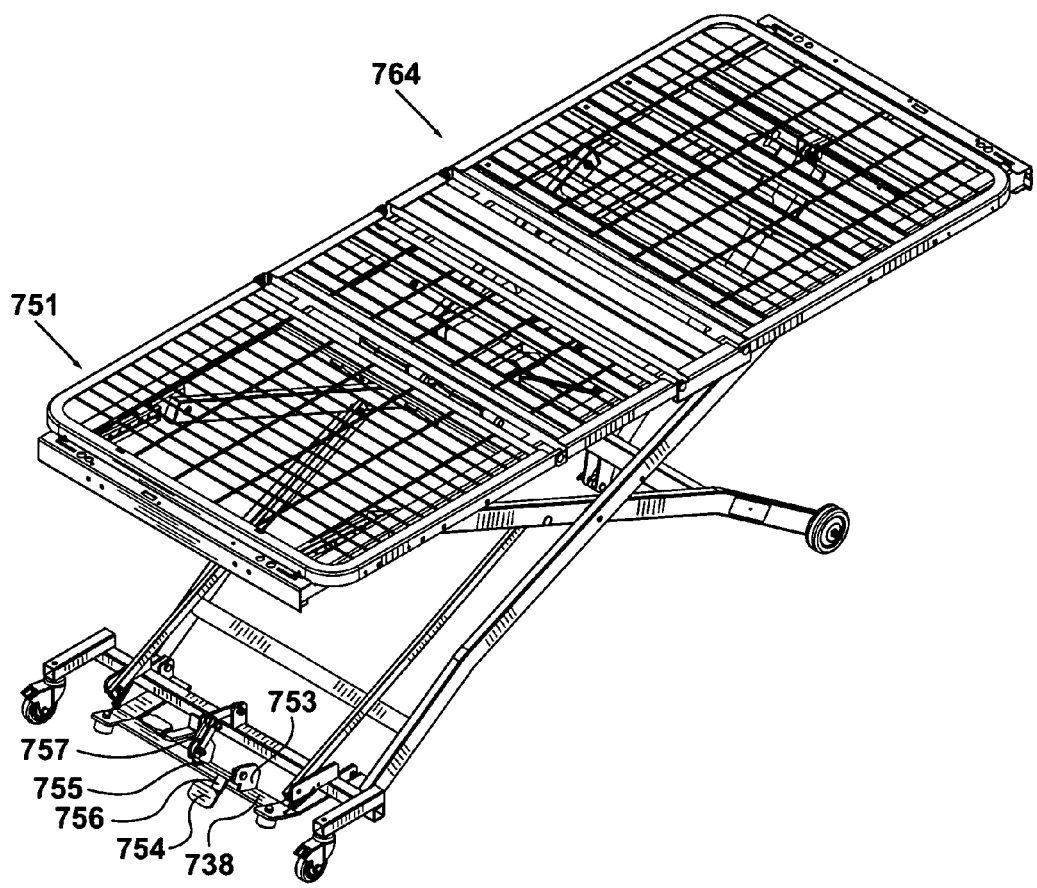
FIG. 39 is an isometric view of the adjustable bed carriage of FIG. 37 and of the main bed frame, drawn at a smaller scale.
Figure 40:
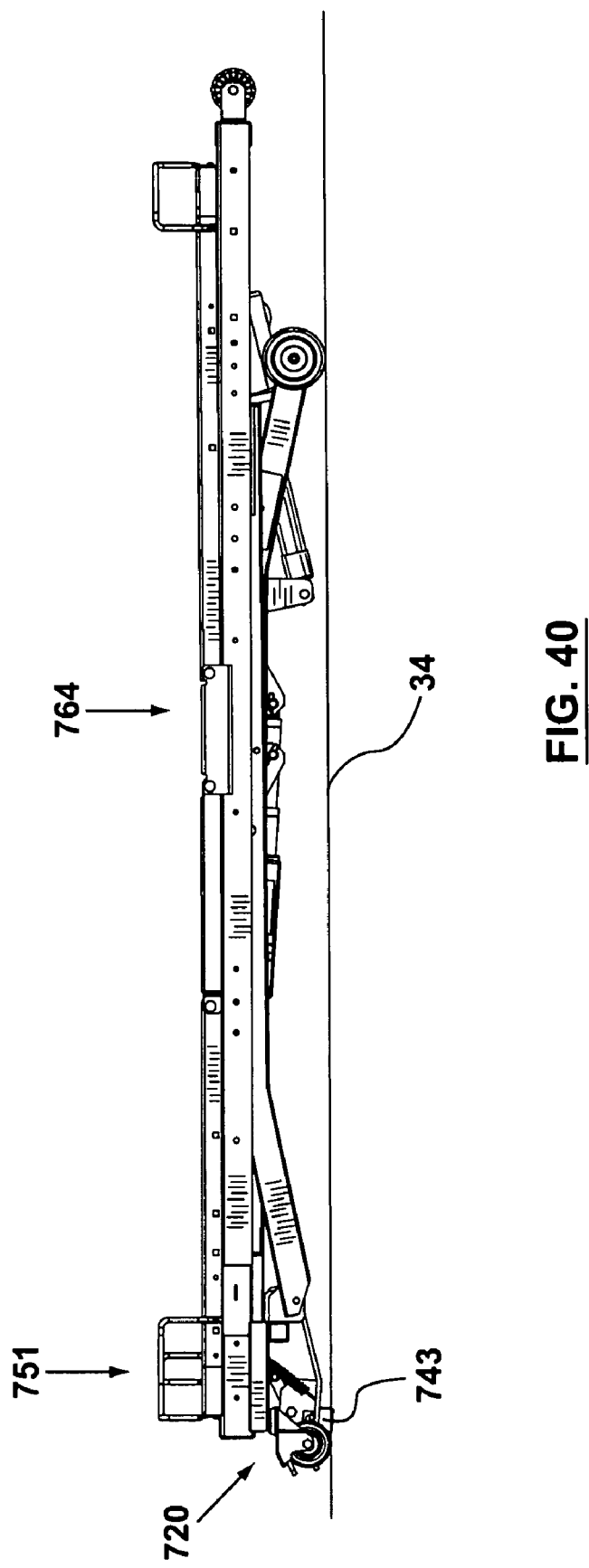
FIG. 40 is a side view of the right side of the adjustable bed carriage of FIG. 34 and of the main bed frame with the lock assembly in the locked position, the adjustable bed carriage being shown in the retracted condition.
Figure 41:
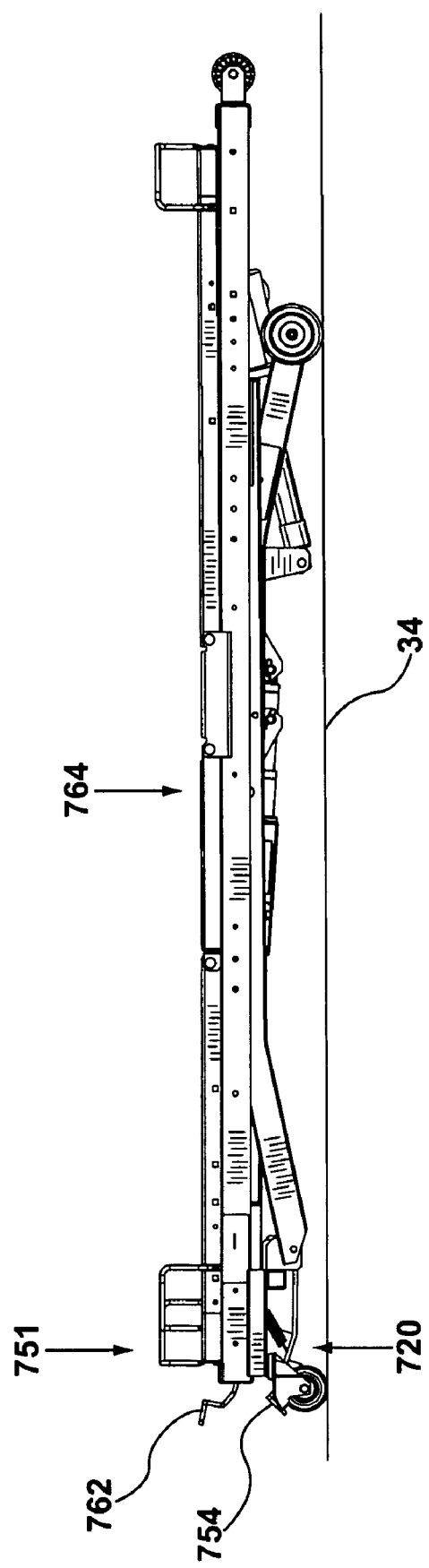

In the preferred embodiment, the lock assembly 720 includes a bracket 753 which is secured to the main portion 738 of the body 722 (FIG. 39). A release pedal 754 forms part of the release linkage 732, which is pivotably mounted to the bracket 753, at the lower pivot points 734. As can be seen in FIG. 35, the release pedal 754 is adapted to receive at least a portion of the operator's foot. The release pedal 754 is attached to a link element 755 by a pedal arm 756. The release link element 755 is pivotably mounted (at the lower pivot points 734) to the bracket 753, and the release link element 755 are also pivotably attached to the lock linkage 726 at the middle pivot point 736.

Preferably, the release linkage 732 also includes a supplemental link 757 attached to the release link element 755 at a lower pivot point and at the middle pivot point 736, for balancing the release linkage 732 to prevent binding of the lock assembly 720. The release link element 755 and the supplemental link 757 are pivotably attached at the middle pivot point 736 to the lock linkage 726 at upper ends 758, 759 thereof respectively (FIGS. 35, 38).

As can be seen in FIGS. 35A and 38A, the lock linkage 726 include a body portion 760 on which a lock pedal 762 is mounted. The lock pedal 762 is adapted to receive at least a portion of the operator's foot.

If the operator wishes to move the body 722 to the locked position (FIG. 35A) from the released position (FIG. 38A), the operator presses down on the lock pedal 762 until the lock linkage 726 is in the low position. In so doing, the operator overcomes the resistance of the springs 724 to move the middle pivot point 736 downward, causing upper ends 758, 759 of the link element 755 and the supplemental link 757 respectively to move downward to the positions shown in FIG. 35A.

As can be seen in FIGS. 35A and 38A, the lock assembly 720 is an "over-center" mechanism, in which the urging by a spring 724 of the body 722 to pivot upwardly requires the lock linkage 726 to be in the low position (FIG. 35A) or the release linkage 732 to be in the high position (FIG. 38A), due to compression of the structure by the spring 724. It is preferred to use a spring to provide compression, but other means could be suitable.

It will be evident to those skilled in the art that the invention can take many forms, and that such forms are within the scope of the invention as claimed. Therefore, the spirit and scope of the appended claims should not be limited to the description of the preferred versions contained herein.

We claim:

1. An adjustable bed for use on a substantially planar floor, the adjustable bed having:
    a main frame for supporting a mattress, the main frame having a first end and a second end;
    a scissor leg assembly for supporting the main frame;
    a motor mounted on the main frame and attached to the scissor leg assembly, for causing the scissor leg assembly to move between an extended condition, in which the main frame is in a fully raised position, and a retracted condition, in which the main frame is in a fully lowered position;
    the scissor leg assembly including:
        a first pair of legs having a proximal end slidably attached to the main frame at the first end and a second pair of legs having a proximal end pivotably attached to the main frame at the second end;
        a first caster base mounted at a distal end of the first pair of legs and positioned distal to the first end of the main frame, the first caster base including at least one first caster for engaging the floor;
        the first pair of legs being attached to the first caster base;
        the first caster base being disposed in a preselected position relative to the floor;
        a second caster base mounted at a distal end of the second pair of legs and positioned distal to the second end of the main frame, the second caster base including at least one second caster for engaging the floor;
        the second pair of legs being attached to the second caster base;
        the first and second pairs of legs being pivotably connected to each other at substantially coplanar central pivot points disposed substantially midway between the proximal ends and the distal ends of each said pairs of legs respectively, such that the scissor leg assembly is movable between the extended condition and the retracted condition;
        at least one first follower strut having an upper end and a lower end, the lower end being pivotably attached to the first caster base;
        the upper end of said at least one first follower strut being pivotably attached to at least one of said legs in said second pair of legs at a predetermined pivot point located between said central pivot point and the proximal end of said second pair of legs; and
        said at least one predetermined pivot point being selected such that said at least one first follower strut maintains the first caster base substantially in the preselected position relative to the floor as the scissor leg assembly moves between the extended condition and the retracted condition.

2. An adjustable bed according to claim 1 additionally including:
    at least one second follower strut having an upper end and a lower end, the lower end being pivotably mounted on said at least one second caster base;
    the second caster base being disposed in a preselected position relative to the floor;
    the upper end of said at least one second follower strut being pivotably attached to at least one of said legs in said first pair of legs at a predetermined pivot point located between said central pivot point and the proximal end of said second pair of legs; and said at least one predetermined pivot point being selected such that said at least one second follower strut maintains said at least one second caster base substantially in the preselected position relative to the floor as the scissor leg assembly moves between the extended condition and the retracted condition.

3. An adjustable bed according to claim 2 in which each said caster base includes:
at least one locator element to which the lower end of one of said follower struts is pivotably attached, said at least one locator element being positioned relative to the predetermined pivot point location such that said at least one follower strut maintains said caster base substantially in the preselected position relative to the floor as the main frame is moved between the fully raised and the fully lowered positions.

4. An adjustable bed according to claim 1 additionally including a lock assembly for maintaining the adjustable bed in a stationary position, the lock assembly having:
a body pivotably mounted to the first caster base;
a means for urging the body to pivot upwardly;
a lock linkage pivotably mounted to the first caster base at an upper pivot point, the lock linkage being pivotable between a low position and a high position;
a release linkage pivotably mounted to the body at at least one lower pivot point;
the release linkage and the lock linkage being pivotably attached to each other at a middle pivot point disposed between the upper and lower pivot points;
the release linkage being pivotable about the middle pivot point between a first position and a second position;
the body being movable between a locked position, in which the body engages the floor, and a released position, in which the body is disengaged from the floor; and
the body being maintained in the locked position when the lock linkage is in the low position thereof, and the body being maintained in the released position when the release linkage is in the second position thereof.

5. An adjustable bed for use on a floor, the adjustable bed having:
a main frame for supporting a mattress, the main frame having a first end and a second end;
a scissor leg assembly for supporting the main frame;
a motor mounted on the main frame and attached to the scissor leg assembly, for causing the scissor leg assembly to move between an extended condition, in which the main frame is in a fully raised position,
and a retracted condition, in which the main frame is in a fully lowered position;
the scissor leg assembly including:
a first pair of legs having a proximal end slidably attached to the main frame at the first end and a second pair of legs having a proximal end pivotably attached to the main frame at the second end;
the first pair of legs including at least one caster for engaging the floor and positioned in at least one caster base mounted at a distal end thereof positioned distal to the first end of the main frame;
said at least one caster base being disposed in a preselected position relative to the plane of the floor when the scissor leg assembly is in the extended condition;
the second pair of legs having at least one wheel for engaging the floor and mounted at a distal end thereof positioned distal to the second end of the main frame;
the first and second pairs of legs being pivotably connected to each other at substantially coplanar central pivot points disposed substantially midway between the proximal ends and the distal ends of each said pairs of legs respectively, such that the scissor leg assembly is movable between the extended condition and the retracted condition;
at least one follower strut having an upper end and a lower end, the lower end being pivotably attached to said at least one caster base;
the upper end of said at least one follower strut being pivotably attached to at least one of said legs in said second pair of legs at a predetermined pivot point located between said central pivot point and the proximal end of said second pair of legs;
said at least one predetermined pivot point being selected such that said at least one follower strut maintains said at least one caster base substantially in the preselected position relative to the plane of the floor as the scissor leg assembly moves between the extended condition and the retracted condition;
a lock assembly for maintaining the adjustable bed in a stationary position, the lock assembly having:
a body pivotably mounted to said at least one caster base;
a means for urging the body to pivot upwardly;
a lock linkage pivotably mounted to said at least one caster base at an upper pivot point, the lock linkage being pivotable between a low position and a high position;
a release linkage pivotably mounted to the body at at least one lower pivot point;
the release linkage and the lock linkage being pivotably attached to each other at a middle pivot point disposed between the upper and lower pivot points;
the release linkage being pivotable about the middle pivot point between a first position and a second position;
the body being movable between a locked position, in which the body engages the floor, and a released position, in which the body is disengaged from the floor; and
the body being maintained in the locked position when the lock linkage is in the low position thereof, and the body being maintained in the released position when the release linkage is in the second position thereof.

* * * * *